(12) United States Patent
Sacre et al.

(10) Patent No.: US 11,417,184 B2
(45) Date of Patent: Aug. 16, 2022

(54) SECURITY DEVICES AND ASSOCIATED AUDIO/VIDEO COMMUNICATION METHODS

(71) Applicant: Amazon Technologies, Inc., Seattle, WA (US)

(72) Inventors: Spiro Sacre, Los Angeles, CA (US); Matthew J. England, Santa Monica, CA (US); Robert Tso, Hawthorne, CA (US); Samuel Taeyoung Lee, Los Angeles, CA (US); Mark Siminoff, Mountain View, CA (US); James Siminoff, Pacific Palisades, CA (US); Christopher Loew, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/687,465

(22) Filed: Nov. 18, 2019

(65) Prior Publication Data

US 2020/0090480 A1 Mar. 19, 2020

Related U.S. Application Data

(63) Continuation of application No. 15/974,484, filed on May 8, 2018, now Pat. No. 10,529,206.

(Continued)

(51) Int. Cl.
*G08B 13/196* (2006.01)
*H04N 5/235* (2006.01)
(Continued)

(52) U.S. Cl.
CPC ...... *G08B 13/19695* (2013.01); *G01J 5/0025* (2013.01); *G01J 5/0806* (2013.01);
(Continued)

(58) Field of Classification Search
CPC ............. G08B 13/19695; G08B 25/08; G08B 13/19619; G08B 13/19656; G03B 31/00;
(Continued)

(56) References Cited

U.S. PATENT DOCUMENTS 4,764,953 A 8/1988 Chern et al.
5,428,388 A 6/1995 Von Bauer et al.
(Continued)

FOREIGN PATENT DOCUMENTS

CN 2585521 Y 11/2003
CN 2792061 Y 6/2006
(Continued)

*Primary Examiner* — Tracy Y. Li
(74) *Attorney, Agent, or Firm* — Lee & Hayes, P.C.

(57) ABSTRACT

Security devices and associated methods have a housing, a camera with a field of view of a monitored area outside the housing, a microphone to sense audio from the monitored area, a speaker to generate sound audible to the monitored area, an illumination source to illuminate the monitored area, a communication module to communicate with a communication network, a motion sensor to detect motion within the monitored area, at least two removable battery casings, each configured via a release button to hold at least one battery within the housing, and a control circuit that, when the motion sensor detects motion, is operable to (a) activate the illumination source, (b) capture video and audio from the camera and the microphone, and (c) send the captured video and audio to a remote server via the communication module and the communication network.

20 Claims, 34 Drawing Sheets

Related U.S. Application Data

(60) Provisional application No. 62/502,993, filed on May 8, 2017.

(51) Int. Cl.

| | | |
|---|---|---|
| *H04N 5/232* | (2006.01) | |
| *G01J 5/0806* | (2022.01) | |
| *G01P 13/00* | (2006.01) | |
| *G02B 3/08* | (2006.01) | |
| *G01J 5/00* | (2022.01) | |
| *G03B 31/00* | (2021.01) | |
| *G08B 25/08* | (2006.01) | |
| *G03B 15/03* | (2021.01) | |
| *H02J 7/00* | (2006.01) | |
| *H04N 7/18* | (2006.01) | |

(52) U.S. Cl.
CPC ............. *G01P 13/00* (2013.01); *G02B 3/08* (2013.01); *G03B 15/03* (2013.01); *G03B 31/00* (2013.01); *G08B 13/19619* (2013.01); *G08B 13/19656* (2013.01); *G08B 25/08* (2013.01); *H04N 5/2354* (2013.01); *H04N 5/23241* (2013.01); *G03B 2206/00* (2013.01); *G03B 2217/007* (2013.01); *H02J 7/0013* (2013.01); *H02J 7/0042* (2013.01); *H04N 7/186* (2013.01)

(58) Field of Classification Search
CPC ............. G03B 15/03; G03B 2206/00; G03B 2217/007; H04N 5/2354; H04N 5/23241; H04N 7/186; G01J 5/0806; G01J 5/0025; G01P 13/00; G02B 3/08; H02J 7/0042; H02J 7/0013

See application file for complete search history.

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 10,074,224 B2 * | 9/2018 | Ho .................. G07C 9/00563 |
| 10,326,921 B2 * | 6/2019 | Chien ................. G06K 9/20 |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2005/0116171 A1 * | 6/2005 | Lee .......................... F21S 8/033 250/342 |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0085671 A1 * | 4/2007 | Martin ............... G08B 13/2491 340/517 |
| 2012/0051714 A1 | 3/2012 | Reimnitz |
| 2013/0057695 A1 | 3/2013 | Huisking |
| 2013/0068788 A1 * | 3/2013 | Gasper ................. B65D 83/386 222/63 |
| 2013/0229515 A1 * | 9/2013 | Barley ................... H04N 7/183 348/143 |
| 2014/0015968 A1 * | 1/2014 | Elsemore ................ H04N 7/18 348/143 |
| 2014/0125754 A1 * | 5/2014 | Haywood ............... H04L 63/20 348/14.02 |
| 2015/0029335 A1 * | 1/2015 | Kasmir ................. H04N 7/188 348/143 |
| 2015/0035987 A1 | 2/2015 | Fernandez |
| 2015/0077555 A1 | 3/2015 | Scalisi |
| 2015/0254914 A1 * | 9/2015 | Harucksteiner ........ G07B 15/04 348/156 |
| 2015/0276237 A1 * | 10/2015 | Daniels .................... G01J 5/08 237/2 A |
| 2015/0328763 A1 | 11/2015 | Ito et al. |
| 2016/0105644 A1 | 4/2016 | Smith et al. |

FOREIGN PATENT DOCUMENTS

| | | | |
|---|---|---|---|
| EP | 0944883 B1 | 6/1998 | |
| EP | 1480462 A1 | 11/2004 | |

(56) References Cited

FOREIGN PATENT DOCUMENTS

| | | | |
|---|---|---|---|
| GB | 2286283 | A | 8/1995 |
| GB | 2354394 | A | 3/2001 |
| GB | 2357387 | A | 6/2001 |
| GB | 2400958 | A | 10/2004 |
| JP | 2001-103463 | A2 | 4/2001 |
| JP | 2002-033839 | A2 | 1/2002 |
| JP | 2002-125059 | A2 | 4/2002 |
| JP | 2002-342863 | A2 | 11/2002 |
| JP | 2002-344640 | A2 | 11/2002 |
| JP | 2002-354137 | A2 | 12/2002 |
| JP | 2002-368890 | A2 | 12/2002 |
| JP | 2003-283696 | A2 | 10/2003 |
| JP | 2004-128835 | A | 4/2004 |
| JP | 2005-341040 | A | 12/2005 |
| JP | 2006-147650 | A | 6/2006 |
| JP | 2006-262342 | A | 9/2006 |
| JP | 09-008925 | A | 1/2009 |
| WO | WO 199839894 | A1 | 9/1998 |
| WO | WO 0113638 | A1 | 2/2001 |
| WO | WO 200193220 | A1 | 12/2001 |
| WO | WO 2002085019 | A1 | 10/2002 |
| WO | WO 2003028375 | A1 | 4/2003 |
| WO | WO 2003096696 | A1 | 11/2003 |
| WO | WO 2006038760 | A1 | 4/2006 |
| WO | WO 2006067782 | A1 | 6/2006 |
| WO | WO 2007125143 | A1 | 8/2007 |

\* cited by examiner

SECURITY DEVICES AND ASSOCIATED AUDIO/VIDEO COMMUNICATION METHODS

CROSS-REFERENCE TO RELATED APPLICATIONS

This application is a continuation of U.S. patent application Ser. No. 15/974,484, filed on May 8, 2018 which claims priority to provisional application Ser. No. 62/502,993, filed on May 8, 2017, the disclosures of which are incorporated herein by reference in their entirety.

TECHNICAL FIELD

The present embodiments relate to security lighting systems and wireless audio/video recording and communication devices. Certain embodiments relate to security camera devices that deter crime and are configured to capture footage of criminal acts when occurring, increasing public and private safety.

BACKGROUND

Home security is a concern for homeowners and renters. Some exterior lighting systems include motion sensors that activate lights when motion is detected. Existing exterior lighting systems may startle would-be burglars when the lights suddenly turn on unexpectedly.

SUMMARY

The various embodiments of the present security device and associated audio/video communication methods have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

One aspect of the present security devices includes the realization that exterior lighting systems may be improved by adding audio/video recording and communication capabilities. For example, when a motion sensor of an exterior lighting system detects an intruder, the lights are activated, which may startle the intruder. But the intruder is likely to be further startled, and thus more likely to flee, if he or she hears the sound of a live human voice. Thus, it would be advantageous for the security devices to control lighting (interior and/or exterior), include a camera (imaging system) to enable the property owner (or renter) to see a live view of the area near the security device, and include a speaker to enable the property owner (or renter) to provide a live verbal warning to any intruders. The present embodiments of the security devices disclosed herein provide these advantages. The present embodiments further advantageously upload audio and/or video captured by the security devices to the cloud for recording, such as on a remote server or storage device. The audio/video footage is useful to law enforcement in capturing perpetrators of home burglaries and other crimes. Further, the presence of the security device on the exterior of a home acts as a powerful deterrent against would-be burglars and intruders.

Another aspect of the present embodiments includes the realization that security devices, such as security camera devices, may be improved by adding illumination, such as by adding both visible light illumination and infrared illumination. At least some of the present embodiments provide security camera devices having both visible light illumination and infrared illumination. Such security camera devices can advantageously be configured to provide either visible light illumination or infrared illumination for capturing video images using the camera, wherein the choice of visible light illumination or infrared illumination is based on ambient lighting conditions to provide the best possible image quality under those ambient lighting conditions. The present embodiments thus solve a problem that is common for typical security camera devices: Poor image quality that results from improper illumination for given ambient lighting conditions. In some embodiments, the choice of visible light illumination or infrared illumination for given ambient lighting conditions may be configurable by the user.

Another aspect of the present embodiments includes the realization that security devices, such as security camera devices, may be improved by providing such devices with an internal power source, such as a rechargeable battery. Such devices may be easier to install than devices that must be connected to an external power source, such as AC mains. Such devices may further be capable of being installed in locations where a connection to an external power source is not available, thereby making it possible to provide video surveillance and recording in a broader range of locations.

Another aspect of the present embodiments includes the realization that battery powered security devices may have drawbacks, such as the inability to function when the battery charge is depleted, and the inability to function when the battery is removed from the device for recharging. The present embodiments solve this problem by providing at least two rechargeable batteries, where the device may be powered by both batteries simultaneously, or by either battery independently of the other. Further, the at least two rechargeable batteries may be independently removable from the device, such that one of the batteries may be removed from the device for recharging while the other battery remains in the device and provides operating power for the device. The device may thus remain functional, and may continue to provide video surveillance and recording, even when one of the batteries is removed from the device, such as for recharging.

Another aspect of the present embodiments includes the realization that security devices having an integrated illumination source, such as security camera devices, may have a limited illumination area. The present embodiments solve this problem by providing security camera devices having an integrated illumination source, wherein the security camera devices may be combined with external illumination source. For example, at least some of the present embodiments may include an integrated illumination source, and may further be connected to an external floodlight device. Where the lights of the external floodlight device are capable of being reoriented, the external floodlights may work in conjunction with the integrated illumination source of the security camera devices to illuminate a broader area around the security camera devices, thereby providing video surveillance and recording of a larger area for greater security.

Embodiments of the present security devices are advantageously configured to include an internal power source (e.g., one or more rechargeable batteries). The camera of the security devices may be powered on continuously. Because the camera is able to be powered on continuously, it may capture images continuously, and the captured audio/video data may be stored in a rolling buffer, cyclic buffer, or sliding window. In certain embodiments, the latest 10-15 seconds of audio/video data is stored in the rolling buffer, cyclic buffer, or sliding window. Where the camera operates continuously, it may be used for motion detection and may thus supplement the functionality of a separate motion detection sensors, such as a passive infrared (PIR) sensor, or may eliminate the need for a separate motion detection device. Also, where the camera operates continuously, it may be used as a light detector for other functionality of the security devices, such as for controlling an infrared illumination source. The camera may thus supplement the functionality of a separate photosensor (light detector), or eliminate the need for a separate photosensor.

In a first aspect, a security camera device is provided, the security camera device comprising: a housing; a camera within the housing, the camera including an image sensor and having a field of view, the camera being configured to record image data of the field of view; a microphone within the housing, the microphone being configured to capture audio from an area about the security camera device; a speaker within the housing, the speaker being configured to produce sound audible within the area about the security camera device; an illumination source coupled to the housing, the illumination source being configured to illuminate the field of view of the camera, the illumination source including a plurality of light-emitting members arranged in rows on either side of the camera; a communication module within the housing, the communication module being configured to communicatively couple the security camera device with a communication network; a motion sensor coupled to the housing and configured to detect an object within the field of view of the camera; a power source within the housing, the power source being configured to provide electrical power to the camera, the illumination source, the communication module, and the motion sensor, the power source including a first rechargeable battery and a second rechargeable battery; and a processing module within the housing, the processing module being operatively connected to the camera, the illumination source, the communication module, and the motion sensor, the processing module including a processor and a camera application, wherein the camera application configures the processor to maintain the camera in a low-power state; maintain the illumination source in a powered-off state; receive an input from the motion sensor when the motion sensor detects the object within the field of view of the camera; in response to receiving the input from the motion sensor, produce a first output to the camera to power up and record the image data from the field of view; in response to receiving the input from the motion sensor, produce a second output to the illumination source to power on and illuminate the field of view of the camera; and in response to receiving the input from the motion sensor, produce a third output to the communication module to initiate a call to a backend device via the communication network; wherein the housing comprises a main body portion and a lower portion pivotably secured to the main body portion.

In an embodiment of the first aspect, the lower portion of the housing is pivotable at least 90° with respect to the main body portion of the housing.

In another embodiment of the first aspect, pivoting the lower portion of the housing with respect to the main body portion exposes the power source through a lower opening in the main body portion of the housing.

In another embodiment of the first aspect, the power source is removable from the security camera device through the lower opening in the main body portion of the housing.

In another embodiment of the first aspect, the motion sensor is located within the lower portion of the housing and movable with the lower portion when the lower portion is pivoted with respect to the main body portion.

In another embodiment of the first aspect, the rows of light-emitting members on either side of the camera extend vertically along front-side edges of the main body portion of the housing.

Another embodiment of the first aspect further comprises a Fresnel lens coupled to a lower end of the lower portion of the housing, wherein the motion sensor is located within the lower portion of the housing, behind the Fresnel lens, and the Fresnel lens is configured to concentrate incoming light onto the motion sensor to thereby enhance the sensitivity of the motion sensor to detect motion.

In another embodiment of the first aspect, the motion sensor comprises three passive infrared (PIR) sensors.

Another embodiment of the first aspect further comprises an inverted pyramidal PIR sensor holder, wherein the PIR sensors are arranged about three surfaces of the inverted pyramidal PIR sensor holder.

In another embodiment of the first aspect, the three surfaces of the inverted pyramidal PIR sensor holder are configured to point the PIR sensors at a downward angle.

In another embodiment of the first aspect, the PIR sensors are configured to detect motion in an area of about 270 degrees around the front and sides of the security camera device.

In another embodiment of the first aspect, the PIR sensors are arranged such that a first one of the PIR sensors is pointed toward the front of the security camera device, a second one of the PIR sensors is pointed toward the right side of the security camera device, and a third one of the PIR sensors is pointed toward the left side of the security camera device.

In a second aspect, a security device includes a housing configured with a camera with a field of view of a monitored area outside the housing, a microphone for sensing audio from the monitored area, a speaker for generating sound audible to the monitored area, an illumination source for illuminating the monitored area, a communication module for communicating with a communication network, and a motion sensor for detecting motion within the monitored area. At least two removable battery casings are each configured via a release button to hold at least one battery within the housing. A control circuit within the housing is communicatively coupled with the camera, the microphone, the motion sensor, and the illumination source, and is operable, when the motion sensor detects motion, to (a) activate the illumination source, (b) capture video and audio from the camera and the microphone, and (c) send the captured video and audio to a remote server via the communication module and the communication network.

An embodiment of the second aspect further comprises a power circuit that is electrically connected to batteries of the removable battery casings and operable to control power usage of the batteries of each removable battery casing.

In another embodiment of the second aspect, the illumination source comprises a plurality of visible light emitting elements configured vertically along front-side edges of the housing.

In another embodiment of the second aspect, the motion sensor comprises at least one passive infrared (PIR) detector communicatively coupled with the control circuit, and a Fresnel lens positioned to concentrate infrared light from different parts of the monitored area onto the at least one PIR detector. The Fresnel lens and the at least one PIR detector forms a hinged door to provide an opening into the housing and access to the removable battery casings.

In another embodiment of the second aspect, the at least one PIR detector is electrically connected to the control circuit via a flex circuit.

In another embodiment of the second aspect, each release button is independently operable to release its removable battery casing from the housing and through the opening.

Another embodiment of the second aspect further comprises a PIR sensor holder with at least three faces directed toward three different portions of the monitored area. The PIR detector has three PIR detectors, each mounted to a different one of the three faces.

In another embodiment of the second aspect, a first one of the PIR detectors is configured to sense IR radiation from a left side of the monitored area, a second one of the PIR detectors is configured to sense IR radiation from a center portion of the monitored area, and a third one of the PIR detectors is configured to sense IR radiation from a right side of the monitored area.

In another embodiment of the second aspect, the three PIR detectors cooperate to detect motion within a viewing angle of 270 degrees.

Advantageously, embodiments of the present security devices may control lighting (interior and/or exterior), may include a camera (imaging system) to enable a property owner (or renter) to see a live view of an area near the security device, and may include a speaker to enable the property owner (or renter) to provide a live verbal warning to any intruders.

Advantageously, embodiments of the present security devices may also upload captured audio and/or video to the cloud for recording, such as on a remote server or storage device. Thus, the property owner (or renter) can review the captured audio and/or video at a later time, and such captured and recorded audio and/or video may be useful to law enforcement in capturing perpetrators of home burglaries and other crimes.

Advantageously, embodiments of the present security devices may also be configured with an internal power source with two removable battery casings, each containing one or more rechargeable batteries, for example. Thus, the security device may be powered continually, even when one rechargeable battery casing is removed for recharging.

BRIEF DESCRIPTION OF THE FIGURES

The various embodiments of the present security devices and associated audio/video communication methods now will be discussed in detail with an emphasis on highlighting the advantageous features. These drawings include the following figures, in which like numerals indicate like parts.

DETAILED DESCRIPTION OF THE EMBODIMENTS

Figure 1:
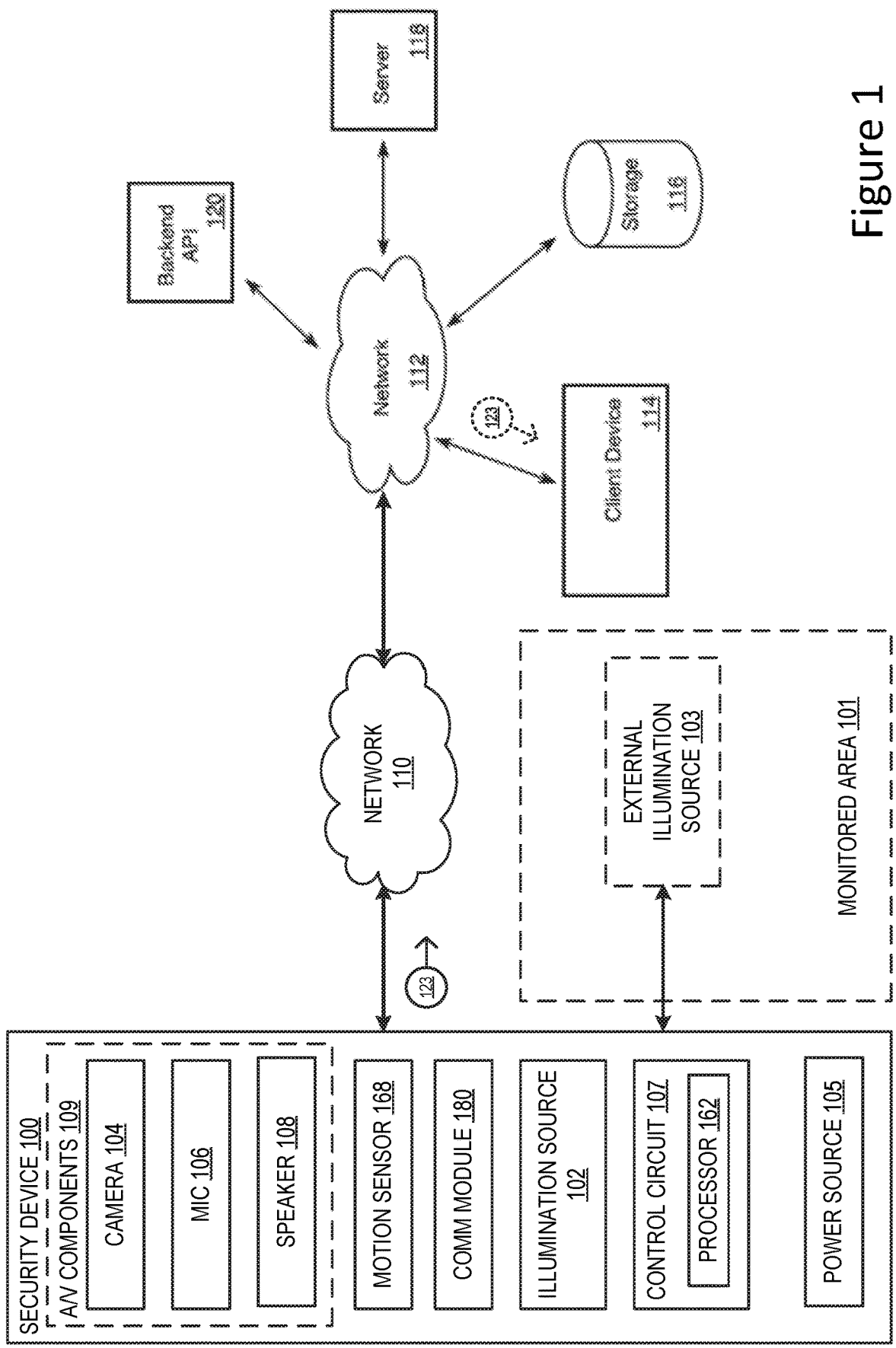
FIG. 1 is a functional block diagram illustrating a system for streaming and storing audio/video content captured by a security device, according to an embodiment.

The following detailed description describes the present embodiments with reference to the drawings. In the drawings, reference numbers label elements of the present embodiments. These reference numbers are reproduced below in connection with the discussion of the corresponding drawing features.

The present embodiments are described below with reference to the figures. These figures, and their written descriptions, indicate that certain components of the apparatus are formed integrally, and certain other components are formed as separate pieces. Those of ordinary skill in the art will appreciate that components shown and described herein as being formed integrally may in alternative embodiments be formed as separate pieces. Those of ordinary skill in the art will further appreciate that components shown and described herein as being formed as separate pieces may in alternative embodiments be formed integrally. Further, as used herein the term integral describes a single unitary piece.

Co-owned provisional patent application, Ser. No. 62/367,045, filed on Jul. 26, 2016, titled "Floodlight Controllers with Wireless Audio/Video Recording and Communication Features", co-owned provisional patent application, Ser. No. 62/410,790, filed on Oct. 20, 2016, titled "Floodlight Controllers with Wireless Audio/Video Recording and Communication Features", and co-owned provisional patent application, Ser. No. 62/442,218, filed on Jan. 4, 2017, titled "Floodlight Controllers with Wireless Audio/Video Recording and Communication Features" are incorporated by reference herein and provide disclosure for related devices that control floodlights.

Conventional exterior lighting systems seem at best only marginally effective in deterring intruders. For example, when a motion sensor of an exterior lighting system detects an intruder, lights may be activated that may startle the intruder, but savvy burglars may not be so easily deterred. Further, an illuminating floodlight does little to protect property from invasion or burglary if no occupant is present at the time of intrusion. The present embodiments discussed below address shortcomings of conventional exterior lighting systems, for example by augmenting the functionality of conventional exterior lighting systems by adding audio-video communications and recording. For example, in accordance with certain teachings herein, when a motion sensor of a security device detects an intruder, lights may be activated to startle and/or illuminate the intruder, and human voice communications may also be relayed to the intruder to provide further deterrence. In some embodiments, a loud siren may also be activated to scare away the intruder and/or to draw the attention of others that may be in the area and may be able to offer assistance in repelling the intruder. In further advantageous embodiments, when a motion sensor of a security device detects an intruder, an alert may be sent to a user's client device along with streaming video (and in some embodiments, audio) of the field of view of the camera, enabling the user to see (and in some embodiments, hear) what is happening around the security device, even when the user is away from home. The user may also speak to the intruder through the client device and the security device, further enhancing the ability of the security device to scare away the intruder.

Further advantages of embodiments disclosed herein are provided by exterior lighting with a camera, such that a property owner (or renter) sees live views near the exterior lighting and can further deliver live or pre-recorded verbal warnings to detected intruders. Audio and/or video captured by the security device may be uploaded to the cloud and recorded to a remote server. Subsequent review of recordings can aid law enforcement in capturing perpetrators of home burglaries and other crimes. Even the mere presence of such exterior lighting and cameras at the exterior of a home (or any other type of structure or property) may act as a powerful deterrent against would-be burglars. Certain of the present embodiments may further enable a user to remotely control light and/or sound emitted from the security device, to further enhance intruder deterrence.

Advantageously, certain of the present embodiments further include a camera and a wireless communication module that enable a user to receive live streaming video of an intruder within the field of view of the camera using a computing device such as a smartphone. The user can thus observe the intruder even when the user is not at home (or present at whatever type of property where the camera is located). The user may also speak to the intruder through a speaker, to provide live, verbal warnings to the intruder. This functionality provides safety to the user—who does not have to physically confront the intruder. In certain circumstances, this functionality may create an illusion that the user is on-site when actually the user is somewhere else. If the intruder is fooled into believing that the property owner or occupant is present, the intruder is more likely to flee. Footage captured by the camera, in addition to being streamed to the user's computing device, may also be uploaded to the cloud and later used to identify, apprehend, and/or convict the intruder.

Certain of the present embodiments disclosed herein include a camera, a wireless communication module, a speaker, and other components in a compact unit that may be connected to pre-existing outdoor security lighting devices. Certain other embodiments disclosed herein include one or more illumination sources integrated into the device and used to illuminate the field of view of the camera, thereby eliminating the need to connect the device to other outdoor lighting. Certain other embodiments disclosed herein may also integrate into or control existing outdoor security lighting devices as a replacement for its motion sensor. Power sources, such as rechargeable batteries, may be employed to power internal components and/or illumination sources.

With regard to the figures, FIG. 1 is a functional block diagram illustrating a system for streaming and storing audio/video content captured by a security device 100. The security device 100 has audio/video recording and communication components 109, an integral illumination source 102, a control circuit 107 with a processor 162, and an internal power source 105. In some embodiments, the security device 100 may also operate (e.g., turn on or off) an external illumination source 103. The security device 100 may be, for example, positioned inside or at the exterior of a structure (not shown), such as a dwelling, a business, or a storage facility.

In operation, the security device 100 monitors movement within an area (hereinafter "monitored area 101") about the security device 100. As described in detail below, the security device 100 is configured to activate the illumination source 102 (and, optionally, the external illumination source 103) when motion is detected in the monitored area 101. The security device 100 is further configured to record video of the monitored area 101, and in certain embodiments may also enable one- or two-way audio communication between a first person in the monitored area 101 and a second person located remotely from the monitored area 101.

The security device 100 includes a camera 104 (e.g., imaging system), at least one microphone 106, and at least one speaker 108 (collectively the audio/video components 109). The camera 104 is, for example, a high definition (HD) video camera, such as one sensitive to visible light and capable of capturing video images at an image display resolution of 720p, or 1080p, or any other image display resolution, including those better than 1080p. The camera 104 may also be configured to capture video images in the infrared band of the electromagnetic spectrum. In some embodiments, each pixel of the camera 104 may include red, green, blue, and infrared sensors such that the camera 104 is configured to capture images during both daylight and nighttime hours without the need for an infrared cut filter or other hardware to switch between daytime and nighttime modes. The speaker 108 may be, for example, a micro box speaker (part KDMG36004C-BOX1) from Kingstate Electronics Corporation, Taiwan. As described below in connection with FIG. 3 and elsewhere, the security device 100 includes a housing body, to physically contain and protect its components, and may include or couple with additional components, such as a motion sensor 168 and a wireless communication module 180.

With reference to FIG. 1, the security device 100 is communicatively coupled to a user network 110, which may be a wired and/or wireless network, and may include a wireless component, such as a medium-range wireless communication protocol (e.g., a Wi-Fi network compatible with the IEEE 802.11 standard) and/or other wireless communication standards. The user network 110 connects to a network 112 that in turn connects to a client device 114, a storage device 116 (interchangeably denoted herein as "cloud storage device"), a server 118, and/or a backend application program interface (API) 120. The security device 100 may therefore communicate with any or all the devices 114, 116, the server 118, and the backend API 120 via the user network 110 and the network 112. Although the storage device 116, the server 118, and the backend API 120 are shown in FIG. 1 as separate from the network 112, it should be understood that the storage device 116, the server 118, and/or the backend API 120 may be considered as components of the network 112.

The network 112 may be a wireless or wired network, or a combination thereof, to provide communications by and between the elements of FIG. 1. The network 112 is for example: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, an FDDI (Fiber Distributed Data Interface), and/or a CDDI (Copper Distributed Data Interface) connection. Communications of the network 112 may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network 112 may further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The client device 114 may be, for example, a mobile telephone (e.g., cellular telephone), a smartphone, a personal digital assistant (PDA), a computer (e.g. tablet, laptop, desktop), or other communication device. The client device 114 may include a display (not shown in FIG. 1) and related components capable of displaying streaming and/or recorded video images. The client device 114 may also include a speaker and related components capable of broadcasting streaming and/or recorded audio, and may also include a microphone to collect user voice communications.

In an embodiment, the security device 100 detects a presence of a person (sometimes denoted interchangeably as "visitor") within the monitored area 101. The security device 100 detects the visitor's presence using the camera 104 and/or the motion sensor 168, as described below. The camera 104 captures video images of the visitor within its field of view. This capture and/or recording of video images may begin when the visitor is detected by the security device 100, or may begin earlier, as described below. The security device 100 may also capture and record audio using the microphone 106.

In an embodiment, the camera 104 has zooming and/or panning functionality, such as digital zoom or panning, so that the camera 104 focuses or magnifies its field of view onto an area of interest. In some embodiments, a user may control this zooming and/or panning through the client device 114 using an application executing on the client device 114. In another embodiment, the camera 104 has "smart" zoom and/or panning functionality, to automatically focus and/or magnify the field of view onto one or more persons in the monitored area 101, and/or to follow movement of the persons moving about within the field of view. The camera 104 may be further capable of detecting a human face and automatically focusing and/or magnifying the field of view onto the detected human face (or, if multiple persons, multiple faces), and/or following the movement of the detected face(s). The camera 104 may be further capable of (a) distinguishing a human in its field of view from a non-human object in its field of view and/or (b)

tracking movement of detected humans while ignoring detections of non-human objects in the field of view.

In an embodiment, in response to visitor detection, the security device 100 activates (e.g., turns on) at least one of the illumination source 102 and the external illumination source 103 to illuminate the monitored area 101. The security device 100 may also send an alert 123 to the client device 114 via the user network 110 and the network 112. The security device 100 may also send streaming video (and optionally streaming audio) to the client device 114 via the user network 110 and the network 112. If the user of the client device 114 answers the alert 123, the user may view the streamed video and hear the streamed audio. The user of the client device 114 may also establish two-way audio communications between the visitor and the user through the security device 100, the client device 114, and the networks 110 and 112. The user may view images of the visitor throughout the duration of the communication, but the visitor cannot see the user.

In other embodiments, video images captured by the camera 104 (and the audio captured by the microphone 106) are uploaded to the cloud and recorded on the storage device 116. Video and/or audio may be recorded on the storage device 116 whether the user responds to, or ignores, the alert 123 sent to the client device 114. As described above, the camera 104 may include facial detection functionality with automatic focusing and/or magnifying the field of view onto the detected human face so that images of an intruder's face are usable in later identification and even eventual capture and criminal prosecution.

As shown in FIG. 1, the security device 100 may communicate with the backend API 120, which may include one or more components. The backend API 120 may include, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. The backend API 120 may, for example, have many such applications, each of which communicates with one another using their public APIs. The backend API 120 may hold the bulk of the user data and offer the user management capabilities, leaving the client device to have very limited state. In certain embodiments described herein, functionality may be distributed across multiple devices of the system without departing from the scope hereof. For example, in certain embodiments, processing may be performed mainly at the backend API 120; but in other embodiments processing may be mostly performed by the end user devices (e.g., the client device 114).

The backend API 120 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and provide facilities to develop applications for the relevant system using a given programming language. In addition to accessing databases or computer hardware like hard disk drives or video cards, an API can ease the work of programming graphical user interface (GUI) components. For example, an API can facilitate integration of new features into existing applications (a so-called "plug-in API"). An API can also assist otherwise distinct applications with sharing data, which can help to integrate and enhance the functionalities of the applications.

The backend API 120 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
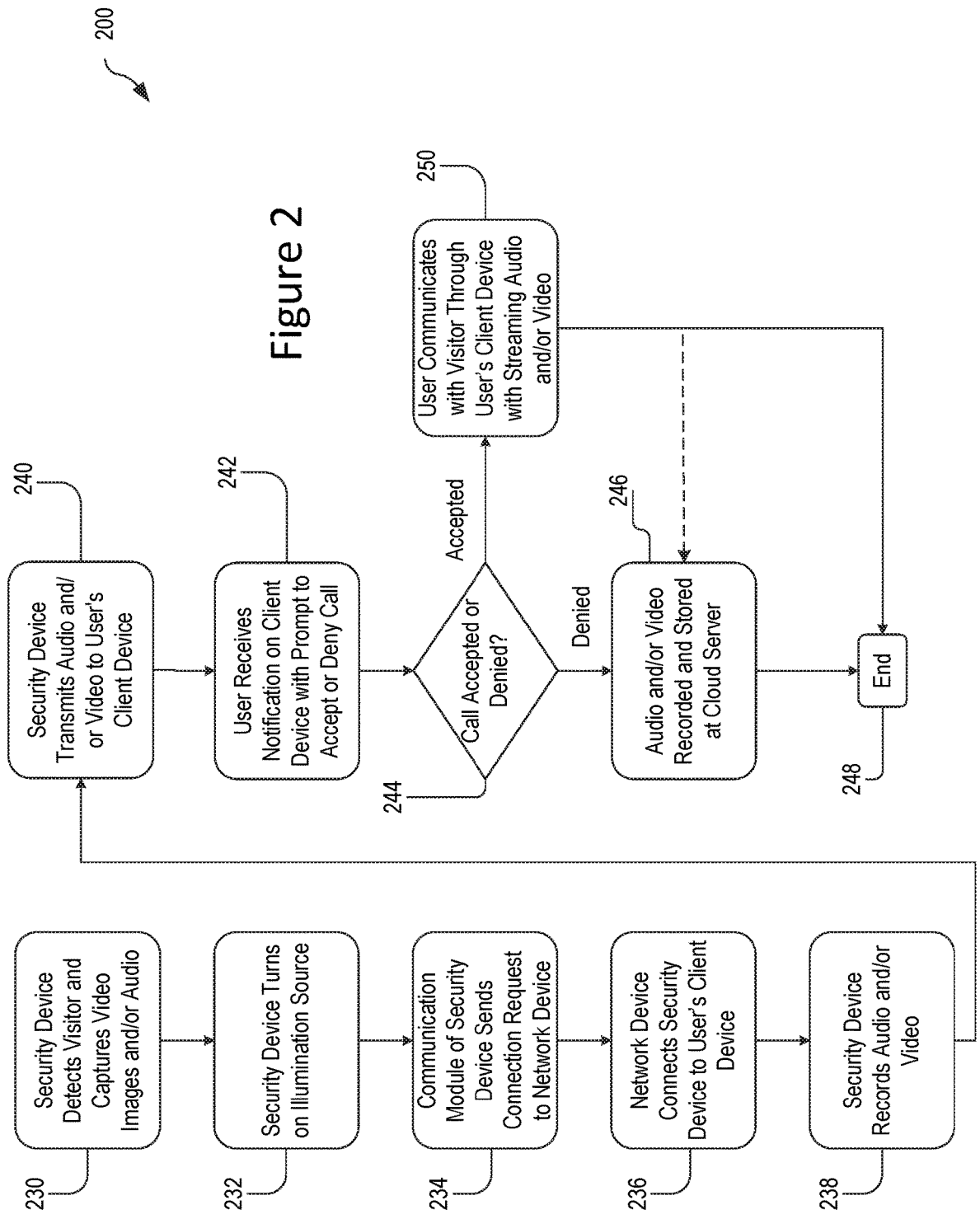
FIG. 2 is a flowchart illustrating a process for streaming and storing audio/video content from a security device, according to an embodiment.

FIG. 2 is a flowchart illustrating an example process 200 for streaming and storing audio/video content from the security device 100, according to various aspects of the present disclosure. At block 230, the security device 100 detects motion (e.g. from a visitor or an intruder) and captures video images of a field of view of the camera 104. The security device 100 may detect the motion using the camera 104 and/or the motion sensor 168. For example, the processor 162 may receive an input signal from at least one of the camera 104 and the motion sensor 168, where the input signal indicates detected motion. The processor 162 may then send an output signal to the camera 104 to capture video images of the field of view of the camera 104. The security device 100 may also capture audio through the microphone 106. At block 232, the security device 100 may turn on the illumination source 102 to illuminate the monitored area 101. As described below, in various embodiments the illumination source 102 may comprise one or more light producing components that produce light in the visible spectrum and/or one or more light producing components that produce light in the infrared band of the electromagnetic spectrum. In some embodiments, the illumination source illuminated at block 232 may include the external illumination source 103. The security device 100 may initiate the video recording/capture when motion is detected, or the video recording/capture may begin earlier, as described below.

At block 234, the communication module 180 of the security device 100 sends a request, via the user network 110 and the network 112, to a network device connected to the network 112. For example, the security device 100 may send the request to a server, such as the server 118, and/or to an API, such as the backend API 120. The server 118 may comprise, for example, a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the device to which the request is sent may be an API such as the backend API 120, which is described above.

In response to the request, at block 236 the network device may connect the security device 100 to the client device 114 through the user network 110 and the network 112. At block 238, the security device 100 may record available audio and/or video data using the camera 104, the microphone 106, and/or any other device/sensor available. At block 240, the audio and/or video data is transmitted (streamed) from the security device 100 to the client device 114 via the user network 110 and the network 112. For example, the processor 162 may control the communication module 180 to transmit (stream) the audio and/or video data from the security device 100 to the client device 114 via the user network 110 and the network 112. At block 242, the user may receive a notification (may also be referred to as "alert") on the client device 114 with a prompt to either accept or deny the communication.

The notification at the client device 114 may include the live streaming audio and/or video, thus enabling the user to determine whether or not to participate in the communication. If, for example, the streaming video shows that a person is in the field of view of the camera 104, the user may wish to respond to the notification in order to speak with that person. In one example, the person in the field of view of the camera 104 may be a visitor whose identity is known to the user. In such a case, the user may desire to converse with the visitor. In another example, the person in the field of view of the camera 104 may be an intruder whose identity is not known to the user. In such a case, the user may desire to startle the intruder and encourage him or her to flee, for example, by speaking (or shouting) a warning that the intruder is being recorded and/or that law enforcement has been notified and is en route to the property where the security device 100 is located.

At block 244, the process 200 determines whether the user has accepted or denied the notification. If the user denies or ignores the notification, then the process 200 continues with block 246, where the audio and/or video data from the security device 100 is recorded and stored in the cloud (e.g., using the storage device 116 and/or the server 118). The process 200 then ends at block 248 and the connection between the security device 100 and the client device 114 is terminated. If, however, the user accepts the notification, then at block 250, the user communicates with the visitor/intruder through the client device 114 while audio and/or video data captured by the camera 104, the microphone 106, and/or other devices/sensors is streamed to the client device 114. The user may terminate (e.g., when communication is complete) the connection between the client device 114 and the security device 100 and the process 200 then ends at block 248. In some embodiments, the audio and/or video data may be recorded and stored in the cloud (block 246) even if the user accepts the notification and communicates with the visitor/intruder through the client device 114.

As described above, one aspect of the present security devices includes the realization that exterior lighting systems may be improved by adding audio/video recording and communication capabilities. For example, when a motion sensor of an exterior lighting system detects an intruder, the lights are activated, which may startle the intruder. But the intruder is likely to be further startled, and thus more likely to flee, if he or she hears the sound of a live human voice. Thus, it would be advantageous for the security devices to control lighting (interior and/or exterior), include a camera (imaging system) to enable the property owner (or renter) to see a live view of the area near the security device, and include a speaker to enable the property owner (or renter) to provide a live verbal warning to any intruders. The present embodiments of the security devices disclosed herein provide these advantages. The present embodiments further advantageously upload audio and/or video captured by the security devices to the cloud for recording, such as on a remote server or storage device. The audio/video footage is useful to law enforcement in capturing perpetrators of home burglaries and other crimes. Further, the presence of the security device on the exterior of a home acts as a powerful deterrent against would-be burglars and intruders.

Another aspect of the present embodiments includes the realization that security devices, such as security camera devices, may be improved by adding illumination, such as by adding both visible light illumination and infrared illumination. At least some of the present embodiments provide security camera devices having both visible light illumination and infrared illumination. Such security camera devices can advantageously be configured to provide either visible light illumination or infrared illumination for capturing video images using the camera, wherein the choice of visible light illumination or infrared illumination is based on ambient lighting conditions to provide the best possible image quality under those ambient lighting conditions. The present embodiments thus solve a problem that is common for typical security camera devices: Poor image quality that results from improper illumination for given ambient lighting conditions. In some embodiments, the choice of visible light illumination or infrared illumination for given ambient lighting conditions may be configurable by the user.

Another aspect of the present embodiments includes the realization that security devices, such as security camera devices, may be improved by providing such devices with an internal power source, such as a rechargeable battery. Such devices may be easier to install than devices that must be connected to an external power source, such as AC mains. Such devices may further be capable of being installed in locations where a connection to an external power source is not available, thereby making it possible to provide video surveillance and recording in a broader range of locations.

Another aspect of the present embodiments includes the realization that battery powered security devices may have drawbacks, such as the inability to function when the battery charge is depleted, and the inability to function when the battery is removed from the device for recharging. The present embodiments solve this problem by providing at least two rechargeable batteries, where the device may be powered by both batteries simultaneously, or by either battery independently of the other. Further, the at least two rechargeable batteries may be independently removable from the device, such that one of the batteries may be removed from the device for recharging while the other battery remains in the device and provides operating power for the device. The device may thus remain functional, and may continue to provide video surveillance and recording, even when one of the batteries is removed from the device, such as for recharging.

Another aspect of the present embodiments includes the realization that security devices having an integrated illumination source, such as security camera devices, may have a limited illumination area. The present embodiments solve this problem by providing security camera devices having an integrated illumination source, wherein the security camera devices may be combined with external illumination source. For example, at least some of the present embodiments may include an integrated illumination source, and may further be connected to an external floodlight device. Where the lights of the external floodlight device are capable of being reoriented, the external floodlights may work in conjunction with the integrated illumination source of the security camera devices to illuminate a broader area around the security camera devices, thereby providing video surveillance and recording of a larger area for greater security.

Embodiments of the present security devices are advantageously configured to include an internal power source (e.g., one or more rechargeable batteries). The camera of the security devices may be powered on continuously. Because the camera is able to be powered on continuously, it may capture images continuously, and the captured audio/video data may be stored in a rolling buffer, cyclic buffer, or sliding window. In certain embodiments, the latest 10-15 seconds of audio/video data is stored in the rolling buffer, cyclic buffer, or sliding window. Where the camera operates continuously, it may be used for motion detection and may thus supplement the functionality of a separate motion detection sensors, such as a passive infrared (PIR) sensor, or may eliminate the need for a separate motion detection device. Also, where the camera operates continuously, it may be used as a light detector other functionality of the security devices such as for controlling an infrared illumination source. The camera may thus supplement the functionality of a separate photosensor (light detector), or eliminate the need for a separate photosensor.

Figure 3:
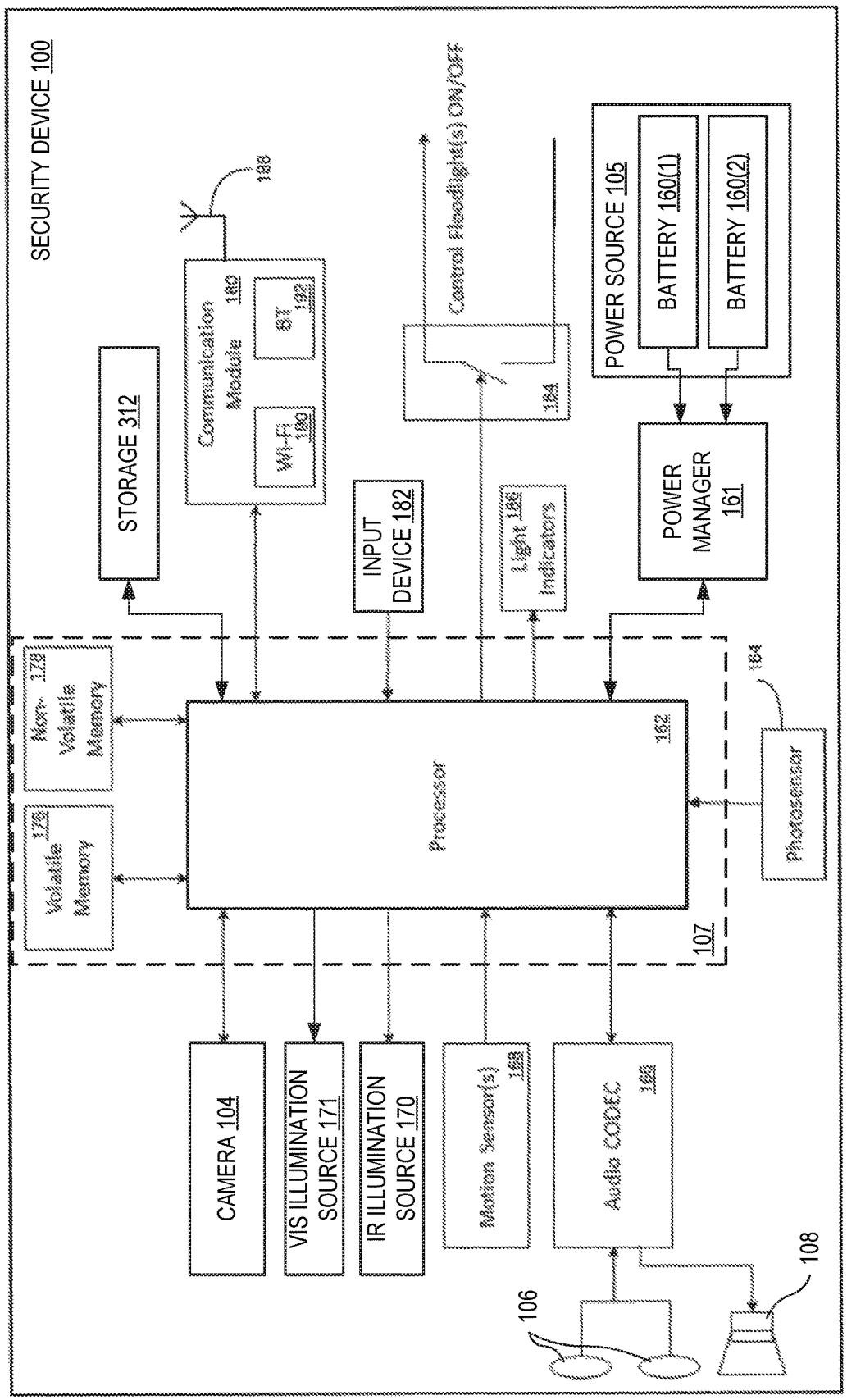
FIG. 3 is a functional block diagram of the security device of FIG. 1, illustrating component connectivity in further detail.

FIG. 3 is a functional block diagram illustrating components of the security device 100 of FIG. 1 and their relationships to one another. The processor 162 (may also be referred to as a controller or a microcontroller) is communicatively coupled with a photosensor 164 (e.g., a light level sensor), an audio CODEC (coder-decoder) 166 that drives the at least one speaker 108 and receives input from the at least one microphone 106, the at least one motion sensor 168, an infrared illumination source 170 and a visible illumination source 171, which may collectively comprise the illumination source 102, the camera 104, a volatile memory 176, a non-volatile memory 178, the communication module 180, an input device 182 (e.g., a button, an electrical switch, a manually operated electromechanical device), a plurality of light indicators 186, and a power manager 161 that connects to at least two batteries 160(1) and 160(2) that comprise the internal power source 105. The power manager 161 manages the power source 105 to provide electrical power to operate the security device 100, as described below. The power manager 161 may comprise an electronic circuit that operates to condition power from the batteries 160 and to select which of the batteries 160(1) and 160(2) power is drawn from. For example, the power manager 161 may draw power from a first one of the batteries 160, switching to draw power from the other one of the batteries 160 when the first battery 160 is drained. By drawing power from only one of the batteries 160 at a time, the security device 100 may continue operation when the depleted one of the batteries 160 is removed for recharging. In some embodiments, the security device 100 may further include a switch 184 controlled by the processor 162 to activate the external illumination source 103 (in embodiments in which the security device 100 is connected to the external illumination source 103).

The processor 162 may perform data processing and various other functions of the security device 100, as described below. In some embodiments, the processor 162, the volatile memory 176, the non-volatile memory 178, and/or programmable input/output peripherals (not shown) may be configured as an integrated circuit. The volatile memory 176 may be implemented as DDR3 SDRAM (double data rate type three synchronous dynamic random-access memory). The non-volatile memory 178 may be implemented as NAND flash memory. Although the volatile memory 176 and the non-volatile memory 178 are shown outside the box representing the processor 162 in the example of FIG. 3, in some embodiments the volatile memory 176 and/or the non-volatile memory 178 may be physically incorporated with the processor 162, such as on the same integrated circuit (chip). The volatile memory 176 and/or the non-volatile memory 178, regardless of their physical location, may be shared by one or more other components (in addition to the processor 162) of the security device 100. In certain embodiments, the security device 100 includes additional storage 312 that may be implemented as any type of non-volatile data storage, such as, for example, and without limitation, hard disks/drives, flash memory, or any other suitable memory/storage element. In some embodiments, the non-volatile memory 178 and the additional storage 312 may be combined as a single non-volatile memory. The additional storage 312, when included, may be operatively connected to the processor 162 and may be used to store audio and/or video information captured by the security device 100, as described in further detail below.

As described in further detail below, the camera 104 and the infrared illumination source 170 may cooperate to facilitate night vision functionality of the security device 100. For example, the photosensor 164 is configured to detect a level of ambient light about the security device 100. The processor 162 may use the input from the photosensor 164 to control operation of the infrared illumination source 170 and the camera 104 to activate and deactivate night vision, as described in further detail below. In some embodiments, the camera 104 may include a video recording sensor or a camera chip. In some embodiments, the infrared illumination source 170 may include one or more IR light-emitting diodes (LEDs).

The transfer of digital audio between the user (using the client device 114) and a visitor (or intruder) may be compressed and decompressed using the audio CODEC 166, as described below. The motion sensor 168 may include one or more passive infrared (PIR) sensors, or any other type of sensor(s) capable of detecting and communicating to the processor 162 the presence and/or motion of an object within its field of view. In some embodiments, one or more of the passive infrared sensors (PIRs) may comprise a pyroelectric infrared sensor. When triggered by the motion sensor 168, the processor 162 may perform one or more functions, as described below.

The communication module 180 includes at least one antenna 188 and is configured to handle communication between the security device 100 and other external devices and/or receivers, and to route incoming/outgoing data appropriately. For example, inbound data from the antenna 188 may be routed through the communication module 180 before being directed to the processor 162, and outbound data from the processor 162 may be routed through the communication module 180 before being directed to the antenna 188. The communication module 180 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, VoLTE, LoRaWAN, LPWAN, RPMA, LTE Cat-"X" (e.g. LTE Cat 1, LTE Cat 0, LTE CatM1, LTE Cat NB1), FDMA, TDMA, W-CDMA, CDMA, OFDMA, Wi-Fi, WiMAX, Bluetooth, or any other protocol and/or technology. In the illustrated embodiment, the communication module 180 includes a Wi-Fi chip 190 and a Bluetooth chip 192 that implement medium-range wireless communication protocols and short-range wireless communication protocols, respectively, but these components are merely examples and are not limiting. Further, while the Wi-Fi chip 190 and the Bluetooth chip 192 are illustrated within the box representing the communication module 180, the embodiment illustrated in FIG. 3 is merely an example, and in some embodiments the Wi-Fi chip 190 and/or the Bluetooth chip 192 may not necessarily be physically incorporated with the communication module 180.

In some embodiments, the communication module 180 may further comprise a wireless repeater (not shown, may also be referred to as a wireless range extender). The wireless repeater may be configured to receive a wireless signal from a wireless router (or another network device) in the user network 110 and rebroadcast the signal. Wireless devices that are not within the broadcast range of the wireless router, or that only weakly receive the wireless signal from the wireless router, may receive the rebroadcast signal from the wireless repeater of the communication module 180, and may thus connect to the user network 110 through the security device 100. In some embodiments, the wireless repeater may include one or more transceiver modules (not shown) capable of transmitting and receiving data, and using, for example, one or more medium-range wireless communication protocols and/or technologies, such as Wi-Fi (IEEE 802.11), long-range wireless communication protocols, such as WiMAX (IEEE 802.16), or any other protocol and/or technology.

When a visitor (or intruder) in the monitored area 101 speaks, audio from the visitor (or intruder) is captured by the microphone 106 and may be compressed by the audio CODEC 166. Digital audio data is then sent through the communication module 180 to the network 112 (FIG. 1) via the user network 110, routed by the server 118 and/or the backend API 120, and delivered to the client device 114. When the user speaks, the client device 114 captures digital audio data, which is transferred through the network 112, the user network 110, the communication module 180, and the processor 162 to the audio CODEC 166 where it is decoded and emitted to the visitor through the speaker 108, which may be driven by an audio driver (see audio driver 2302 of FIG. 25).

The input device 182 may have one or more functions, such as changing an operating mode of the security device 100 and/or triggering a reset of the security device 100. For example, when the input device 182 is activated (e.g., pressed and released), it may cause the communication module 180 of the security device 100 to enter access point (AP) mode, which may facilitate connecting the security device 100 to the user network 110. Alternatively, or in addition, when the input device 182 is activated (e.g., pressed and held) for at least a threshold amount of time, it may trigger the erasing of any data stored by the volatile memory 176 and/or by the non-volatile memory 178, and/or may trigger a reboot of the processor 162.

In certain embodiments, the security device 100 may be configured to recognize a "wake-up" word or phrase (e.g., using the microphone 106 and the processor 162) that triggers a command input mode. When the command input mode is triggered, the security device 100 detects, using the microphone 106, a verbal command that may be recognized to cause the security device 100 to perform an action. For example, in an embodiment, when the user, within the monitored area 101, says the wake-up word or phrase followed by "turn on the lights," the security device 100 activates the illumination source 102. Similarly, in another embodiment, when the user, within the monitored area 101, says the wake-up word or phrase followed by "turn off the lights," the security device 100 deactivates the illumination source 102. In certain embodiments, recognition of the wake-up word or phrase may only occur when the motion senor 168 and/or the camera 104 detects motion within the monitored area 101. In some embodiments, the available commands may be preconfigured within the security device 100. In other embodiments, the recognizable commands may be learned by the security device 100 from the user. In some embodiments, the security device 100 may be trained to recognize the voice of the user, and thereafter respond only to commands when that voice is recognized.

In certain embodiments, the security device 100 may use the camera 104 to recognize a face (e.g., the face of an authorized user). For example, in an embodiment, the security device 100 may include a learn mode through which the face(s) of one or more authorized user(s) is/are learned and stored within the non-volatile memory 178. Upon detecting and recognizing an authorized user's face, the security device 100 may enter a command input mode, in another embodiment, whereby verbal commands from the authorized user are interpreted and executed by the security device 100. In one example, where the authorized user stands facing the security device 100 and says "turn the lights on," the security device of certain embodiments activates the illumination source 102 after recognizing the authorized user's face. Similarly, when the authorized user faces the security device 100 and says "turn off the lights," the security device 100 may deactivate the illumination source 102 after recognizing the authorized user's face. In some embodiments, the security device 100 may use a lip reading algorithm to interpret the authorized user's verbal command. In some embodiments, the security device 100 may detect one or more gestures by the authorized user, interpret the gesture as a command, and then execute that command. For example, where the authorized user faces the security device 100 and makes an arm waving gesture, once the security device 100 recognizes the face of the authorized user, the security device 100 of this example detects the arm waving movements and activates the illumination source 102.

In certain embodiments, the security device 100 may be configured with one or more threshold values for detecting motion, wherein, for example, a first threshold value defines when the illumination source 102 is activated and a second threshold value defines when audio/video is captured and recorded. For example, where the motion sensor 168 and/or the camera 104 detects movement (e.g., with respect to the camera, by detecting a number of changed pixels in different video frames) at a level that is greater than the first threshold value, but less than the second threshold value, the security device 100 may activate the illumination source 102 and yet not capture and record audio/video data. However, where the motion sensor 168 and/or the camera 104 detects movement (e.g., with respect to the camera, by detecting a number of changed pixels) at a level that is greater than the first threshold value, and also greater than the second threshold value, the security device 100 may activate the illumination source 102 and also capture and record audio/video data. Thus, the security device 100 of certain embodiments may activate the illumination source 102 and capture audio/video data of a person moving within the monitored area 101, but may only activate the illumination source 102 (and not capture audio/video data) when an object smaller than a person moves through the monitored area 101.

In another embodiment, a first, or lowest, threshold value may define a level of detected motion that activates the illumination source 102, a second, or higher, threshold value may define a level of motion that activates recording of audio/video data, and a third, or highest, threshold value may define a level of motion that causes an alert to be sent to the user. These three threshold values may be configured and/or combined to define functionality of the security device 100. For example, for motion that is above the first threshold value but below the second threshold value, the illumination source 102 is activated, but no audio/video data is recorded, and no alert is sent to the user, whereas for motion that is above the second threshold value but below the third threshold value, the illumination source 102 is activated, and audio/video data is recorded, but no alert is sent to the user, and for motion that is above the third threshold value, the illumination source 102 is activated, audio/video data is recorded, and an alert is sent to the user.

In another example, the first and second threshold values may be equal and set to a relatively low value and the third threshold value may be set to a higher value. In such an embodiment, the illumination source 102 and the audio/video recording are activated together when the detected motion is above the lower threshold value, but no alert is sent to the user unless the detected motion is also above the higher threshold value. Thus, the user may configure the response of the security device 100 for various levels of detected motion.

In certain embodiments, the security device 100 may be configured to distinguish different types of objects within the monitored area 101, wherein functionality of the security device 100 may vary depending upon the type of object detected within the monitored area 101. For example, in an embodiment, the illumination source 102 may be activated when a vehicle and/or a person is detected, whereas audio/video data may start recording only when a person is detected (e.g., no recording when only a vehicle is detected and not a person). Any number of different algorithms and techniques may be used in the present embodiments for distinguishing different types of objects within the monitored area 101. For example, techniques for distinguishing humans from other types of objects include computer vision, thermal imaging, motion and scale-invariant feature transform (SIFT) methods, feature extraction based on the histogram of the oriented gradient (HOG) and geometric characteristics with a classifier based on support vector machine (SVM), adaptive boosting (Adaboost), soft-label boosting algorithms, Gaussian background-subtraction, texture change, expectation minimization (EM), image averaging, contour saliency map (CSM), CSM template matching, shape and appearance-based detection, spatiotemporal texture vectors, shape descriptors (e.g., compactness and/or leanness), principal component analysis (PCA), etc.

Figure 4:
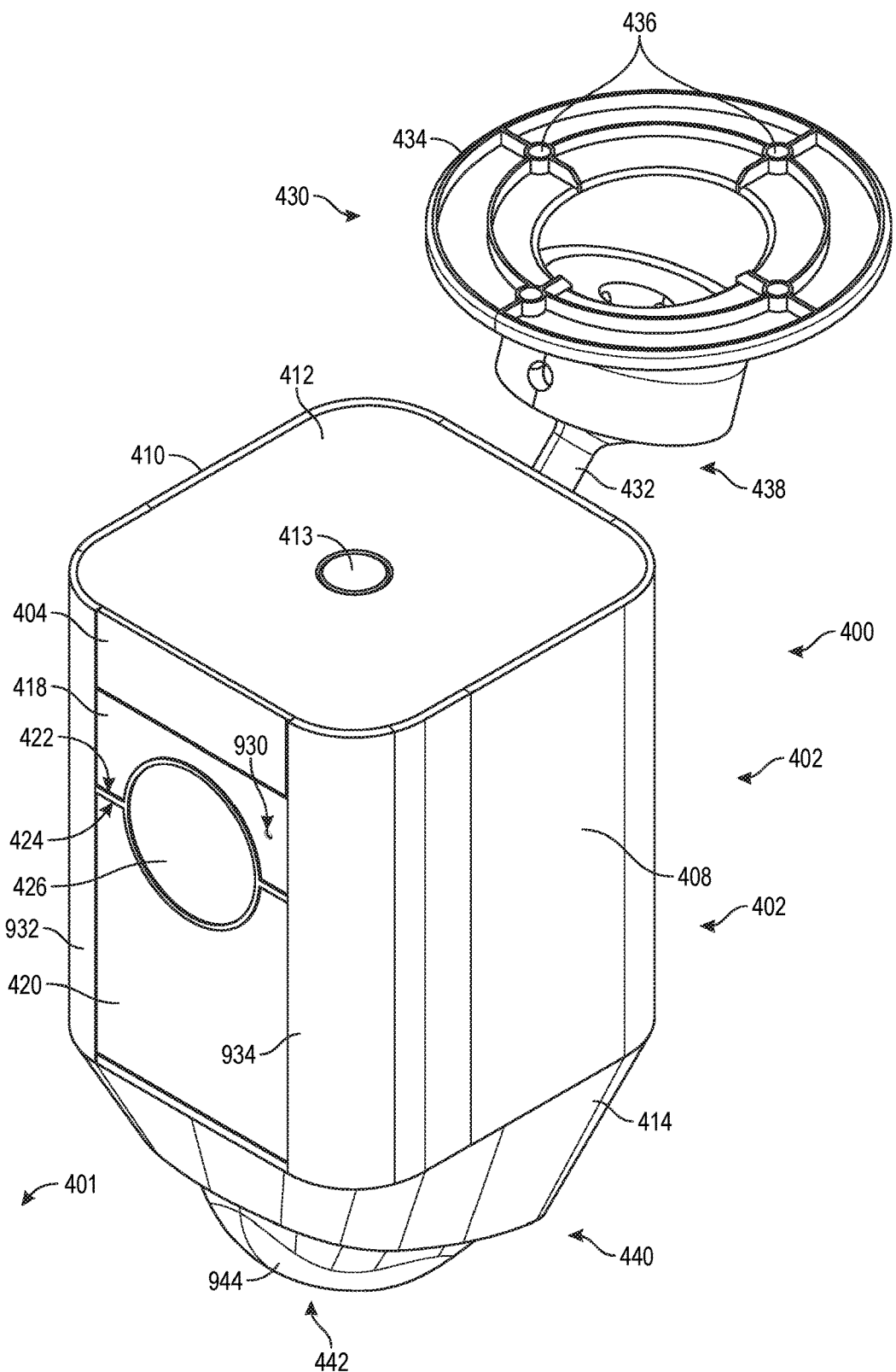
FIG. 4 is a front perspective view of the security device of FIGS. 1 and 3, in an embodiment, in combination with mounting hardware.
Figure 5:
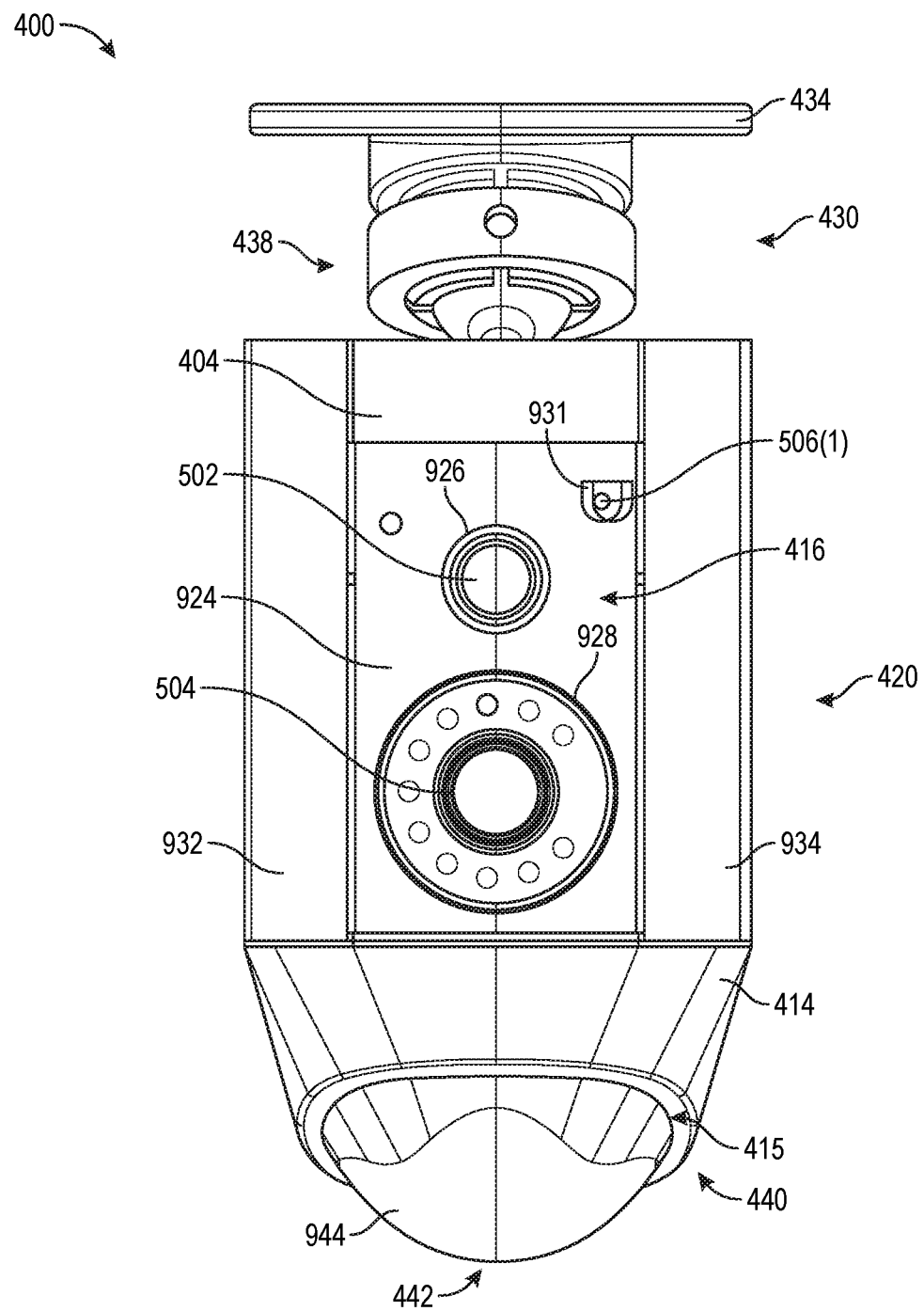
FIG. 5 is a front view of the security device of FIG. 4 with several front-facing components removed.
Figure 6:
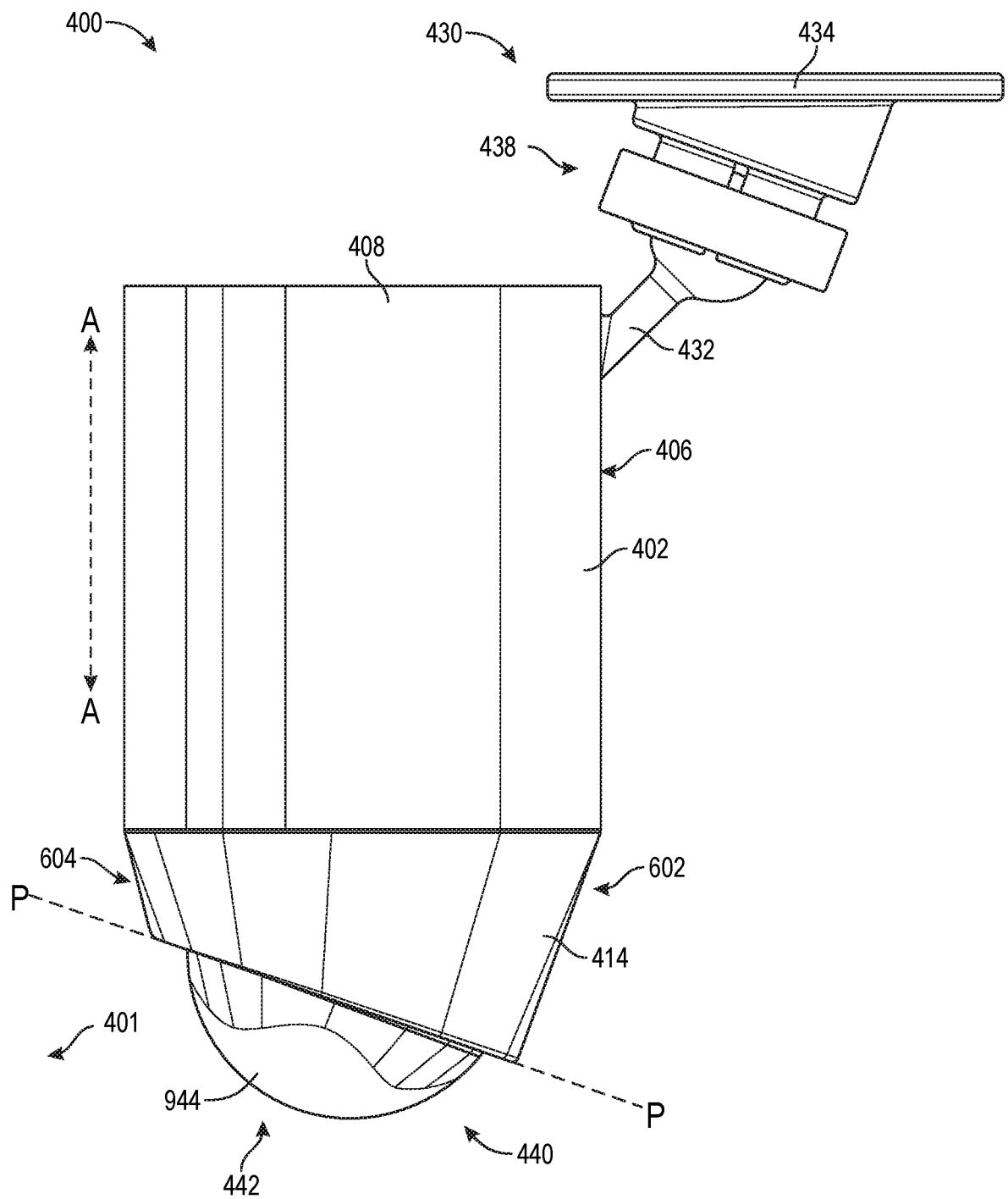
FIG. 6 is a right side view of the security device of FIGS. 4 and 5.
Figure 7:
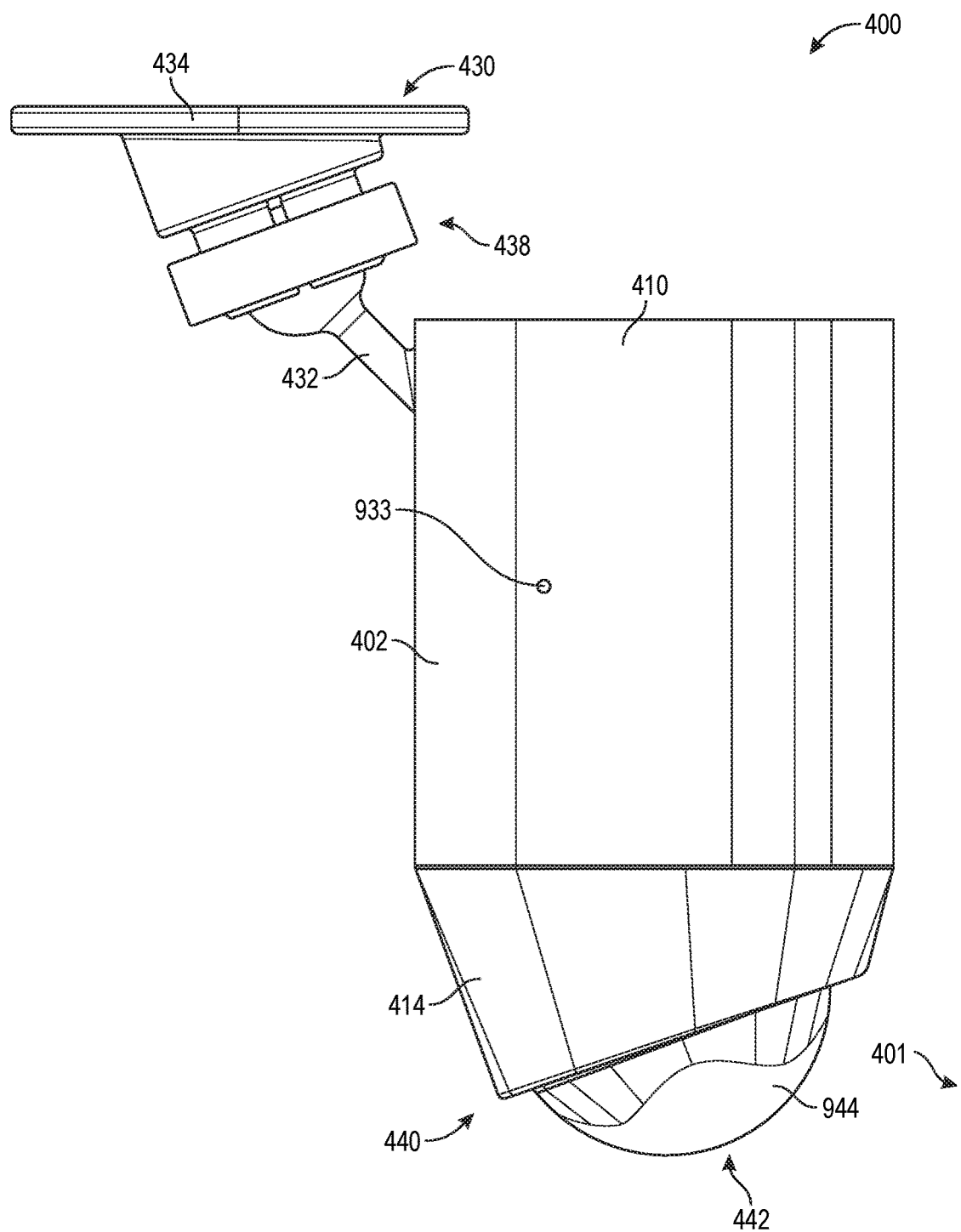
FIG. 7 is a left side view of the security device of FIGS. 4-6.
Figure 8:
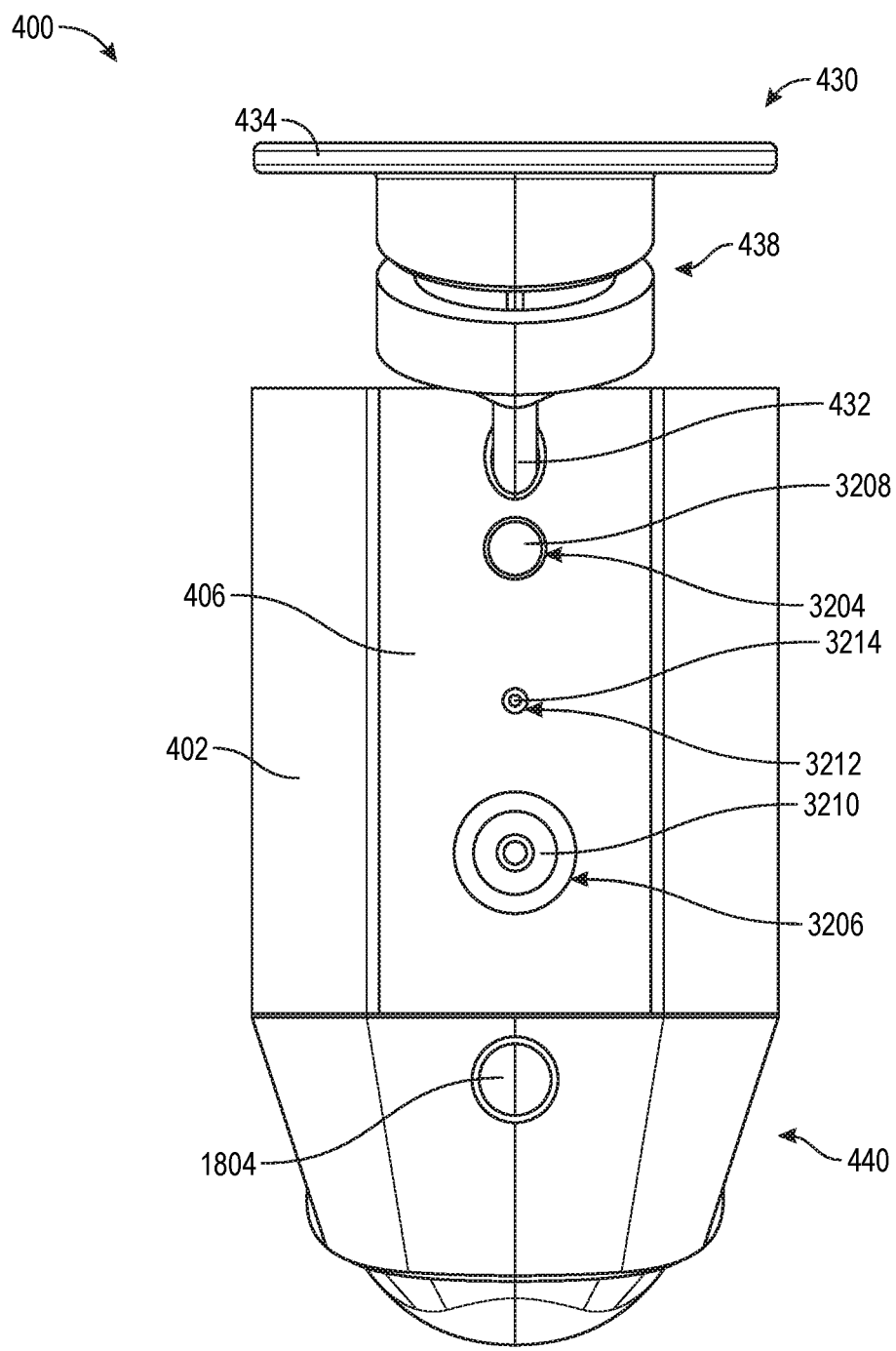
FIG. 8 is a back view of the security device of FIGS. 4-7.

FIG. 4 is a perspective view of a security device 400, which is an example of the security device 100 of FIGS. 1 and 3. FIG. 5 is a front view of the security device 400 of FIG. 4. FIG. 6 is a right side view of the security device 400 of FIGS. 4 and 5. FIG. 7 is a left side view of the security device 400 of FIGS. 4-6. FIG. 8 is a back view of the security device 400 of FIGS. 4-7. FIGS. 4-8 are best viewed together with the following description. The security device 400 may have functionality that is similar to the security device 100 of FIGS. 1 and 3.

The security device 400 is configured with a housing 402 for containing and protecting the interior components of the security device 400. The housing 402 includes a front wall 404, a rear wall 406, opposing sidewalls 408 (right), 410 (left), an upper wall 412, and a tapered lower portion 414. The front wall 404 forms a central opening 416 (FIG. 5) that receives an upper shield 418 and a lower grille 420 (FIG. 4). FIG. 5 shows the security device 400 with the upper shield 418 and the lower grille 420 removed to reveal the central opening 416. In the illustrated embodiment, front surfaces of the upper shield 418 and the lower grille 420 are substantially flush with a front surface of the front wall 404, but in alternative embodiments, these surfaces may not be flush with one another. The upper shield 418 is substantially rectangular with a semicircular indentation along its lower edge 422. The lower grille 420 is substantially rectangular, and includes a semicircular indentation along its upper edge 424. Together, the semicircular indentations in the upper shield 418 and the lower grille 420 form a circular opening that accommodates a cover 426. The upper shield 418, the lower grille 420, and the cover 426 are described in further detail below.

As shown by FIG. 5, a camera 502 is positioned behind the cover 426 (FIG. 4) with a field of view to the front of the security device 400 through the circular opening formed by the upper shield 418 and the lower grille 420. The camera 502 may be similar to the camera 104 of the security device 100. The cover 426 is preferably transparent or translucent so that it does not interfere with the field of view of the camera 502. For example, in certain embodiments the cover 426 may comprise colorless glass or plastic.

FIGS. 4-8 show the security device 400 configured with coupling hardware 430 that may be used to attach the security device 400 to a supporting structure (not shown). For example, the coupling hardware 430 may be used to secure the security device 400 to a wall, a ceiling, a frame, a post, a gate, and so on. In the illustrated embodiment, the coupling hardware 430 has a first connecting member 432 secured to the rear wall 406 of the housing 402 and a second connecting member 434 configured for securing to the supporting structure. For example, the second connecting member 434 may include one or more apertures 436 (FIG. 4) that allow the second connecting member 434 to be screwed or nailed to the supporting structure. The first and second connecting members 432, 434 meet at a ball-and-socket joint 438 that allows the first and second connecting members 432, 434 to articulate with respect to one another such that the security device 400 may be oriented as desired. The ball-and-socket joint 438 is, however, just one non-limiting example. In alternative embodiments, other types of joints may be provided between the first and second connecting members 432, 434, including non-articulating joints. In further alternative embodiments, the coupling hardware 430 may comprise a single unitary member, rather than the first and second connecting members 432, 434.

In some of the present embodiments, where the security device 400 is configured to control the external illumination source 103 that is capable of being reoriented, the external floodlights may work in conjunction with the integral illumination source 952 to illuminate a broader area around the security device 400, thereby providing greater security and a larger area for video surveillance and recording. For example, the user may orient the security device 400 such that the integral illumination source 952 points straight ahead and reorient the external illumination source 103 to point to the sides of the area illuminated by the integral illumination source 952, thereby illuminating a broader area.

As shown in FIG. 8, the rear wall 406 has first and second apertures 3204, 3206, respectively, that are symmetrically positioned along a vertical center line of the rear wall 406. As described below with reference to FIG. 32, the rear wall 406 may, in some embodiments, be removable from the housing 402 by sliding the rear wall 406 downward. However, a spring-loaded button 3208 is configured with the housing 402 to protrude into the first aperture 3204 and thereby prevent the rear wall 406 from sliding, unless the button 3208 is depressed by the user. The second aperture 3206 provides access to an internal connector 3210 (e.g., a USB connector) that allows direct electrical/data connectivity to certain components of the security device 400. The rear wall 406 further includes a third aperture 3212 for receiving a security screw 3214 that secures the rear wall 406 to the housing 402 and deters theft of the security device 400.

Figure 9:
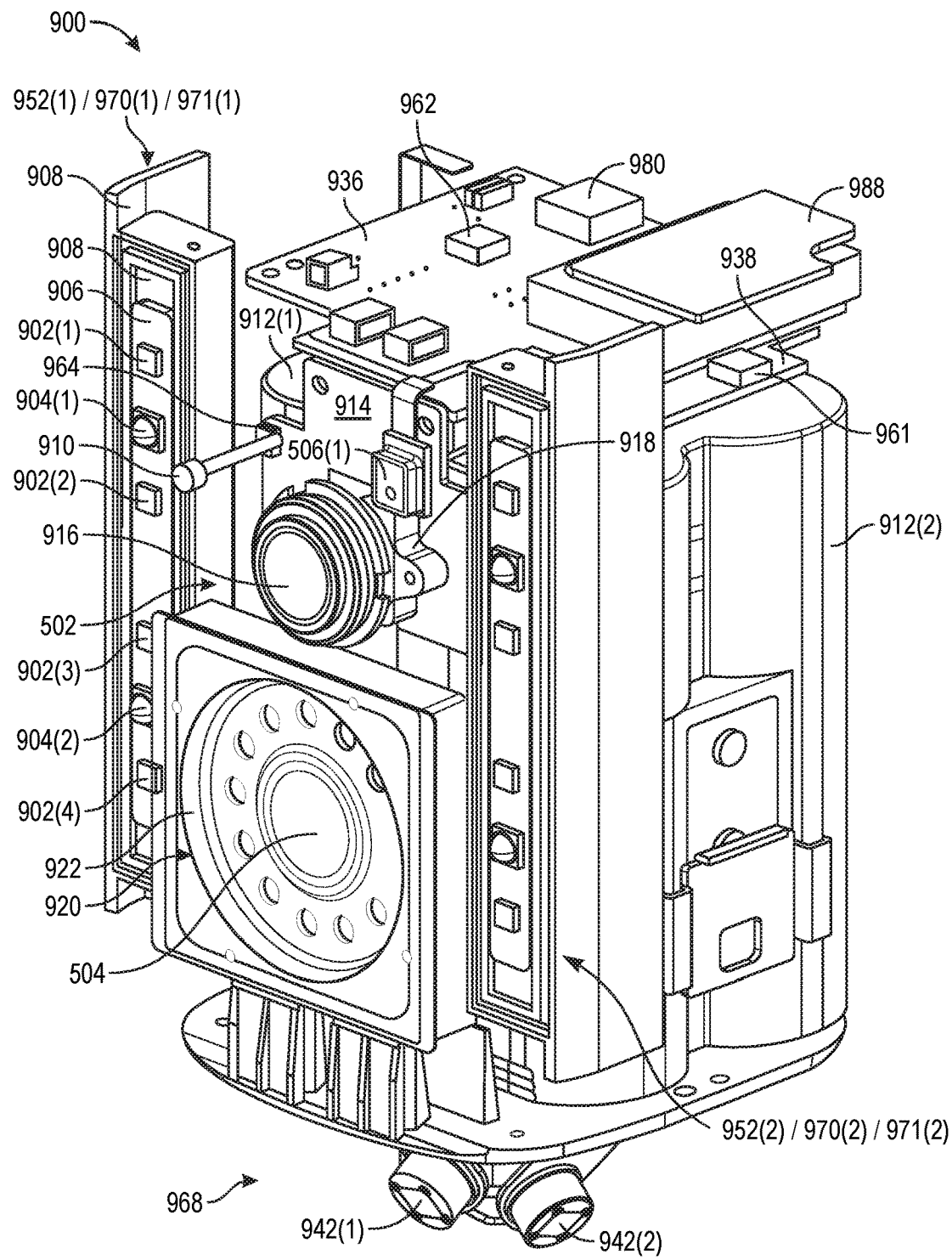
FIG. 9 is a front perspective view showing internal components of the security device of FIGS. 4-8.
Figure 10:
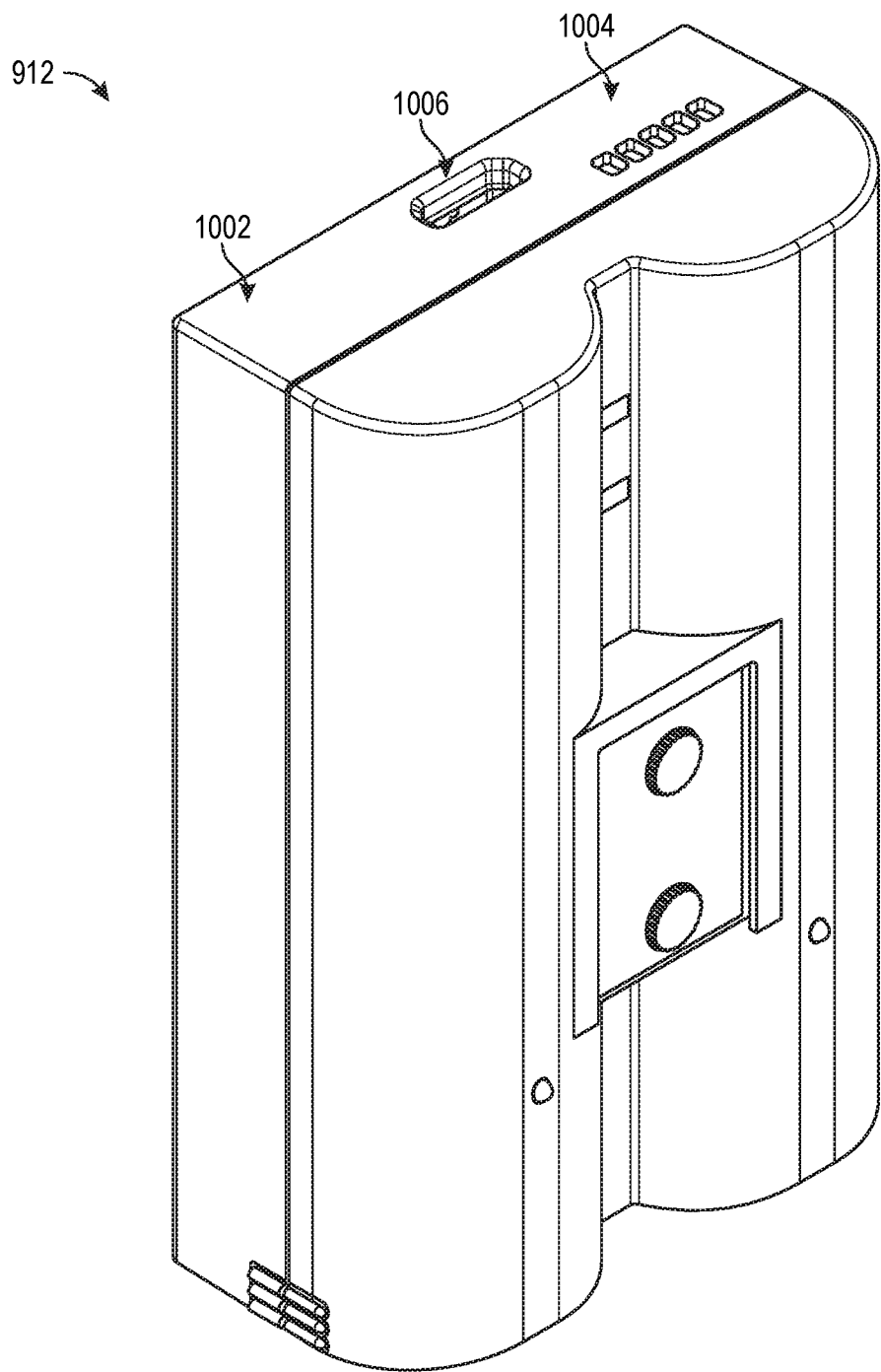
FIG. 10 is a front perspective view showing one of the removable battery casings of the security device of FIGS. 4-9.
Figure 11:
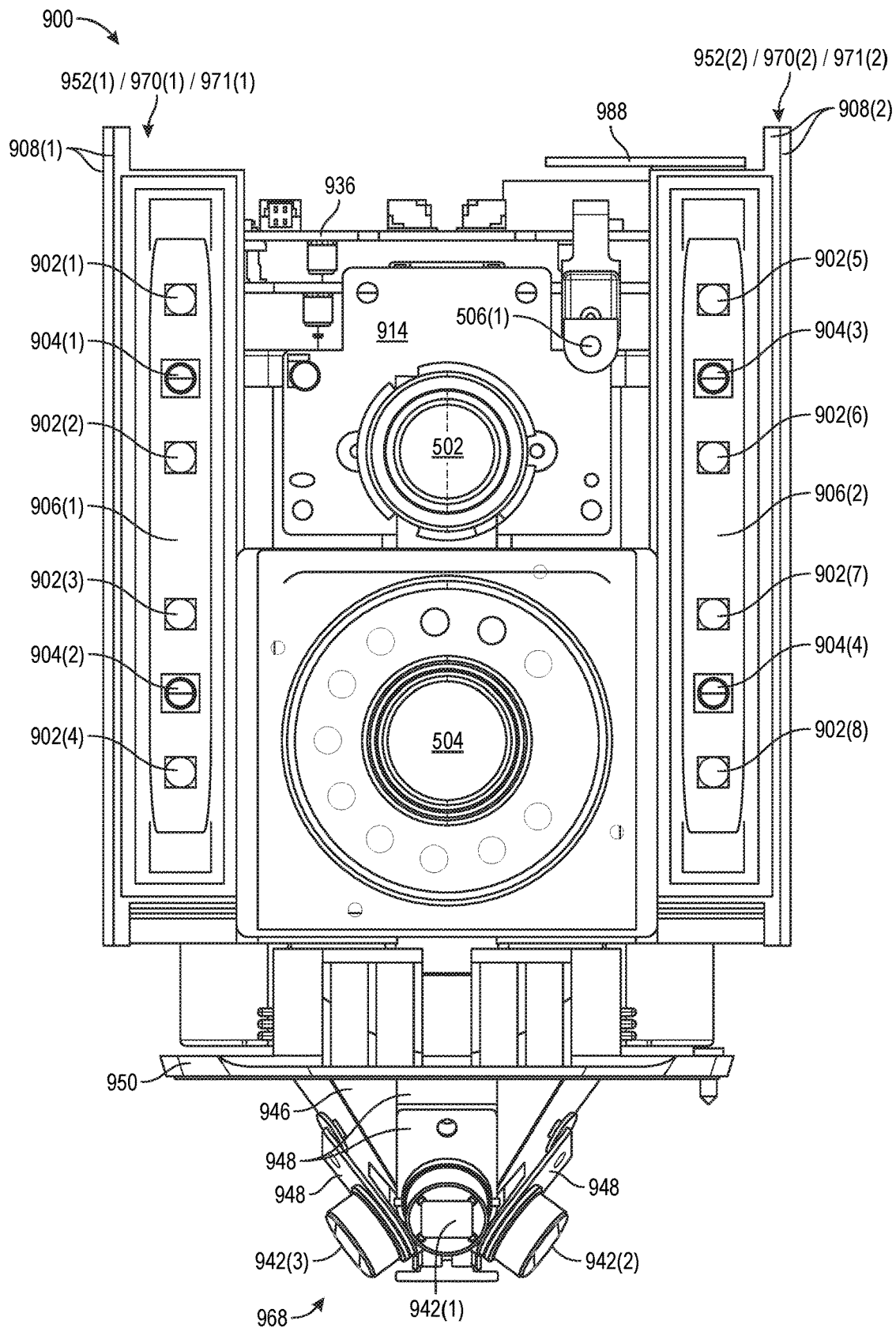
FIG. 11 is a front view showing the internal components of the security device of FIGS. 4-9.
Figure 12:
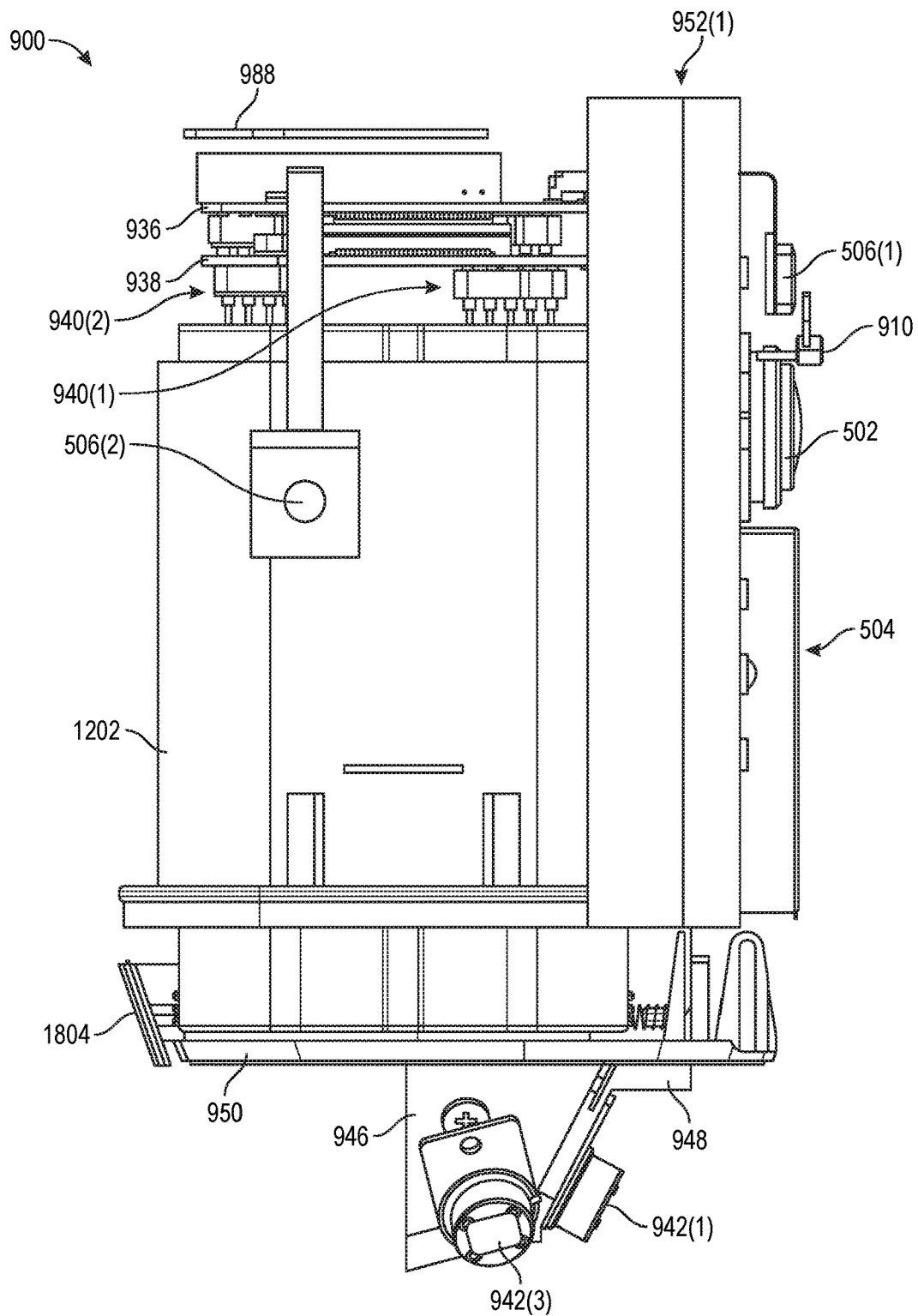
FIG. 12 is a left side view showing the internal components of the security device of FIGS. 4-9.
Figure 13:
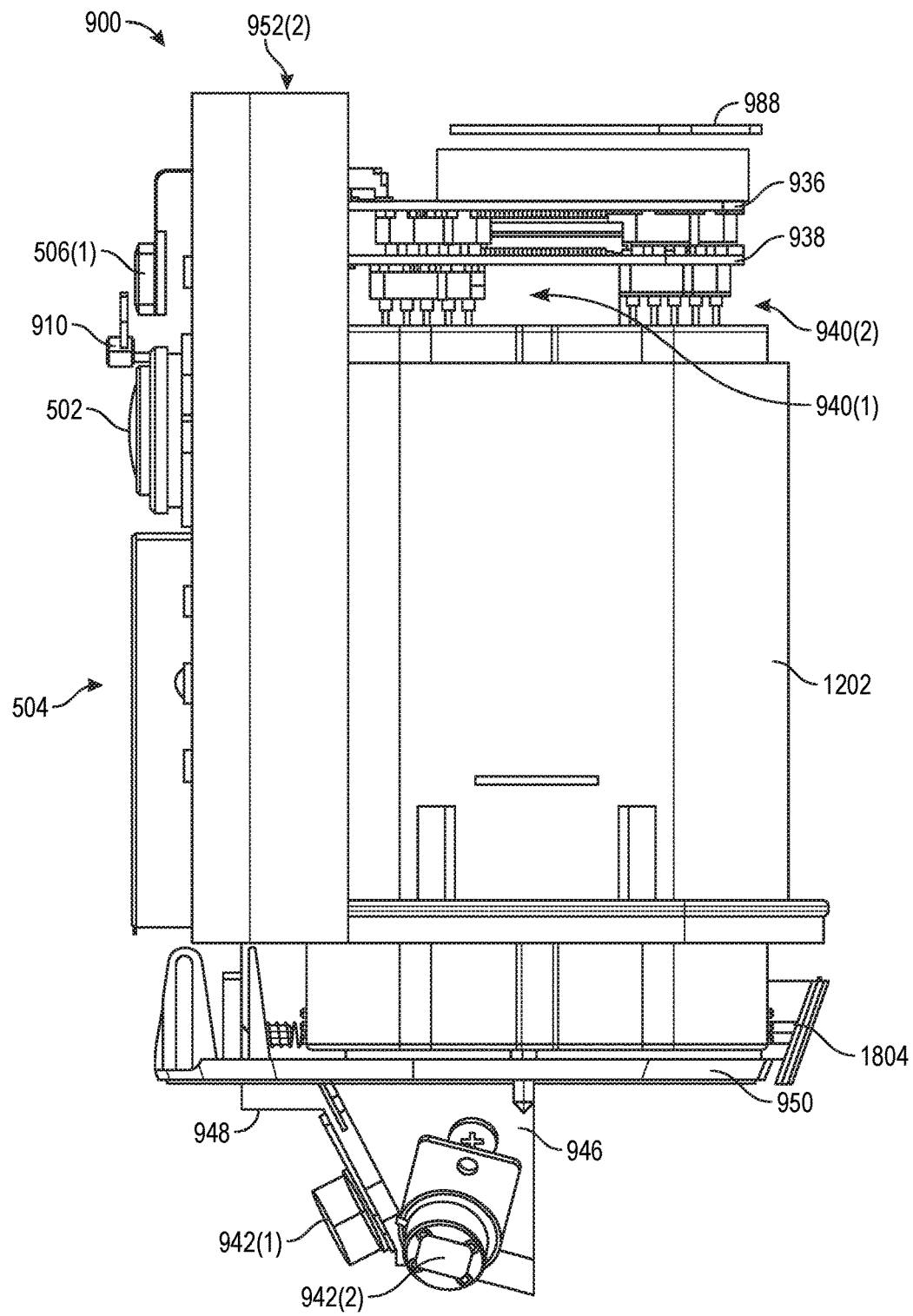
FIG. 13 is a right side view showing the internal components of the security device of FIGS. 4-9.
Figure 14:
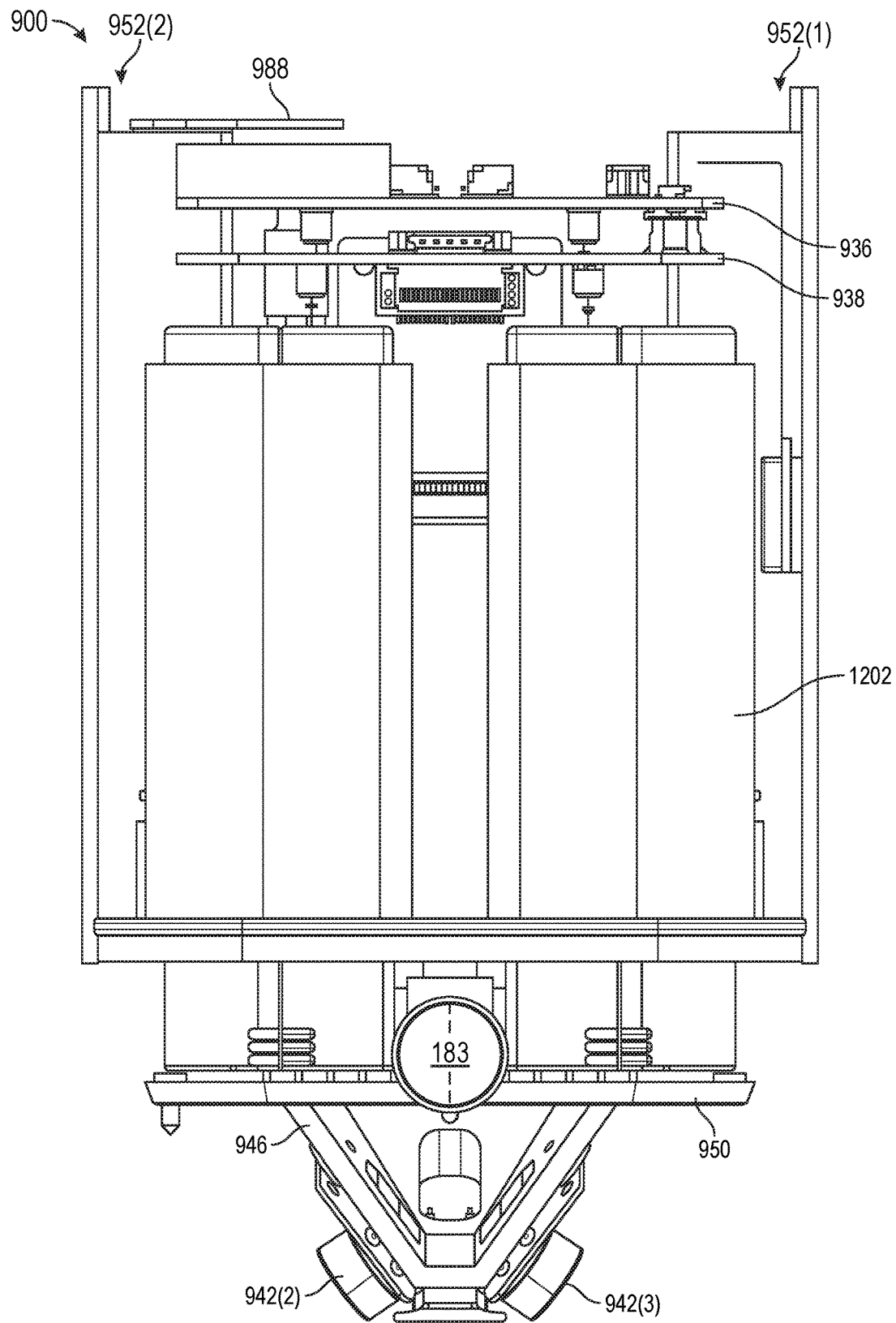
FIG. 14 is a rear view showing the internal components of the security device of FIGS. 4-9.
Figure 15:
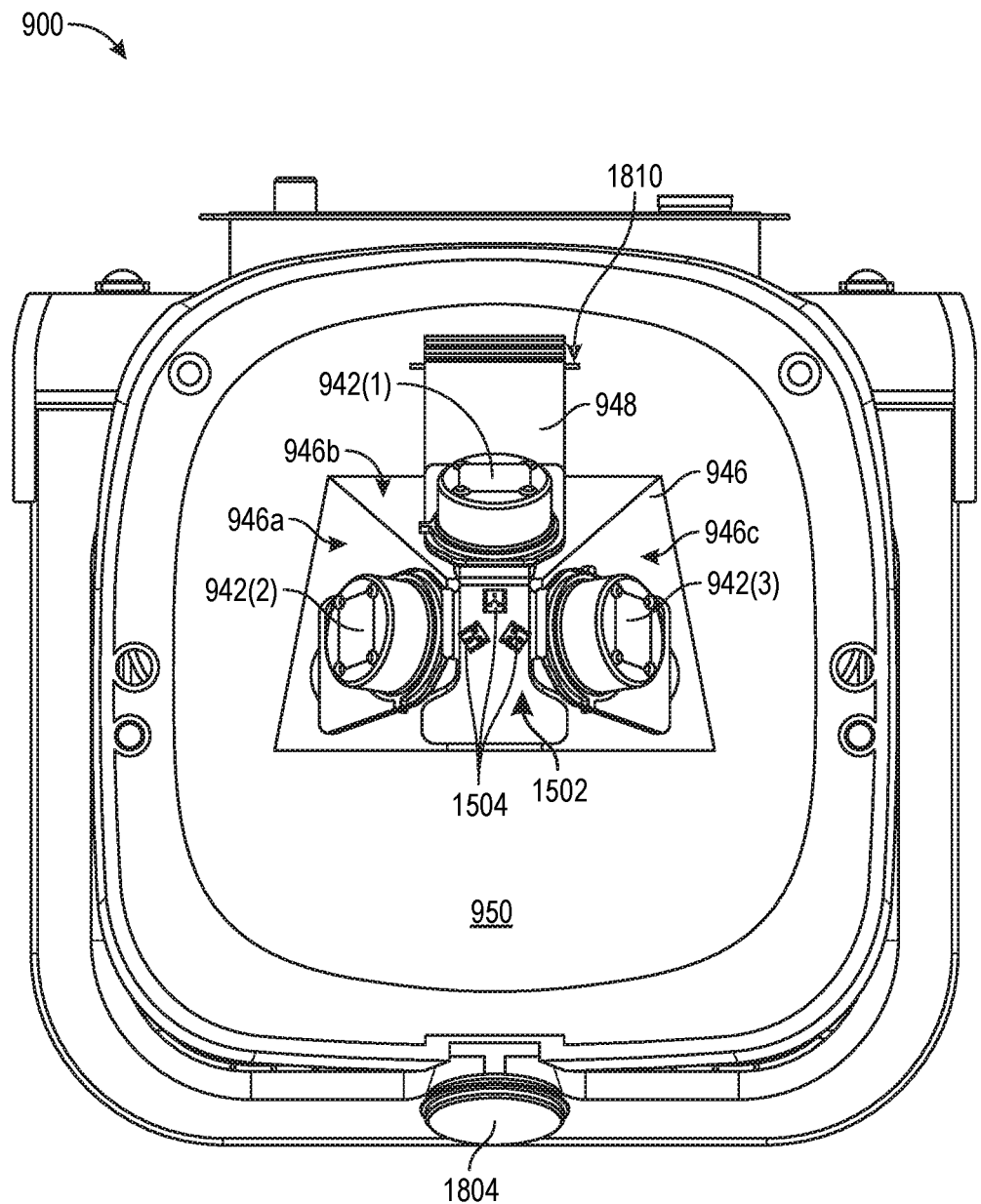
FIG. 15 is a bottom view showing the internal components of the security device of FIGS. 4-9.

FIG. 9 is a front perspective view showing internal components 900 of the security device 400 of FIGS. 4-8. FIG. 10 is a front perspective view showing a removable battery casing 912 of the security device 400 of FIGS. 4-8. FIG. 11 is a front view showing the internal components 900 of the security device 400 of FIGS. 4-9. FIG. 12 is a left side view showing the internal components 900 of the security device 400 of FIGS. 4-9. FIG. 13 is a right side view showing the internal components 900 of the security device 400 of FIGS. 4-9. FIG. 14 is a rear view showing the internal components 900 of the security device 400 of FIGS. 4-9. FIG. 15 is a bottom view showing the internal components 900 of the security device 400 of FIGS. 4-9. FIGS. 4-15 are best viewed together with the following description.

FIG. 9 shows a main printed circuit board 936 of the security device 400. The main printed circuit board 936 may be configured with one or more components of the security device 400, including one or more of: a processor 962, which may be similar to the processor 162 of security device 100 of FIGS. 1 and 3, a communication module 980, which may be similar to the communication module 180 of the security device 100, a volatile memory (not shown, but may be similar to the volatile memory 176 of the security device 100), a non-volatile memory (not shown but may be similar to the non-volatile memory 178 of the security device 100), and an audio CODEC (not shown but may be similar to the CODEC 166 of the security device 100). The main printed circuit board 936, in the security device 400, may represent at least part of the control circuit 107 of FIG. 1. The main printed circuit board 936 is positioned within the housing 402 toward the top. An antenna 988 may be similar to the antenna 188 of the security device 100 and is positioned within the housing 402 above and parallel to the main printed circuit board 936. A power printed circuit board 938 is positioned parallel to and beneath the main printed circuit board 936. The power printed circuit board 938 electrically couples with each of two removable battery casings 912(1) and 912(2) that may represent the power source 105 of FIG. 1 and contain the batteries 160(1) and 160(2), respectively. The power printed circuit board 938 is also configured with circuitry of a power manager 961 that may be similar to the power manager 161 of the security device 100.

The camera 502 is supported by a camera printed circuit board 914 and includes a lens 916 and an imaging processor 918 (FIG. 9). The lens 916 may be a lens capable of focusing light into the camera 502 so that clear images may be captured. In certain embodiments, the camera 502 may be used to detect motion within its field of view, as described below. The camera printed circuit board 914 is also configured with a photosensor 964, which may be similar to the photosensor 164 of the security device 100, and a light pipe 910 that allows ambient light to reach the photosensor 964 for detecting ambient light levels.

In certain embodiments, the processor 962 and/or the imaging processor 918 may selectively switch the camera 502 between capturing visible light images and capturing infrared light images. When the photosensor 964 detects a low level of ambient light (e.g., at a level that impedes the performance of the camera 502 in the visible spectrum), the processor 962 and/or the imaging processor 918 may activate an infrared illumination source 970, which may be similar to the infrared illumination source 170 of the security device 100, to shine infrared light into a monitored area 401 (e.g., the environment in front of the security device 400 (FIG. 4, which may be similar to the monitored area 101 of the security device 100)), and, in some embodiments, to switch the camera 502 to capture infrared light reflected, refracted, or scattered by objects within the field of view of the camera 502. In some embodiments, switching the camera 502 to capture infrared light may comprise switching an infrared cut filter (not shown) to enable infrared light to reach the image sensor of the camera 502. Operation of the infrared illumination source 970 and the visible illumination source 971 may be controlled by the processor 962. This process provides the security device 400 with the night vision functionality mentioned above. In alternative embodiments, each pixel of the camera 502 may include red, green, blue, and infrared sensors such that the camera 502 is configured to capture images using either or both of visible light and infrared light without the need for an infrared cut filter or other hardware to switch between daytime and nighttime modes.

With continued reference to FIG. 9, a speaker 504, which may be similar to the speaker 108 of the security device 100 of FIG. 1, is positioned within the central opening 416 of the front wall 404, below the camera 502, and behind the lower grille 420 (FIG. 4). The lower grille 420 is preferably configured such that sounds from the speaker 504 are clearly audible in the monitored area 401 (FIG. 4) around the security device 400. In certain embodiments, the lower grille 420 includes a plurality of perforations (not shown) that allows sound from the speaker 504 to pass therethrough. The lower grille 420 is preferably durable and weatherproof, and may comprise a plastic or metal material, for example. The speaker 504 may be recessed within the security device 400 such that a space in front of the speaker 504 forms a speaker chamber 920 shaped to amplify sounds made by the speaker 504 so that they are clearly audible in the monitored area 401 (e.g., the area around the security device 400). The speaker chamber 920 may include a peripheral wall portion 922 extending outward from and/or around the speaker 504 toward the lower grille 420 of the housing 402.

The upper shield 418 and/or the lower grille 420 (FIG. 4) may abut an underlying backing plate 924 (FIG. 5), which may be integral with the housing 402 or may be a separate piece. The backing plate 924, which may be opaque, includes a first opening 926 corresponding to the location of the camera 502, and a second opening 928 below the first opening 926 and corresponding to the location of the speaker 504.

In the disclosed embodiment, the security device 400 includes two microphones 506(1) and 506(2), which may be similar to the microphones 106 of the security device 100 of FIG. 1. The first microphone 506(1) (FIG. 9) is positioned at the front of the security device 400 and a first microphone aperture 930 within the upper shield 418 (FIG. 4) and a second microphone aperture 931 within the backing plate 924 (FIG. 5) are aligned therewith to facilitate the passage of sound from the monitored area 401 through the upper shield 418 and the backing plate 924 to the first microphone 506(1). The second microphone 506(2) (FIG. 12) is positioned at the left side of the security device 400 and a third microphone aperture 933 (FIG. 7) in the left sidewall 410 of the housing 402 is aligned therewith to facilitate the passage of sound from the monitored area 401 through the left sidewall 410 to the second microphone 506(2).

By spacing the microphones 506(1) and 506(2) apart and positioning them on different sides of the security device 400, the security device 400 may advantageously provide noise cancelling and/or echo cancelling for clearer audio. The illustrated embodiment is, however, just one example and is not limiting. Alternative embodiments may include only one microphone 506, or may include two or more microphones 506 in locations other than as illustrated herein.

As shown in FIG. 9, an illumination source 952, which may be similar to the illumination source 102 of the security device 100 of FIGS. 1 and 3, is divided into two parts (numbered 952(1) and 952(2)), where the illumination source 952(1) is positioned on a first side of the camera 502, and the illumination source 952(2) is positioned on a second side of the camera 502. The illumination source 952(1) is formed as a vertical column positioned at a front right vertical corner of the security device 400. The illumination source 952(2) is similarly formed and positioned at a front left vertical corner of the security device 400. The illumination sources 952(1) and 952(2) are substantially identical. Accordingly, only the illumination source 952(1) will be described in detail, and it may be assumed that the illumination source 952(2) is similarly described.

In the illustrated embodiment, the illumination source 952(1) has an illumination printed circuit board 906 thermally coupled to a heatsink 908. The illumination printed circuit board 906 is configured with one or more visible light emitting elements 902 and one or more infrared light emitting elements 904. The visible light emitting elements 902 (of both the illumination source 952(1) and the illumination source 952(2)) are collectively referred to as a visible illumination source 971 (which may be similar to the visible illumination source 171 of the security device 100), and the infrared light emitting elements 904 (of both the illumination source 952(1) and the illumination source 952(2)) are collectively referred to as an infrared illumination source 970 (which may be similar to the infrared illumination source 170 of the security device 100). Thus, the infrared illumination source 970 and the visible illumination source 971 are both formed of two parts located on either side of the camera 502. In certain embodiments, the visible light emitting elements 902 are light emitting diodes (LEDs) that emit visible light. In certain embodiments, the infrared light emitting elements 904 are light emitting diodes (LEDs) that emit infrared light. The heatsink 908 is sized and shaped to form a portion of the external front right vertical corner of the security device 400 and operates to conduct heat generated by the light emitting elements 902, 904 away from the illumination printed circuit board 906.

The visible light emitting elements 902 and the infrared light emitting elements 904 are positioned behind right and left front corner shields 932, 934 (FIGS. 4 and 5). The corner shields 932, 934 may be formed of a material that is transparent to light within both the visible spectrum and the infrared spectrum. In certain embodiments, the corner shields 932, 934 are formed of a clear plastic (e.g., polycarbonate) or glass. The corner shields 932, 934, therefore, do not significantly interfere with transmission of light from the illumination source 952 into the monitored area 401. As described above, the infrared illumination source 970 (in conjunction with operation of the camera 502) facilitates night vision functionality of the security device 400.

In the embodiment shown in FIG. 9, the infrared illumination source 970 has four infrared light emitting elements 904 (two on either side of the camera 502) and the visible illumination source 971 has eight visible light emitting elements 902 (four on either side of the camera 502). However, one or both of the infrared illumination source 970 and the visible illumination source 971 may have more or fewer light emitting elements without departing from the scope of the present embodiments. Similarly, the illumination source 952 may be implemented with more or fewer illumination printed circuit boards 906, which may be positioned elsewhere within the security device 400, without departing from the scope of the present embodiments.

FIG. 10 shows one of the removable battery casings 912 in further example detail. In the illustrated embodiment, the removable battery casings 912(1) and 912(2) are substantially identical, but in alternative embodiments they may be different from one another in one or more respects. A top surface 1002 of the removable battery casing 912 is configured with a socket 1004 that couples with a plug 940 (FIGS. 12 and 13) of the power printed circuit board 938 to conduct electrical power between the removable battery casing 912 and the power manager 961. The top surface 1002 is also configured with a charging port 1006 for receiving power to charge the batteries within the removable battery casing 912. The removable battery casing 912 may contain one or more battery cells. In certain embodiments, and as shown in FIG. 10, the charging port 1006 is a micro-USB socket and the removable battery casing 912 may be charged from readily available power sources, such as through a connection to a USB port on a computer or an AC wall adapter (not shown). The charging port 1006 may have other configurations and/or may be positioned elsewhere on the removable battery casing 912 without departing from the scope of the present embodiments.

In the illustrated embodiment, a motion sensor 968 (FIGS. 9 and 11) is positioned in a lower portion of the security device 400. The motion sensor 968, which may be similar to or the same as the motion sensor 168 of the security device 100, includes three passive infrared (PIR) sensors 942(1)-(3) positioned behind a motion sensor cover 944 (FIGS. 4-7). The motion sensor cover 944 is preferably transparent to infrared light and couples with the tapered lower portion 414 of the housing 402. In some embodiments, one or more of the PIR sensors 942 may comprise a pyroelectric infrared sensor. The motion sensor 968 may have more or fewer of the PIR sensors 942 without departing from the scope of the present embodiments. With reference to FIG. 15, the PIR sensors 942 are arranged about three outward facing surfaces 946a, 946b, 946c, of a motion sensor holder 946. Particularly, the surface 946b positions the first PIR sensor 942(1) to point forward, the surface 946a positions the second PIR sensor 942(2) to point to the right, and the surface 946c positions the third PIR sensor 942(3) to point to the left, from the security device 400. As described in further detail below with respect to FIG. 16, the PIR sensors 942 cooperate to cover an angle of approximately 270° around the front and sides of the security device 400. With reference to FIGS. 11-14, the surfaces 946a, 946b, and 946c of the motion sensor holder 946 further point each of the PIR sensors 942 at an angle downward from horizontal. A PIR flex circuit 948 (FIGS. 11-13) operably connects each of the PIR sensors 942 to the camera printed circuit board 914.

The motion sensor cover 944 and the tapered lower portion 414 (FIG. 6) couple with a plate 950 (FIG. 12) to form a battery access door 440 (FIG. 22) within the housing 402 that provides access to the removable battery casings 912. The motion sensor holder 946 couples with a lower surface of the plate 950 (FIGS. 11-15 and 17) and is positioned within the tapered lower portion 414 to face the motion sensor cover 944 (FIG. 6). This configuration is well suited to a typical use case for the security device 400, since floodlights are typically located above the head level of a person of average height. A person (or other object) moving at ground level within the monitored area 401 is thus likely to be well within the field of view of the motion sensor 968.

When motion is detected by the motion sensor 968, output signals from one or more of the PIR sensors 942 are received by the processor 962, and a process similar to (or the same as) the process 200 of FIG. 2 may be initiated. In some embodiments, the camera 502 may also be used for detecting motion within the monitored area 401, where video frames captured by the camera 502 are compared to detect motion within the monitored area 401. For example, the processor 962 (and/or a separate camera processor) may receive video frames from the camera 502, compare pixel differences between successive frames, and, if the pixel differences are substantial (such as being greater than one or more threshold values), determine that the pixel differences are indicative of motion within the field of view of the camera 502. The processor 962 may then initiate a process similar to (or the same as) the process 200.

With reference to FIG. 5, the tapered lower portion 414 includes an opening 415 to receive the motion sensor cover 944, which is convexly shaped to cover and close the lower end opening 415 of the tapered lower portion 414. The motion sensor cover 944 may include a Fresnel lens 442 that is configured to focus and concentrate incoming infrared light onto the PIR sensors 942, thereby enhancing the effectiveness and/or sensitivity of the motion sensor 968. In alternative embodiments, the motion sensor cover 944 may not include a Fresnel lens.

Figure 16:
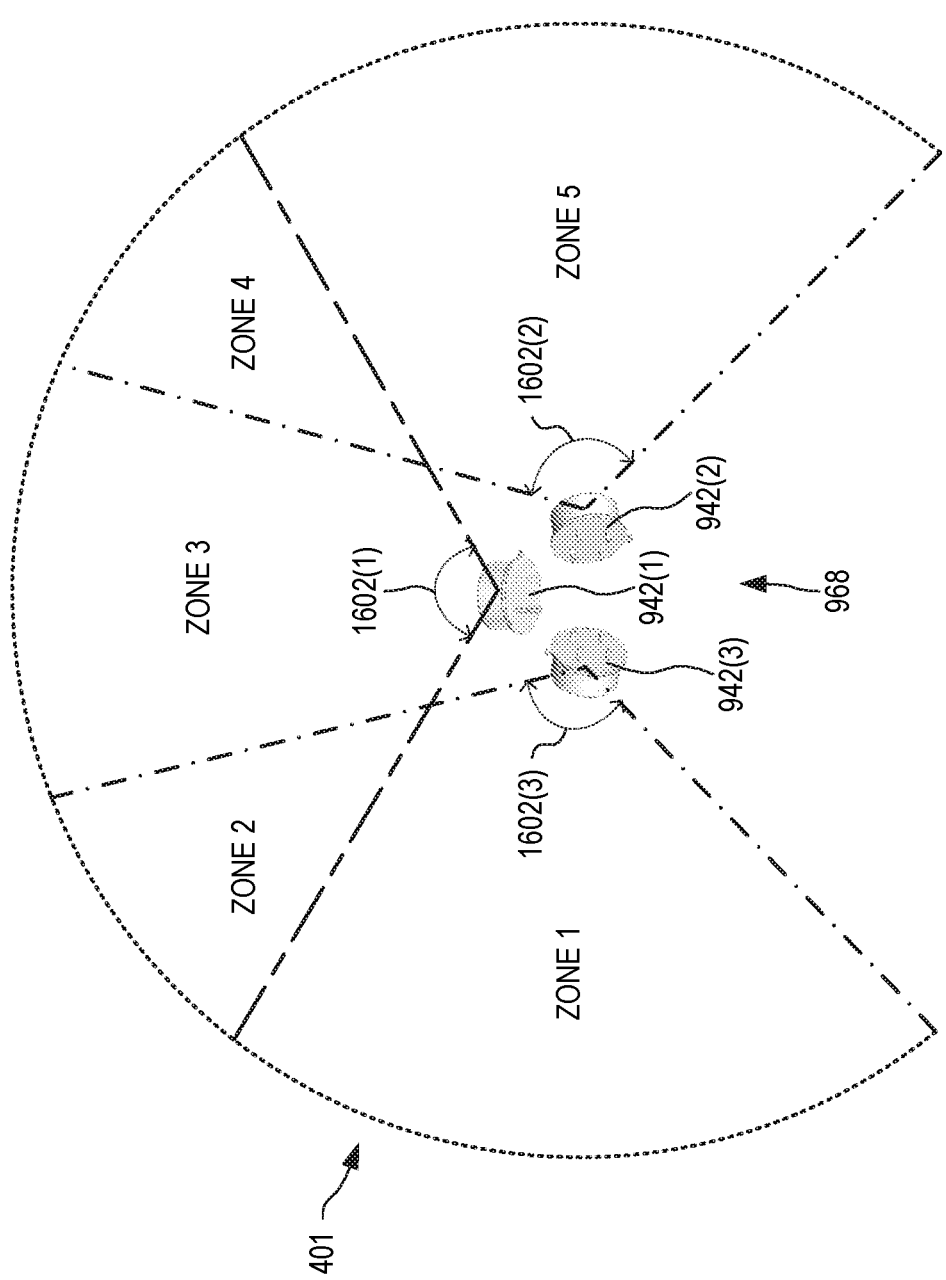
FIG. 16 is a top view of the passive infrared sensors of the security device of FIGS. 4-9, illustrating example movement detection zones.

FIG. 16 shows example movement detection zones within the monitored area 401 where motion is detectable by embodiments of the present security devices. In particular, FIG. 16 shows a top view of each of the PIR sensors 942(1)-(3) and a corresponding field of view 1602(1)-(3) thereof. As shown, each of the fields of view 1602 covers an angle of about 120° extending from each respective one of the PIR sensors 942; however, the angle of each field of view 1602 may be increased or decreased as desired. Motion detection zone 1 is a portion of the monitored area 401 where motion is detectable only by the third PIR sensor 942(3). Motion detection zone 2 is a portion of the monitored area 401 where motion is detectable by both the third PIR sensor 942(3) and the first PIR sensor 942(1). Motion detection zone 3 is a portion of the monitored area 401 where motion is detectable by only the first PIR sensor 942(1). Motion detection zone 4 is a portion of the monitored area 401 where motion is detectable by both the first PIR sensor 942(1) and the second PIR sensor 942(2). Motion detection zone 5 is a portion of the monitored area 401 where motion is detectable by only the second PIR sensor 942(2). In some embodiments, the security device 400 may be configured for determining a direction that an object is moving based upon timing of triggered motion detection zones (1-5). The security device 400 may be configured by the user (e.g., using the client device 114 of FIG. 1) to ignore detected motion in one or more motion detection zones (1-5). For example, where the security device 400 is positioned such that motion detection zone 1 is frequently falsely triggered (e.g., by movement in a neighbor property, a heat vent, etc.), the user may interact with a mobile application running on the client device 114 to disable triggering by motion detection zone 1.

Figure 17:
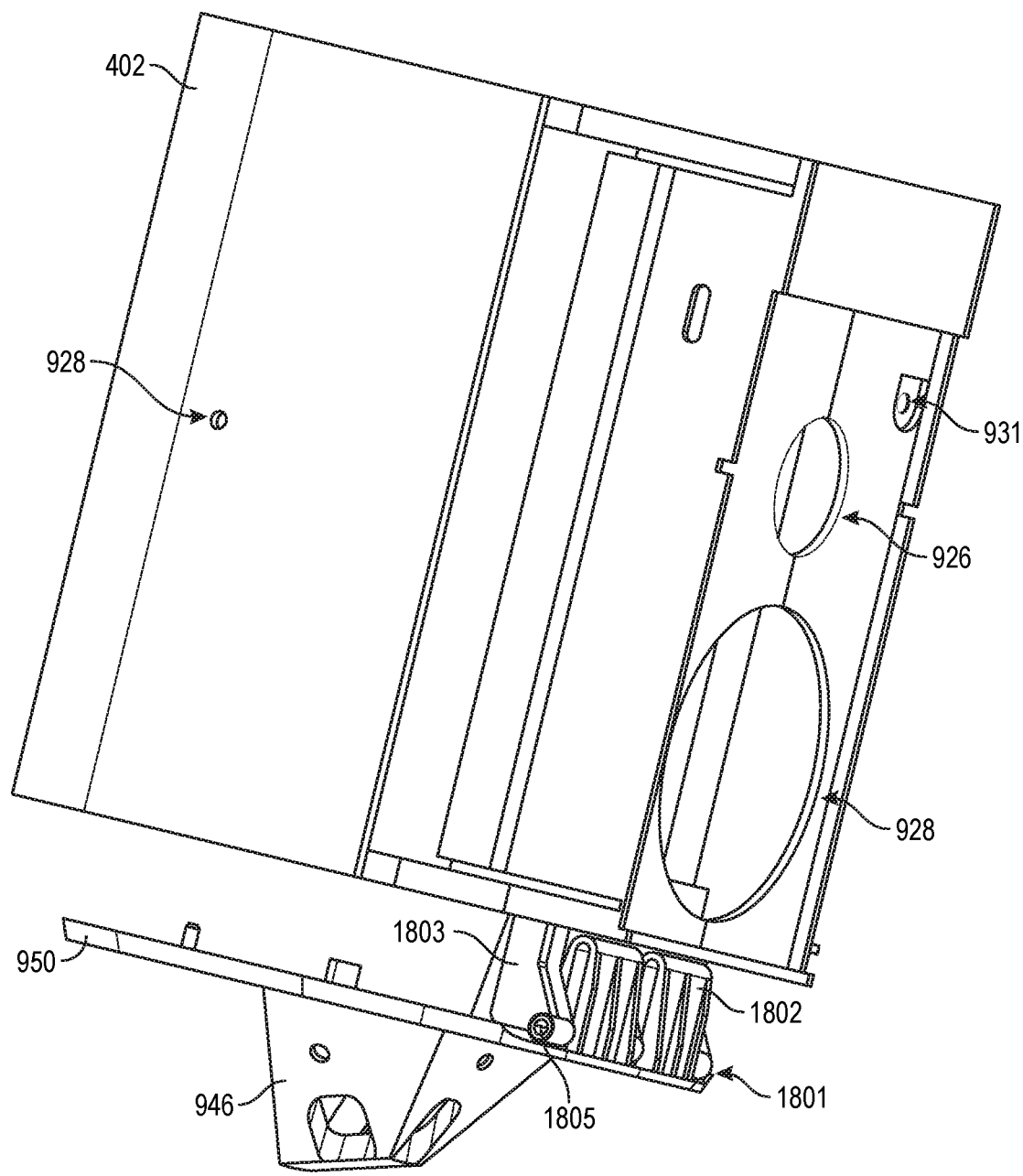
FIG. 17 is a front perspective view showing structural components of the security device of FIGS. 4-9 that cooperate to form a battery access door.
Figure 18:
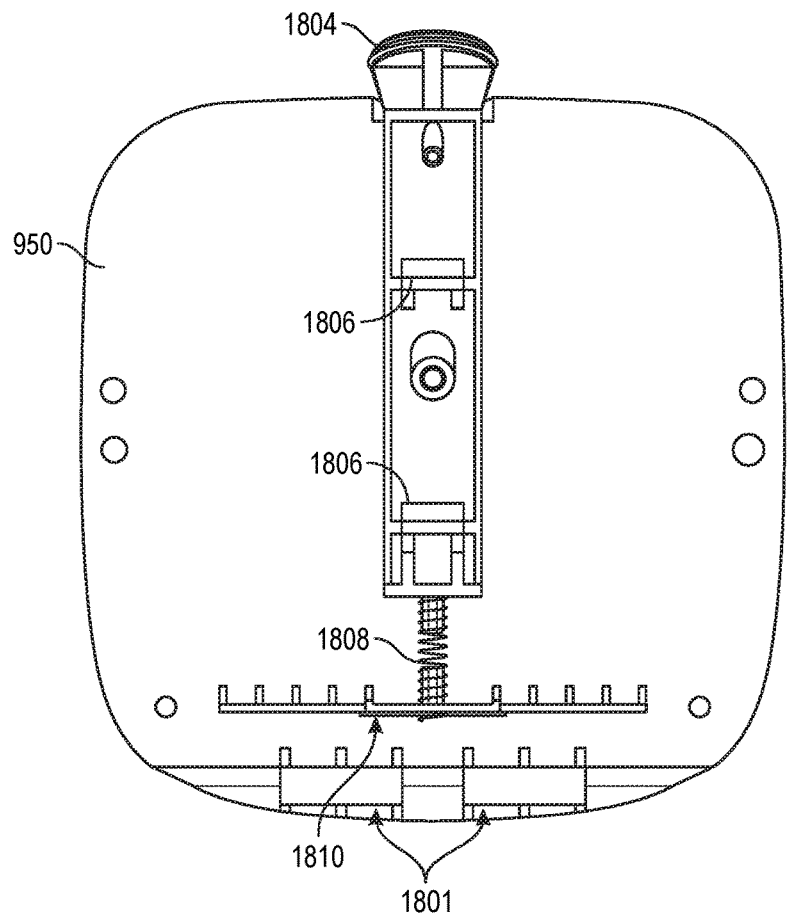
FIG. 18 is a top view of the battery access door of FIG. 17.
Figure 19:
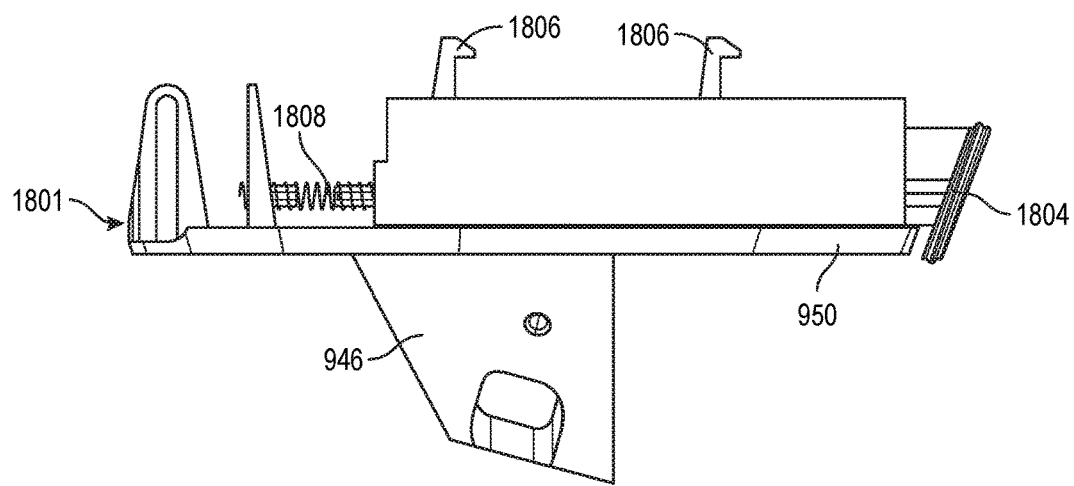
FIG. 19 is a right side view of the battery access door of FIGS. 17 and 18.
Figure 20:
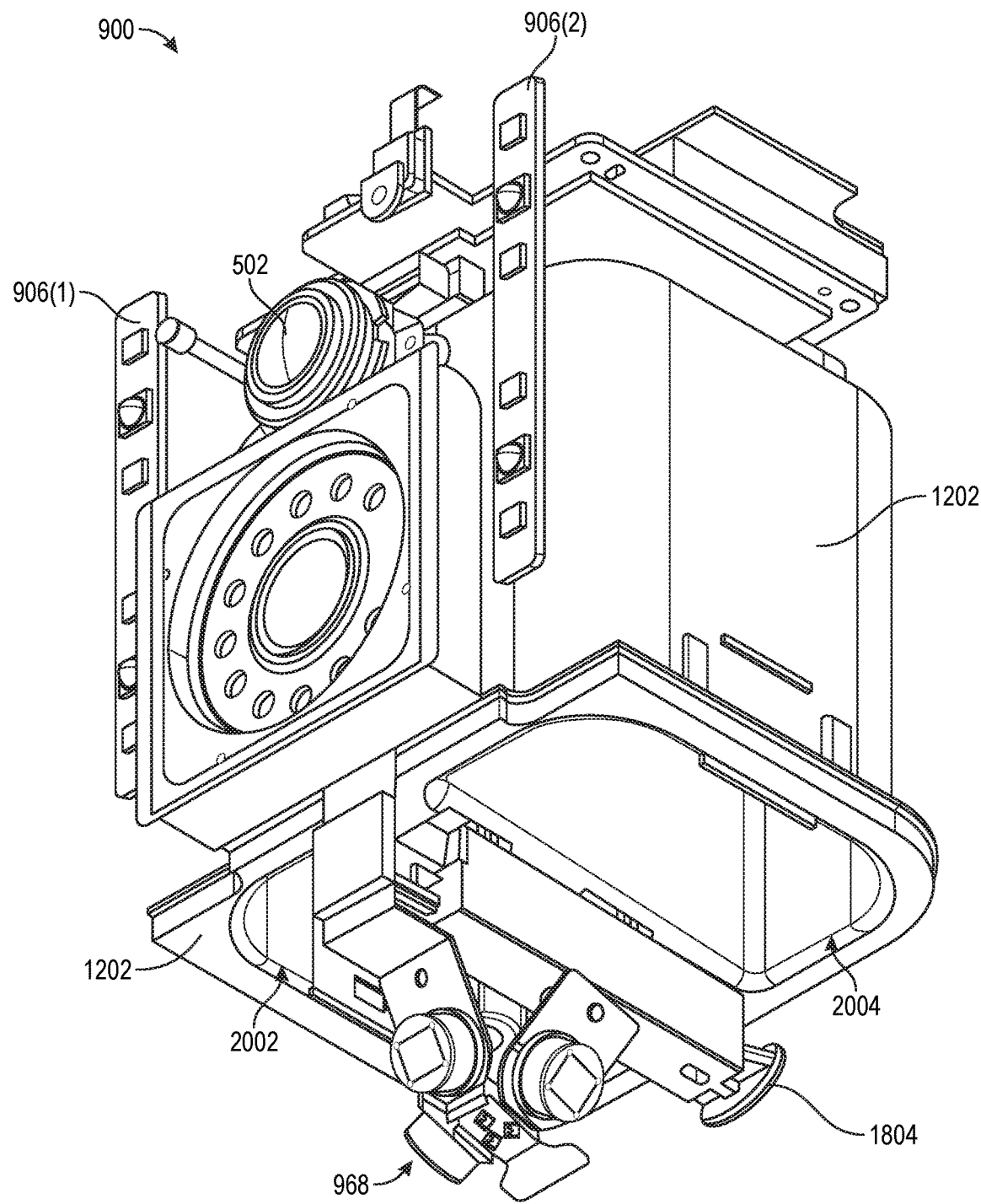
FIG. 20 is a lower perspective view of the internal components of the security device of FIGS. 4-9, showing left and right battery slots without the removable battery casings.
Figure 21:
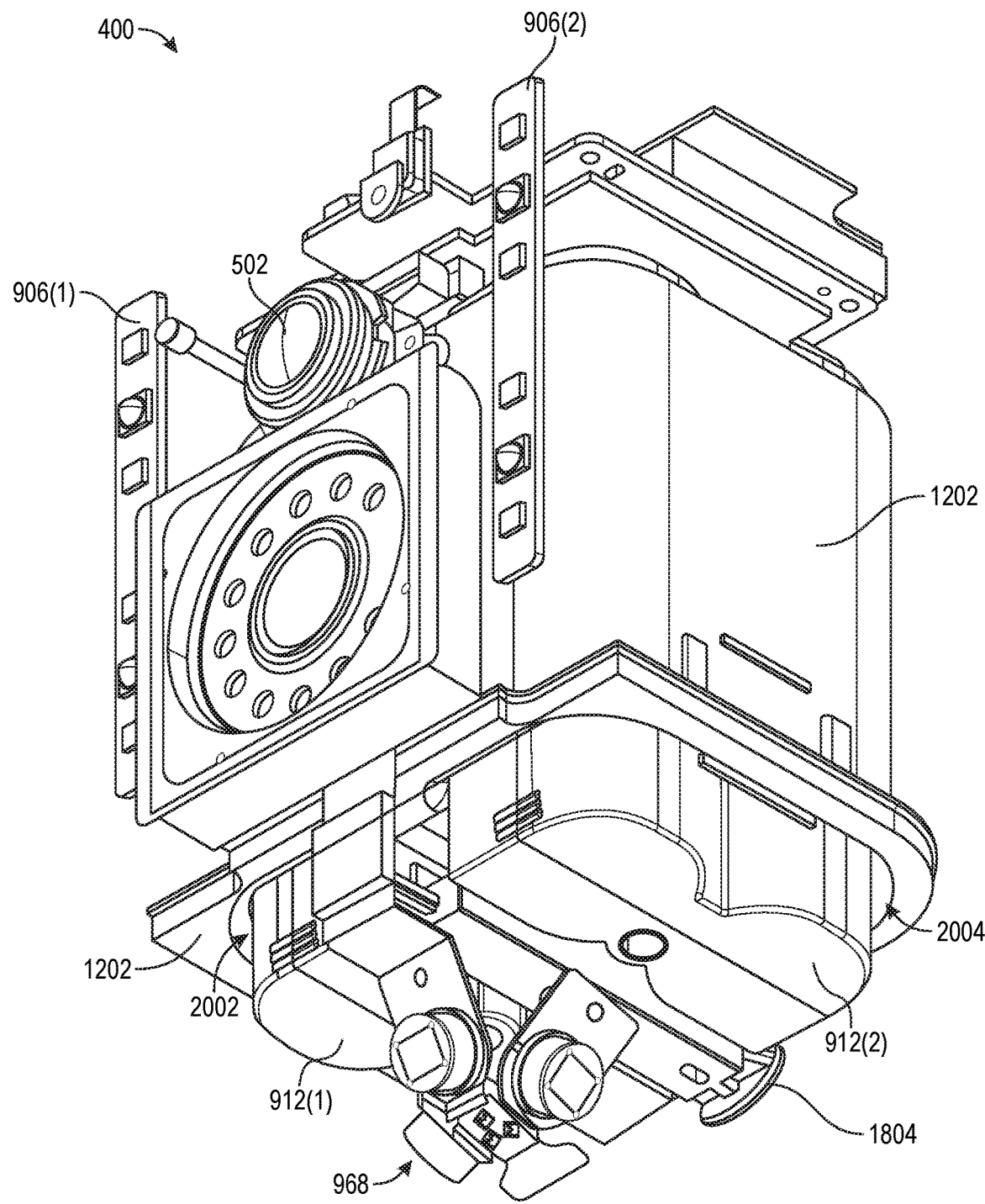
FIG. 21 is a lower perspective view showing the removable battery casings positioned within the left and right battery slots of FIG. 20.

FIG. 17 is a perspective view showing structural components of the security device 400 of FIGS. 4-9 that cooperate to form the battery access door 440. As described above, the battery access door 440 comprises the plate 950, the motion sensor cover 944 (FIGS. 5-7), and the tapered lower portion 414. With reference to FIG. 17, a hinge 1801 pivotably couples the plate 950 to the housing 402. The hinge 1801 comprises a first hinge portion 1802 at a front edge of the plate 950, a second hinge portion 1803 at a lower front edge of the housing 402, and a hinge pin 1805 received through the mated first and second hinge portions 1802, 1803. FIG. 18 is a top view of the plate 950 showing the first hinge portion 1802, a release button 1804, a latch mechanism 1806, and a latch spring 1808. FIG. 19 is a right side view of the battery access door 440 of FIGS. 17 and 18 illustrating the first hinge portion 1802, the release button 1804, the latch mechanism 1806, the latch spring 1808, and the motion sensor holder 946. FIG. 20 is a front perspective view showing left and right battery slots 2002, 2004 formed by an internal battery cover 1202 of the security device 400 of FIGS. 4-9. FIG. 21 shows the removable battery casings 912 positioned within the battery slots 2002, 2004. FIGS. 17-21 are best viewed together with the following description.

With reference to FIG. 17, the hinge 1801 allows the battery access door 440 to open without detaching from the housing 402. More particularly, as shown in FIGS. 11, 12, and 13, the PIR flex circuit 948 passes through an aperture 1810 (FIG. 15) in the plate 950 close to the hinge 1801 and thus the PIR flex circuit 948 does not restrict opening of the battery access door 440, and maintains connectivity of the motion sensor 968 to the processor 962 when the battery access door 440 is opened. The latch mechanism 1806 and the latch spring 1808 cooperate to keep the battery access door 440 closed by engaging with the internal battery cover 1202, which is secured within the housing 402. For example, in some embodiments, the internal battery cover 1202 may include one or more bearing surfaces or detents (not shown) with which the latch mechanism 1806 may engage to keep the battery access door 440 closed.

Figure 22:
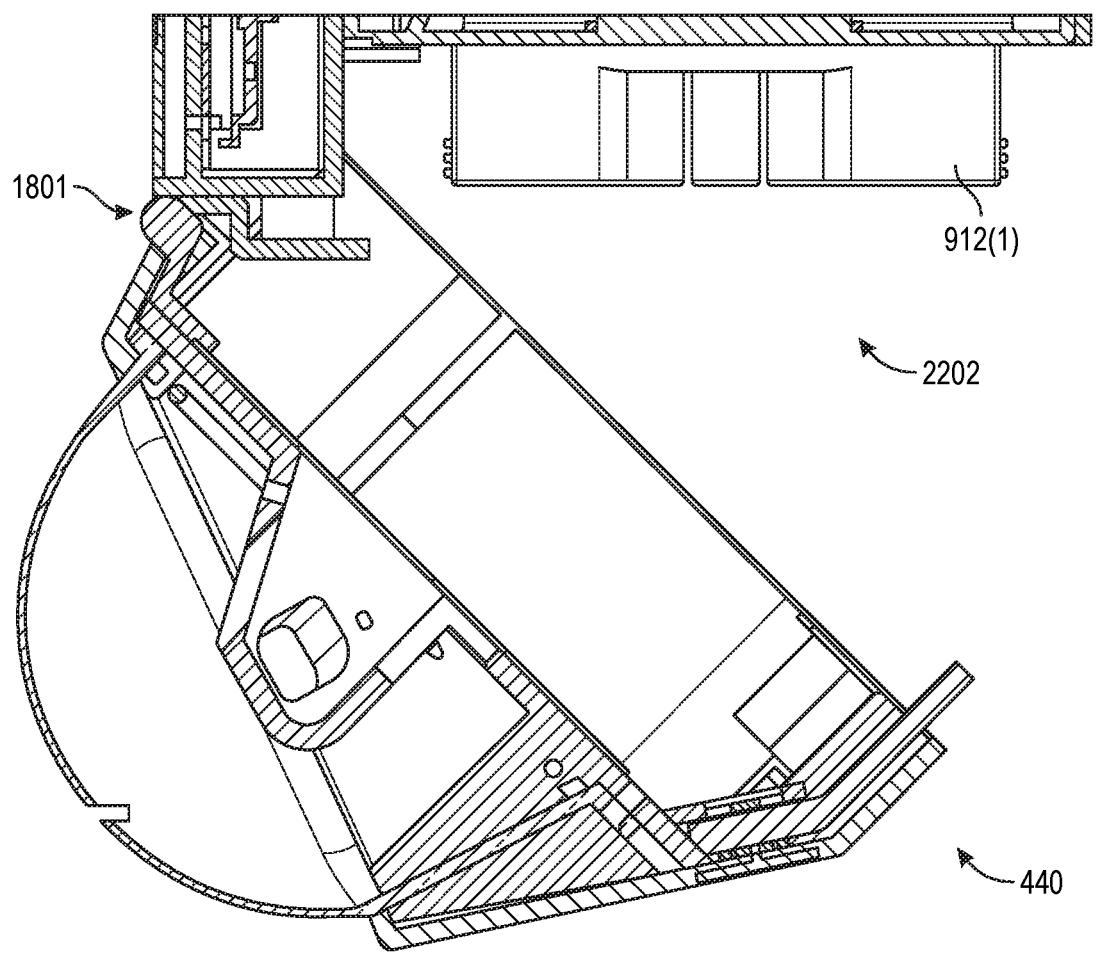
FIGS. 22-24 are right side cross-sectional views of the lower end of the security device of FIGS. 4-9, illustrating opening of the battery access door of FIGS. 17-19 to access and remove the removable battery casings, in one example of operation.
Figure 23:
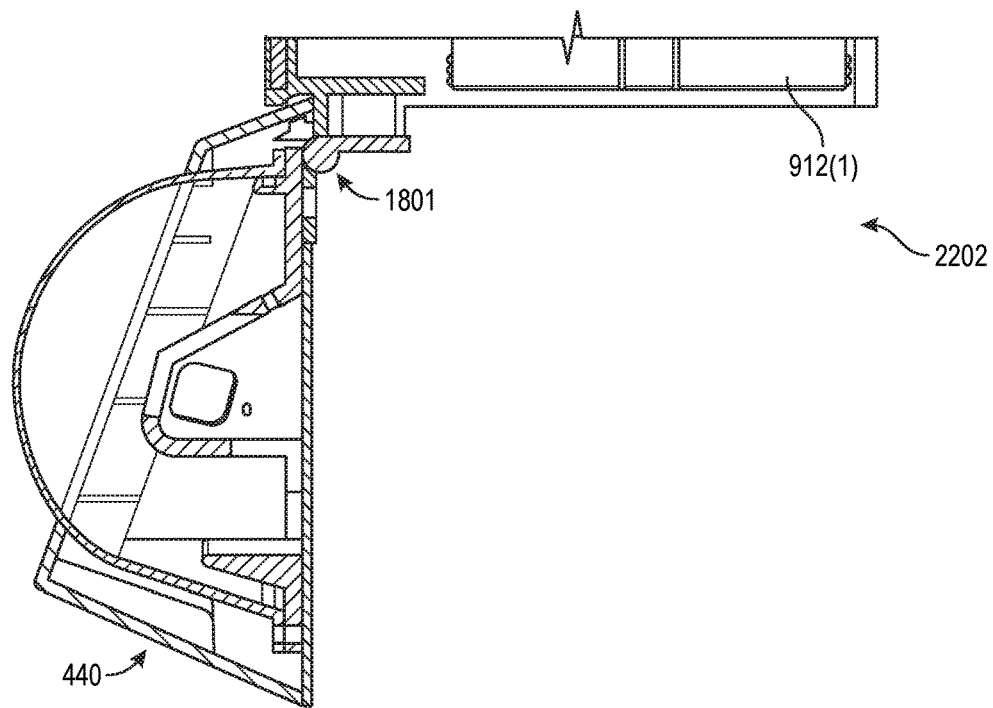
Figure 24:
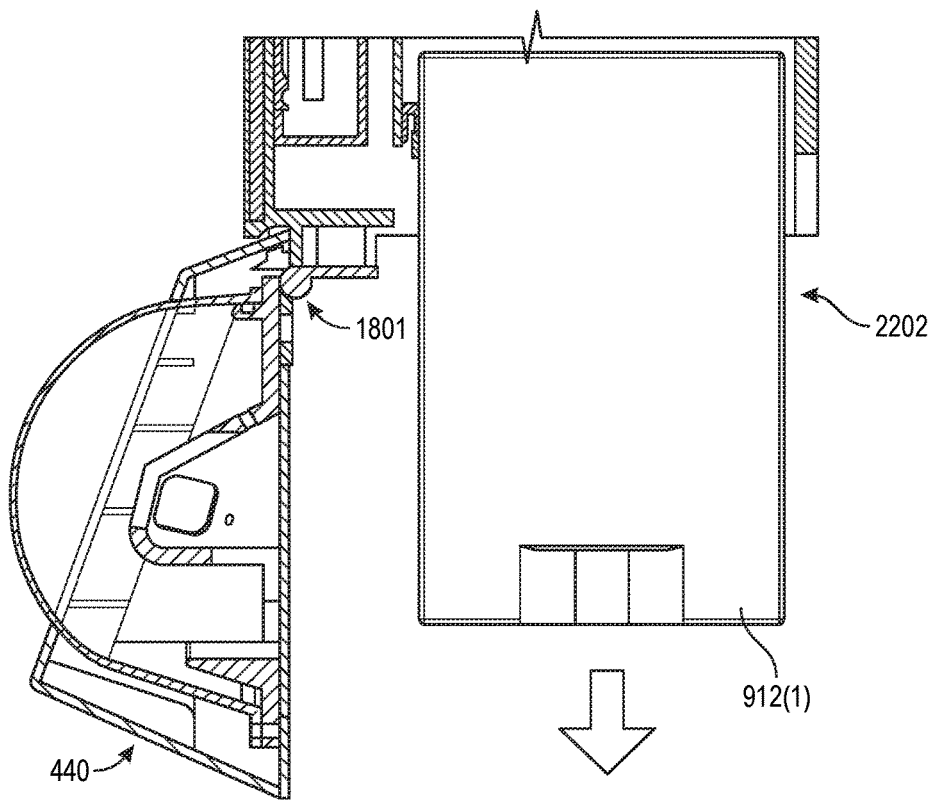

FIG. 22 illustrates the battery access door 440 of FIGS. 17-19 partially opened to access the removable battery casings 912 in one example of operation. FIG. 23 illustrates the battery access door 440 of FIGS. 17-19 fully opened to access the removable battery casings 912. FIG. 24 illustrates removal of the removable battery casing 912(1) through the access opening formed by the fully open battery access door 440 of FIGS. 17-19.

As shown in FIGS. 23 and 24, the battery access door 440 may pivot through at least ninety degrees with respect to the internal battery cover 1202 to create an opening 2202 that provides access to the removable battery casings 912. Both of the removable battery casings 912 may be removed and inserted through the opening 2202 when the battery access door 440 is opened by pressing the release button 1804 (FIG. 12).

With reference to FIGS. 1 and 4-15, at certain times, the security device 100/400 may be unable to stream audio and/or video information to any of the client device 114, the storage device 116, and the server 118. For example, during a power outage, the user network 110 is likely to be unavailable, making it impossible for the security device 100 to stream audio and/or video information to the network 112, and thereby to any of the client device 114, the storage device 116, or the server 118. Advantageously, however, even when unable to communicate with any other devices, the security device 100/400 may still operate, as described above, to sense motion and capture and record audio and/or video information, which it stores locally, such as in the additional storage 312 for example. When communication with any one or more of the client device 114, the storage device 116, and the server 118 is again possible (e.g., when the user network 110 becomes available as AC mains power is restored), the security device 100/400 may upload the stored audio and/or video information from the additional storage 312 to one or more of the client device 114, the storage device 116, and/or the server 118.

With reference to FIG. 3, in some embodiments the power manager 961 may selectively draw power from the batteries within the removable battery casings 912, switching between them as they become empty of power. The power manager 961 may monitor (continuously or periodically) one or more of capacity, voltage, and temperature of the batteries within each of the removable battery casings 912, when coupled thereto, and communicate this battery information to the processor 962. Based upon the battery information, the processor 962 may control the power manager 961 to draw power from the batteries within one of the removable battery casings 912. When the battery information indicates that remaining power in the selected removable battery casing 912 is low or exhausted, the processor 962 may control the power manager 961 to draw power from the batteries within the other removable battery casing 912. The processor 962 may determine, based upon the battery information, when any one of the removable battery casings 912 is removed from the security device 400, such as when the removable battery casing 912 is removed for recharging, and thus control the power manager 961 to select the other rechargeable battery casing 912 as the power source. When the battery information indicates that the batteries within one of the removable battery casings 912 have become exhausted of power, the processor 962 may use the communication module 180 to send a notification to the client device 114 (FIG. 1) indicating that the batteries within the removable battery casing 912 are exhausted and should be removed and recharged. In one embodiment, the removable battery casings 912 are uniquely marked (e.g., having different colors or indicia on a bottom surface) and the sent notification indicates which of the removable battery casings 912 should be removed and recharged.

In alternative embodiments, the security device 400 and/or the removable battery casings 912 may include one or more indicators, such as LEDs, that inform the user which of the removable battery casings 912 needs to be removed for recharging. For example, the security device 400 and/or the removable battery casings 912 may include two or more green LEDs, with at least one of the green LEDs corresponding to each removable battery casing 912, for indicating that the batteries within the corresponding removable battery casing 912 hold at least a threshold amount of charge. Similarly, the security device 400 and/or the removable battery casings 912 may include two or more red LEDs, with at least one of the red LEDs corresponding to each removable battery casing 912, for indicating that the batteries within the corresponding removable battery casing 912 are depleted. Similarly, the security device 400 and/or the removable battery casings 912 may include two or more yellow LEDs, with at least one of the yellow LEDs corresponding to each removable battery casing 912, for indicating that the batteries within the corresponding removable battery casing 912 are below the threshold amount of charge, but are not yet depleted.

The power manager 961 may perform one or more other functions without departing from the scope of the present embodiments. For example, where an external power source (e.g., solar power, AC mains electricity, and so on) provides electrical power to the security device 400, the power manager 961 may control delivery of incoming power to recharge the batteries within one or both of the removable battery casings 912 from the external power source.

An input device 413 (FIG. 4) is positioned on the upper wall 412 of the housing 402 such that it is accessible by the user. The input device 413 is for example a button connected to an electrical switch that provides an input to the processor 962. The input device 413 may be similar to the input device 182 of the security device 100.

With reference to FIG. 6, the tapered lower portion 414 may be configured to angle the motion sensor cover 944, and thus the Fresnel lens 442 when configured therewith, to concentrate incoming IR light from the monitored area 401, and particularly from around the front and sides of the security device 400. For example, the tapered lower portion 414 may be longer in length (extend farther downward away from the housing 402) at a rear portion 602 and shorter in length at a front portion 604, such that the opening within the tapered lower portion 414 lies in a plane P that is not perpendicular to a vertical axis A of the security device 400. The plane P slopes upward in the direction from the rear wall 406 toward the front wall 404 of the housing 402. In such embodiments, the opening may receive the motion sensor cover 944 such that the orientation of the plane P with respect to the vertical axis A causes the Fresnel lens 442 to receive more incoming IR light at the front and sides of the security device 400 than at the rear. Configuring the opening and the motion sensor cover 944 and the Fresnel lens 442 in this manner allows for a greater proportion of the light impinging upon the motion sensor 968 to come from the front and sides of the security device 400, which is typically the area of greatest interest, since that is the area within the field of view of the camera 502. The configuration of the opening and the motion sensor cover 944 and the Fresnel lens 442 thus further enhances the effectiveness and/or the sensitivity of the motion sensor 968.

As shown in FIG. 15, indicators 1502, which may be similar to the indicators 186 of security device 100, are located between the PIR sensors 942 at a lower end of the security device 400 and are implemented as one or more light-emitting elements 1504 (e.g., light emitting diodes (LEDs)) that may emit light of one or more different colors through the motion sensor cover 944. The indicators 1502 may be implemented as any number and type of light-emitting element 1504 without departing from the scope of the present embodiments. In some embodiments, the light-emitting elements 1504 are configured to emit light in a variety of colors, such as blue, red, green, and any other color and/or color combination. In the embodiment shown in FIG. 15, the light-emitting elements 1504 are configured with the PIR flex circuit 948 and are thereby operably coupled to the main printed circuit board 938 and the processor 962.

The indicators 1502 may emit light through the motion sensor cover 944, and may be controlled by the processor 962 to provide a visual indication to the user. For example, the input device 413 and the indicators 1502 may allow the user to interactively set operable modes of the security device 400. For example, the indicators 1502 may indicate one or more of: device is in setup mode (AP mode), device is in over-the-air (OTA) programming/updating mode, device is up and running, and the device is in alarm mode. The processor 962 may use the indicators 1502 to indicate different failures during setup, such as one or more of: wrong Wi-Fi password, cannot connect to network, and so on.

The indicators 1502 may be controlled by the processor 962 to provide a visual warning to an intruder, and may further be controlled by a user through an application executing on the client device 114. For example, when, as described above with reference to FIG. 2, a user is communicating with a visitor/intruder through the client device 114, the application executing on the client device 114 may provide one or more options allowing the user to remotely control the operation (illumination) of the indicators 1502 (e.g., the light-emitting elements 1504). For example, the application may display, on the display of the client device 114, one or more buttons (or another type of command/input element) enabling the user, who may be on the premises or at a remote location, to activate the indicators 1502 such as by turning on and/or modulating light-emitting elements 1504, to change the color of the light-emitting elements 1504, to cause the light-emitting elements 1504 to flash, etc. Light emitted by the light-emitting elements 1504 may provide a visual indication or warning to the visitor/intruder. For example, a steady or flashing red light (or any other color) may provide a visual warning to an intruder that may cause the intruder to flee. The steady or flashing red light (or any other color) may further provide a visual cue to any neighbors or passersby of an emergency situation, which may attract the aid or assistance of others to neutralize any danger, such as by causing the intruder to flee.

As described above, the speaker 504 may be configured to emit a sound, such as a loud beep, whoop, squawk, or any other type of loud noise, to startle and/or repel any person within earshot of the speaker 504 when motion is detected in the monitored area 401. This mode may also be referred to as alarm mode, and may be triggered by the user.

In some embodiments of the security device 400, the repelling sound (may also be referred to as "siren") may be remotely controlled by the user through the application executing on the client device 114. For example, when the user is viewing the live video stream from the camera 502, the application may display on the display of the client device 114 one or more buttons (or another type of command/input element) enabling the user to activate the siren. The siren may, in some embodiments, be one or more sounds emitted at very loud volumes, such as one-hundred decibels (dB) or more. Activation of the siren may advantageously cause any intruder within earshot of the speaker 504 to flee. In certain embodiments, when the siren is activated, the processor 962 may also cause the visible illumination source 971 to flash.

As described above, the present embodiments advantageously provide the security device 400 with video and audio recording and with two-way audio capabilities. The security device 400 thus provides stronger crime deterrence than typical floodlight devices because a user can speak directly to an intruder through the security device 400, and because video and/or audio captured by the security device 400 is recorded and may be used to identify criminal perpetrators. Enabling the user to speak directly to an intruder (e.g., through the client device 114 and the security device 400) creates the illusion that the user is present at the property where the intruder is trespassing, thereby making it more likely that the intruder will flee. Some of the present embodiments further advantageously provide the capability to record and store video even in the event of a power outage or when the AC power to a structure has been deliberately cut. Again, the video footage captured by the security device 400 even when AC power is unavailable may be used to identify criminal perpetrators.

Figure 25:
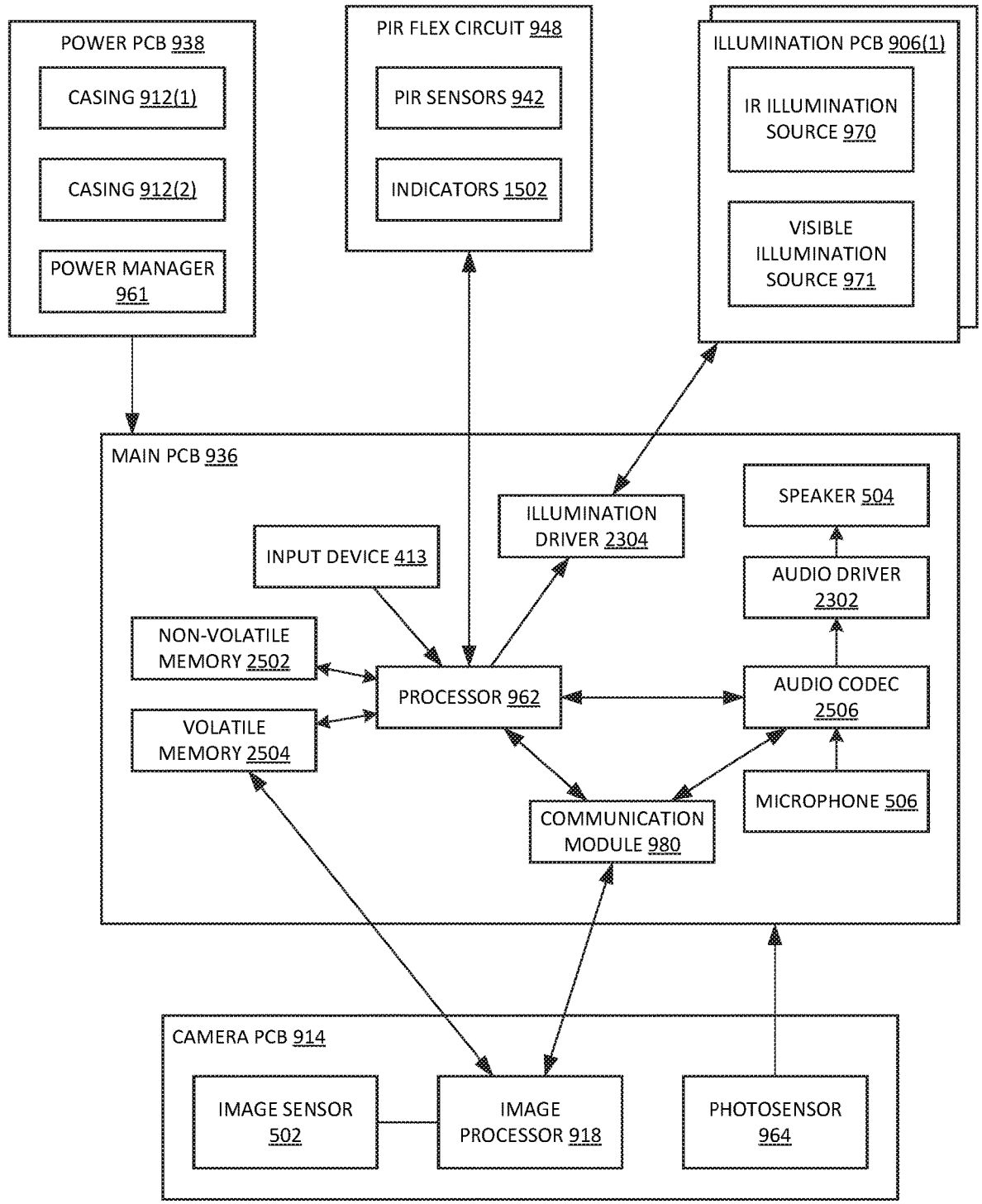
FIG. 25 is a functional block diagram showing connectivity of components of the security device of FIGS. 4-9.

FIG. 25 is a functional block diagram showing connectivity of components of the security device 400 of FIGS. 4-9. The power printed circuit board 938 is configured with the power manager 961 and electrically couples with the removable battery casings 912(1) and 912(2), respectively. The power manager 961 provides electrical power to electrical components of the security device 400, as described above. The PIR flex circuit 948 communicatively couples the PIR sensors 942 and the indicators 1502 (e.g., the light emitting elements 1504) to the processor 962. The security device 400 has two illumination printed circuit boards 906(1) and 906(2), each configured with the infrared illumination source 970 (e.g., the infrared light emitting elements 904) and the visible illumination source 971 (e.g., the visible light emitting elements 902). The camera printed circuit board 914 is configured with the camera 502 (referenced as "image sensor 502" in FIG. 25), the imaging processor 918, and the photosensor 964. The main printed circuit board 936 is configured with the processor 962, a non-volatile memory 2502 that may be similar to the non-volatile memory 178 of the security device 100, a volatile memory 2504 that may be similar to the volatile memory 176 of the security device 100, the input device 413, an illumination driver 2304 that provides power and control to the illumination printed circuit boards 906, the communication module 980, the at least one microphone 506, an audio CODEC 2506 that may be similar to the audio CODEC 166 of the security device 100, and an audio driver 2302 that drives the speaker 504.

Figure 26:
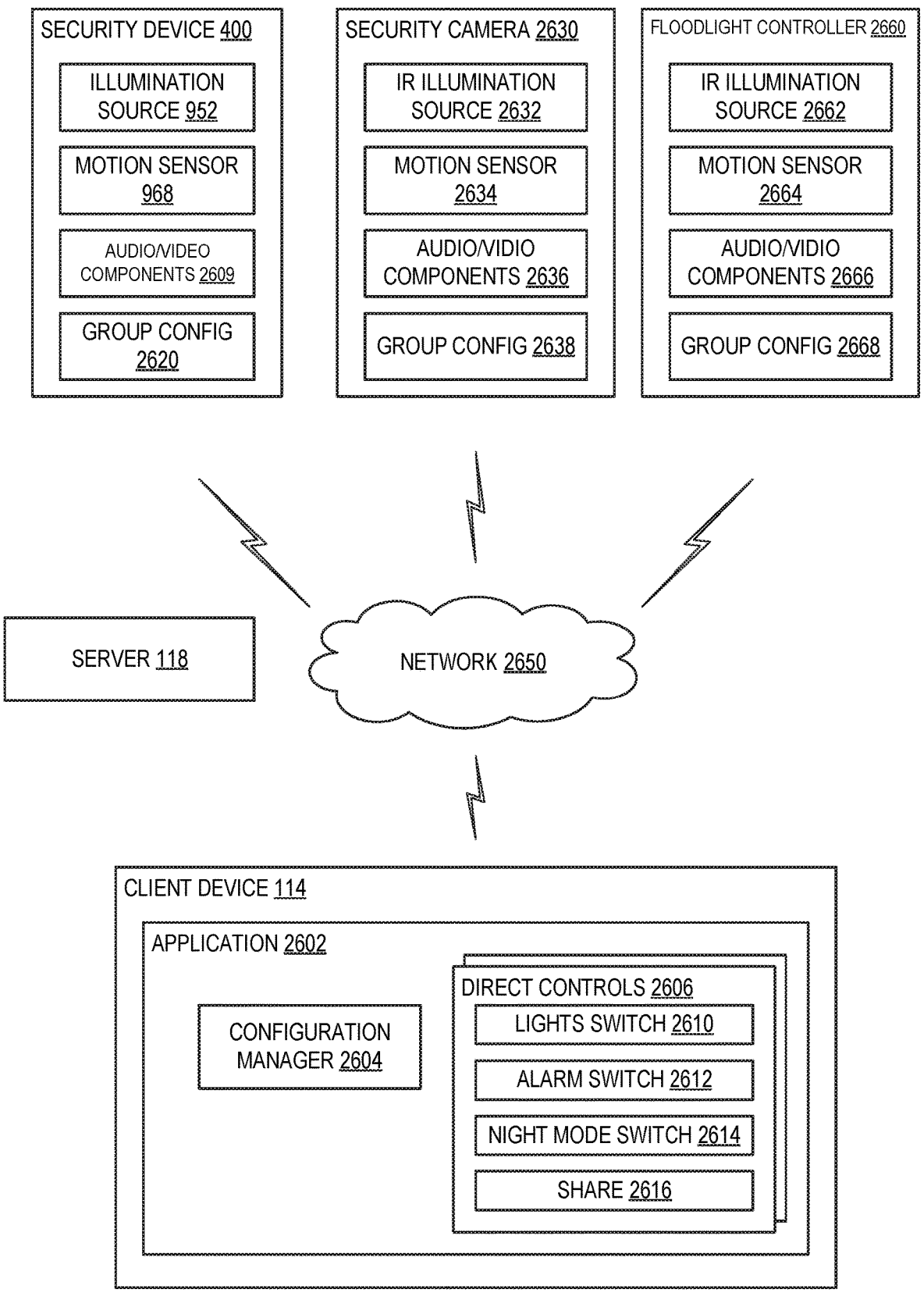
FIG. 26 is a functional block diagram illustrating an example method for configuring the security device of FIGS. 4-9 using a mobile application running on the client device of FIG. 1.

FIG. 26 is a functional block diagram illustrating an example method for configuring the security device 400 of FIGS. 4-9 using an application 2602 running on the client device 114 of FIG. 1. FIG. 26 further shows the configuration of a security camera 2630 and a floodlight controller 2660 by the application 2602. The security camera 2630 may have similar functionality to the security device 400 and includes an infrared illumination source 2632, a motion sensor 2634, and audio/video components 2636 (e.g., a camera, a speaker, and/or a microphone), but does not include a visible light illumination source. The floodlight controller 2660 may have similar functionality to the security device 400 and includes an infrared illumination source 2662, a motion sensor 2664, and audio/video components 2666 (e.g., a camera, a speaker, and/or a microphone), but does not include an integral illumination source. Each of the security device 400, the security camera 2630, and the floodlight controller 2660 is able to communicate with a network 2650 and thereby with the server 118 and/or the client device 114. The security camera 2630 and the floodlight controller 2660 each, respectively, include infrared illumination sources 2632 and 2662 that may be similar to the infrared illumination source 970 of the security device 400, motion sensors 2634 and 2664 that may be similar to the motion sensor 968 of the security device 400, and audio/video components 2636 and 2666 that may be similar to the audio/video components 109 of the security device 100. The security device 400 is shown with audio/video components 2609 that may, for example, represent the functionality of the camera 502, the speaker 504, and/or the microphone 506.

The application 2602 includes machine readable instructions that are executed by a processor of the client device 114 to provide the functionality of the client device 114 described herein. The application 2602 may allow the user to select a "live view" mode at any time, wherein the application 2602 controls one or more of the security device 400, the security camera 2630, and the floodlight controller 2660 to capture live audio/video data using the corresponding audio/video components 2609, 2636, 2666, respectively. The application 2602 displays the captured video on a display of the client device 114 and optionally plays the captured audio using an audio output device of the client device 114. Selection of "live mode" within the application 2602 may not automatically activate the corresponding illumination source 952, 2632, 2662, or any external illumination source (e.g., external illumination source 103), of the security device 400, the security camera 2630, or the floodlight controller 2660. However, while viewing the captured audio/video data, the application 2602 may provide the user with a set of direct controls 2606, described below, that allow the user to directly control functionality of the connected security device 400, the security camera 2630, and/or the floodlight controller 2660.

Figure 27:
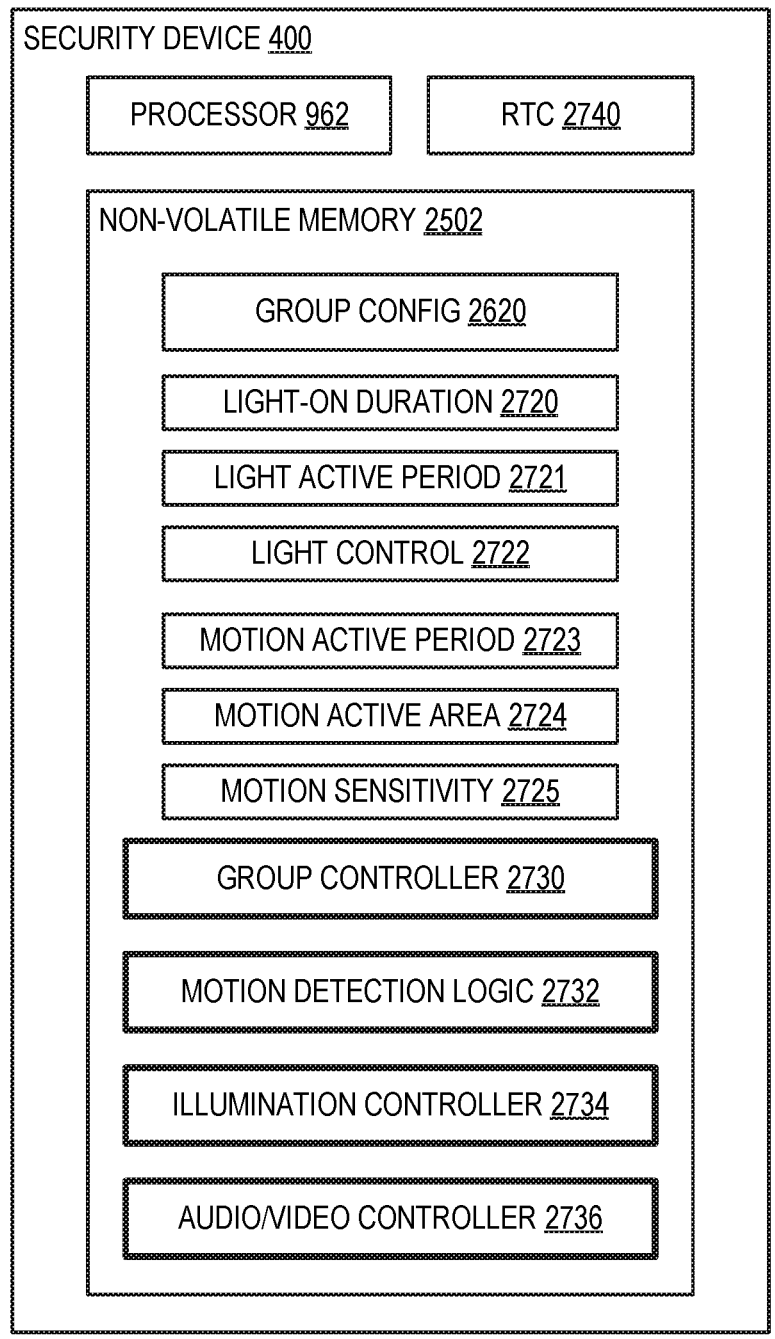
FIG. 27 is a functional block diagram illustrating example configurable parameters and associated functionality of the security device of FIGS. 4-9, in an embodiment.

The application 2602 includes a configuration manager 2604 that interacts with the user to configure one or more of the security device 400, the security camera 2630, and the floodlight controller 2660. FIG. 27 is a functional block diagram illustrating example configurable parameters and associated functionality of the security device 400 of FIGS. 4-9. The security device 400 also includes a group controller 2730, motion detection logic 2732, an illumination controller 2734, and an audio/video controller 2736 that each have machine readable instructions, stored within the non-volatile memory 2502 (FIG. 25), and executed by the processor 962 to provide functionality of the security device 400 as described below. Configurable parameters of the security camera 2630 and the floodlight controller 2660 may be similar to, or the same as, those of security device 400, and are therefore not separately described. FIGS. 26 and 27 are best viewed together with the following description.

The configuration manager 2604 may allow the user to interactively configure a light-on duration 2720 that defines the period that the visible illumination source 971 remains on after the motion sensor 968 and/or the camera 502 detect motion within the monitored area 401. For example, the light-on duration 2720 may be set to two minutes, wherein the illumination source 952 is turned off two minutes after the last detected motion within the monitored area 401. For example, the security device 400 may use a timer (e.g., within the processor 962) to determine when to turn off the illumination source 952. However, the illumination source 952 may not be turned off when directly activated from the application 2602 running on the client device 114, and thus, when manually activated, the illumination source 952 (and optionally a controlled external illumination source such as illumination source 103) may remain on until manually deactivated (turned off by the user).

With further reference to FIGS. 26 and 27, the configuration manager 2604 may allow the user to interactively configure a light active period 2721 that controls when the illumination source 952 (and optionally any controlled external illumination source) may be activated and/or when it may not be activated. For example, the light active period 2721 may be set to 21:00-05:00, indicating that the illumination source 952 may be turned on only between 9:00 PM and 5:00 AM. The configuration manager 2604 may further allow the user to interactively configure a light control 2722 that turns the illumination source 952 and/or the external illumination source (e.g., external illumination source 103) on or off automatically. For example, where the light control 2722 is set to 21:00-22:00 M-F, the security device 400 automatically turns one or both of the illumination source 952 (and any controlled external illumination source) on at 9:00 PM, and then off at 10:00 PM every Monday through Friday.

The configuration manager 2604 may further allow the user to interactively configure a motion active period 2723 to control when detected motion (e.g., by the motion sensor 968 and/or the camera 502) activates one or both of the audio/video components 2609 (e.g., for recording and/or live interaction) and/or the illumination source 952. For example, the motion active period 2723 may be set to 21:00-05:00, indicating that the audio/video components 2609 and/or the illumination source 952 are not triggered (activated) by detected motion except between 9:00 PM and 5:00 AM.

The configuration manager 2604 may further allow the user to interactively configure a motion active area 2724 that specifies a portion of the monitored area 401 where detected motion triggers one or both of the audio/video components 2609 and/or the illumination source 952. For example, the user may interactively mark an area where motion is to be detected by overlaying an outline on a live video feed from the camera 502 using the display of the client device 114. In another example, the user may interactively mark one or more zones where motion is to be detected (or ignored) by displaying a diagram (FIG. 16) of the monitored area 401 on the display of the client device 114. The application 2602 uses the outline (first example) to determine which pixels of the camera 502 are used for motion detection, and which zones (second example) of the motion sensor 968 are used to detect motion. The motion active area 2724 thus defines an active motion sensing area for the camera 502 and active zones for the motion sensor 968.

The configuration manager 2604 may further allow the user to interactively configure a motion sensitivity 2725 that defines one or more thresholds for detecting motion using one or both of the camera 502 and the motion sensor 968. For example, the user may reduce sensitivity to motion detection in areas defined by the motion active area 2724 to reduce the number of "false" detections. In certain embodiments, the motion sensitivity 2725 may be set independently for each defined active zone and/or region of motion detection.

Where the user has one or more of each of the security device 400, the security camera 2630, and the floodlight controller 2660, as shown in FIG. 26, the configuration manager 2604 may allow the user to configure the devices 400, 2630, 2660 to operate as a group. Each of the security device 400, the security camera 2630, and the floodlight controller 2660 may have a unique ID and include both short-range communication capability (e.g., Bluetooth or Bluetooth low energy (BLE)) and medium-range communication capability (e.g., Wi-Fi). The configuration manager 2604 may allow the user to group devices together and to define operational logic and functionality for each group. For example, the unique ID of each of the security device 400, the security camera 2630, and the floodlight controller 2660 may be registered with the application 2602, and the configuration manager 2604 may thereby define a group configuration 2620, 2638, 2668 for each of the security device 400, the security camera 2630, and the floodlight controller 2660, respectively. Each group configuration 2620, 2638, 2668 may define the unique ID of the other grouped devices and the corresponding group functionality. As shown in FIG. 27, the security device 400 may include a group controller 2730 that performs group functionality of the security device 400 and communicates, using the communication module 980, with other devices within the group based upon the unique IDs defined within the group configuration 2620. For example, the security device 400, the security camera 2630, and the floodlight controller 2660 may communicate directly with each other using short-range wireless communication (e.g., Bluetooth or Bluetooth low energy (LE)), or may communicate with each other using medium-range wireless communication (e.g., Wi-Fi) over the user network 110, or any combination thereof, for example.

The motion detection logic 2732 of the security device 400 uses the motion active period 2723 and the motion active area 2724 when detecting motion using one or both of the camera 502 and the motion sensor 968 (e.g., the PIR sensors 942) and may use a real-time clock 2740. The real-time clock 2740 may be implemented within the processor 962 or may be separate circuitry, and is for example synchronized using one or more of the client device 114 and the server 118 over the networks 110 and 112.

Figure 28:
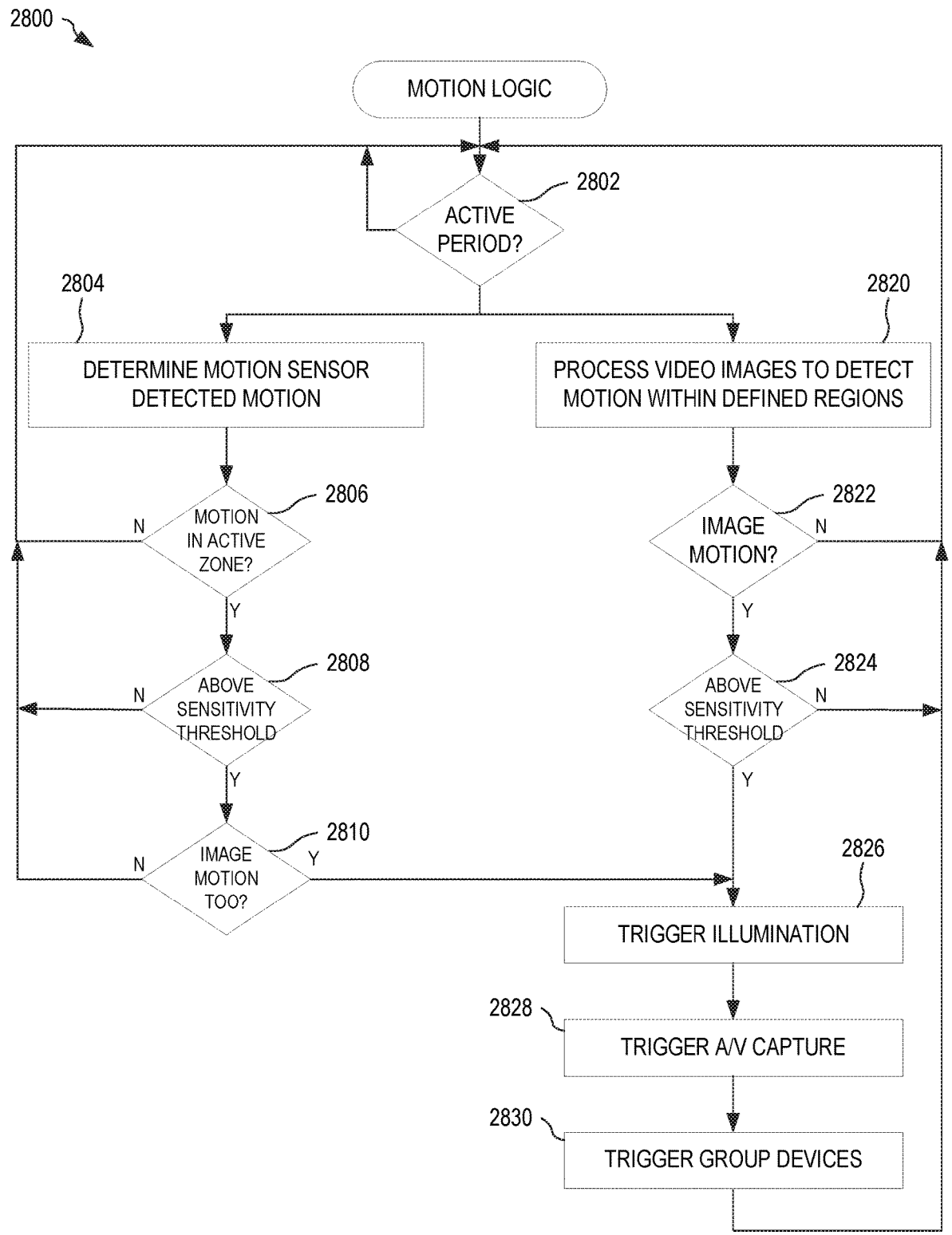
FIG. 28 is a flowchart illustrating one example motion logic process of the security device of FIGS. 4-9, in an embodiment.

FIG. 28 is a flowchart illustrating one example motion logic process 2800 of the security device 400 of FIGS. 4-9. The process 2800 may be, for example, implemented within the motion detection logic 2732 of the security device 400.

Block 2802 is a decision. If, at block 2802, the process 2800 determines that it is an active detection period, the process 2800 continues with blocks 2804 and 2820. In one example of block 2802, the processor 962 reads the real-time clock 2740 and compares the current time to active periods defined within the motion active period 2723, and if the current time is not within any defined active period, then the process 2800 repeats block 2802.

Blocks 2804 through 2810 are performed to evaluate the motion sensor 968 and may occur in parallel with blocks 2820 through 2824, which are performed to evaluate the camera 502.

At block 2804, the process 2800 determines motion sensor detected motion. In one example of block 2804, the processor 962 evaluates inputs from the PIR sensors 942 to determine sensed motion. Block 2806 is a decision. If, at block 2806, the process 2800 determines that the sensed motion is within an active zone of motion active area 2724, the process 2800 continues with block 2808; otherwise, the process 2800 continues with block 2802, thereby ignoring motion that is not in an active zone. Block 2808 is a decision. If, at block 2808, the process 2800 determines that the sensed motion is above the defined threshold of the motion sensitivity 2725, the process 2800 continues with block 2810; otherwise, the process 2800 continues with block 2802, thereby ignoring motion below the sensitivity threshold. Block 2810 is based upon user configuration. Block 2810 is included only when the user defines that motion sensed by the motion sensor 968 is valid only when motion is also detected by the camera 502. When not included, the process 2800 continues with block 2826. When included, block 2810 is a decision. If, at block 2810, the process 2800 determines that motion is also detected by the camera 502, the process 2800 continues with block 2826; otherwise the process 2800 continues with block 2802, thereby ignoring motion detected by the motion sensor 968 unless motion is also detected by the camera 502.

At block 2820, the process 2800 processes the video images to detect motion within defined regions. In one example of block 2820, the processor 962 (or an image processor of the camera 502) masks two sequential images captured by the camera 502 with the defined active regions of the motion active area 2724, and then compares the two masked images to detect motion. Block 2822 is a decision. If, at block 2822, the process 2800 determines that there is motion detected by the camera 502, the process 2800 continues with block 2824; otherwise, the process 2800 continues with block 2802. Block 2824 is a decision. If, at block 2824, the process 2800 determines that the detected motion is above a threshold defined by the motion sensitivity 2725, the process 2800 continues with block 2826; otherwise, the process 2800 continues with block 2802, thereby ignoring motion that is below the motion sensitivity threshold.

At block 2826, the process 2800 triggers illumination. In one example of block 2826, the motion detection logic 2732 triggers the illumination controller 2734. At block 2828, the process 2800 triggers audio/video capture. In one example of block 2828, the motion detection logic 2732 triggers the audio/video controller 2736.

At block 2830, the process 2800 triggers group devices. In one example of block 2830, the group controller 2730 uses information of the group configuration 2620 to send motion triggers to each of the security camera 2630 and the floodlight controller 2660. Within each of the devices 2630 and 2660, the corresponding group controller 2730 triggers the corresponding controller 2734, 2736, to perform/execute the configured group functionality.

Figure 29:
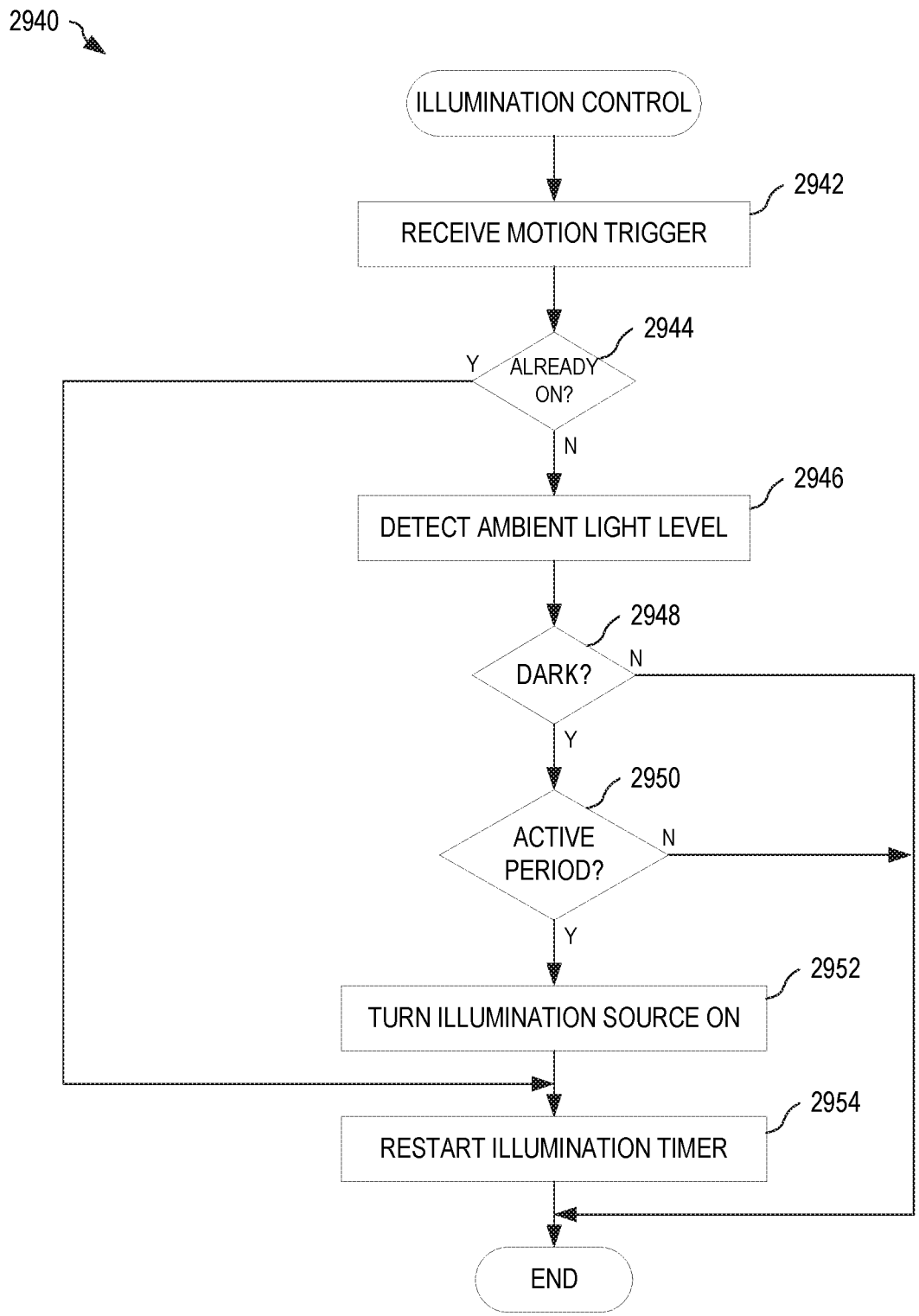
FIG. 29 is a flowchart illustrating one example process for controlling the illumination source of the security device of FIGS. 4-9, in an embodiment.

FIG. 29 is a flowchart illustrating one example process 2940 for controlling the illumination source 952 of the security device 400 of FIGS. 4-9 when invoked by a motion trigger. The process 2940 may be, for example, implemented within the illumination controller 2734 of the security device 400.

At block 2942, the process 2940 receives the motion trigger. In one example of block 2942, block 2826 of the process 2800 of FIG. 28 may invoke the process 2940 as a subroutine executed by the processor 962. Block 2944 is a decision. If, at block 2944, the process 2940 determines that the illumination source 952 is already on, then the process 2940 continues with block 2954; otherwise the process 2940 continues with block 2946. At block 2946, the process 2940 detects an ambient light level. In one example of block 2946, the processor 962 uses the photosensor 964 to detect an ambient light level. Block 2948 is a decision. If, at block 2948, the process 2940 determines that it is dark (low ambient light level), the process 2940 continues with block 2950; otherwise, the process 2940 terminates, thereby not turning on the illumination source 952 when ambient light levels are above a defined threshold.

In some embodiments, block 2948 of the process 2940 may be omitted where the user configuration indicates that the illumination source 952 is to be activated irrespective of ambient light levels. For example, the user may learn from experience that the security device 400 tends to activate night vision mode too early or too late. For example, around sunset, but while there is still enough ambient light for the camera 502 to capture video without added illumination, the security device 400 may turn on the visible illumination source 971, and/or the external illumination source 103, too early. In another example, again around sunset, but while there is insufficient ambient light for the camera 502 to capture video of sufficient quality without added illumination, the security device 400 may activate night vision mode too late, or the security device 400 may activate night vision mode when it would be better to activate one or both of the visible illumination source 971, and/or the external illumination source 103. In certain embodiments, therefore, the user may adjust (e.g., using the application 2602 running on the client device 114) one or more threshold values corresponding to an amount of ambient light that the security device 400 uses to activate night vision mode and/or turn on one or both of the visible illumination source 971 and the external illumination source 103. In other embodiments, the security device 400 may be configured with one or more input devices (e.g., dials, switches, and/or configurable components) that allow the user to adjust one or more threshold values corresponding to ambient light levels directly on the security device 400. In yet another embodiment, the user may configure (e.g., using the application 2602 running on the client device 114) the security device 400 with an on/off time for night vision mode and/or for activation of the visible illumination source 971 and/or for activation of the external illumination source 103 based on sunrise/sunset times (for example, turn on 30 minutes after sunset and turn off 30 minutes before sunrise, etc.), which the security device 400 may track based on its internal real-time clock and sunrise/sunset times gathered from the network 112. Thus, the choice of visible light illumination and/or infrared illumination for given ambient lighting conditions may be configurable by the user.

Block 2950 is a decision. If, at block 2950, the process 2940 determines that it is an active illumination period, the process 2940 continues with block 2952; otherwise the process 2940 terminates, thereby not illuminating the illumination source 952 outside of defined active periods. In one example of block 2950, the processor 962 reads real-time clock 2740 and compares the current time to active periods defined within light active period 2721 and, if the current time is not within any defined active period, then the process 2940 terminates without activating the illumination source 952. At block 2952, the process 2940 turns on the illumination source 952. In one example of block 2952, the processor 962 activates the visible illumination source 971. In some embodiments, the user may configure (e.g., using the application 2602 running on the client device 114) the security device 400 such that only the infrared illumination source 970 is activated when motion is detected and the level of ambient light is low enough that the visible illumination source 971 would otherwise be activated; thus the security device 400 may record video of an intruder without the intruder being aware that it is happening. In block 2954, the process 2940 restarts the illumination timer. In one example of block 2954, the processor 962 reloads a timer used for turning off the illumination source 952 with the light-on duration 2720. The process 2940 then terminates.

When triggered by block 2828 of the process 2800 (FIG. 28), the audio/video controller 2736 controls the camera 502 and the audio codec 2506 to capture audio/video data, which may be buffered in volatile memory (e.g., the volatile memory 176) of the security device 400. The audio/video controller 2736 also sends the captured audio/video data to the server 118 via the networks 110, 112, and may stream the audio/video data to the client device 114, as described above. While streaming the audio/video data to the client device 114, if the illumination source 952 is active (e.g., turned on by the process 2940), the illumination timer may be disabled such that the illumination source 952 is not turned off while the user is watching the audio/video data being streamed. When the user terminates streaming of the audio/video data to the client device 114, the illumination timer may be restarted, and will thereby turn the illumination source 952 off after the period defined by the light-on duration 2720.

With reference to FIG. 26, the application 2602 may also include one or more sets (e.g., one set for each of the security device 400, the security camera 2630, and the floodlight controller 2660) of direct controls 2606 that allow the user to control functionality of each of the security device 400, the security camera 2630, and the floodlight controller 2660 directly. The direct controls 2606 may be available (e.g., overlaid onto the live video feed) to the user both when viewing captured audio/video data (e.g., live view mode) and when not displaying audio/video data, where the direct controls 2606 may be displayed in a separate window or dialog on the display of the client device 114. The direct controls 2606 corresponding to the security device 400 may include a lights switch 2610, an alarm switch 2612, a night mode switch 2614, and a share 2616. The light switch 2610 may be a control within the application 2602 that allows the user to control (e.g., turn on and turn off) the illumination source 952 directly. The alarm switch 2612 may be a control within the application 2602 that allows the user to activate the siren sound (and optionally flashing of the illumination source 952) on the security device 400. The night mode switch 2614 may be a control within the application 2602 that allows the user to activate and deactivate the night mode of the security device 400. When activated, in night mode, the infrared illumination source 970 is turned on and the camera 502 may be switched into infrared mode (in embodiments where such switching might be necessary) to capture reflected infrared illumination of the infrared illumination source 970 from the field of view of the camera 502. The share 2616 may be a control within the application 2602 that may be selected by the user to send a captured audio/video stream to selected recipients (e.g., neighbors) as a way of warning when the security device 400 has detected and captured images and/or audio of an unwanted or suspicious visitor. In certain embodiments, the user may configure grouped devices to all go into alarm mode (e.g., generating the siren sound, flashing the illumination sources, and/or light patterns using the indicators 1502) when the user activates the alarm switch 2612. The user may press the alarm switch 2612 again to deactivate alarm mode, or alarm mode may be deactivated after a predefined period. In certain embodiments, the user may be able to talk at the high alarm volume through the speaker 504 of the security device 400 and/or through other grouped devices.

Figure 30:
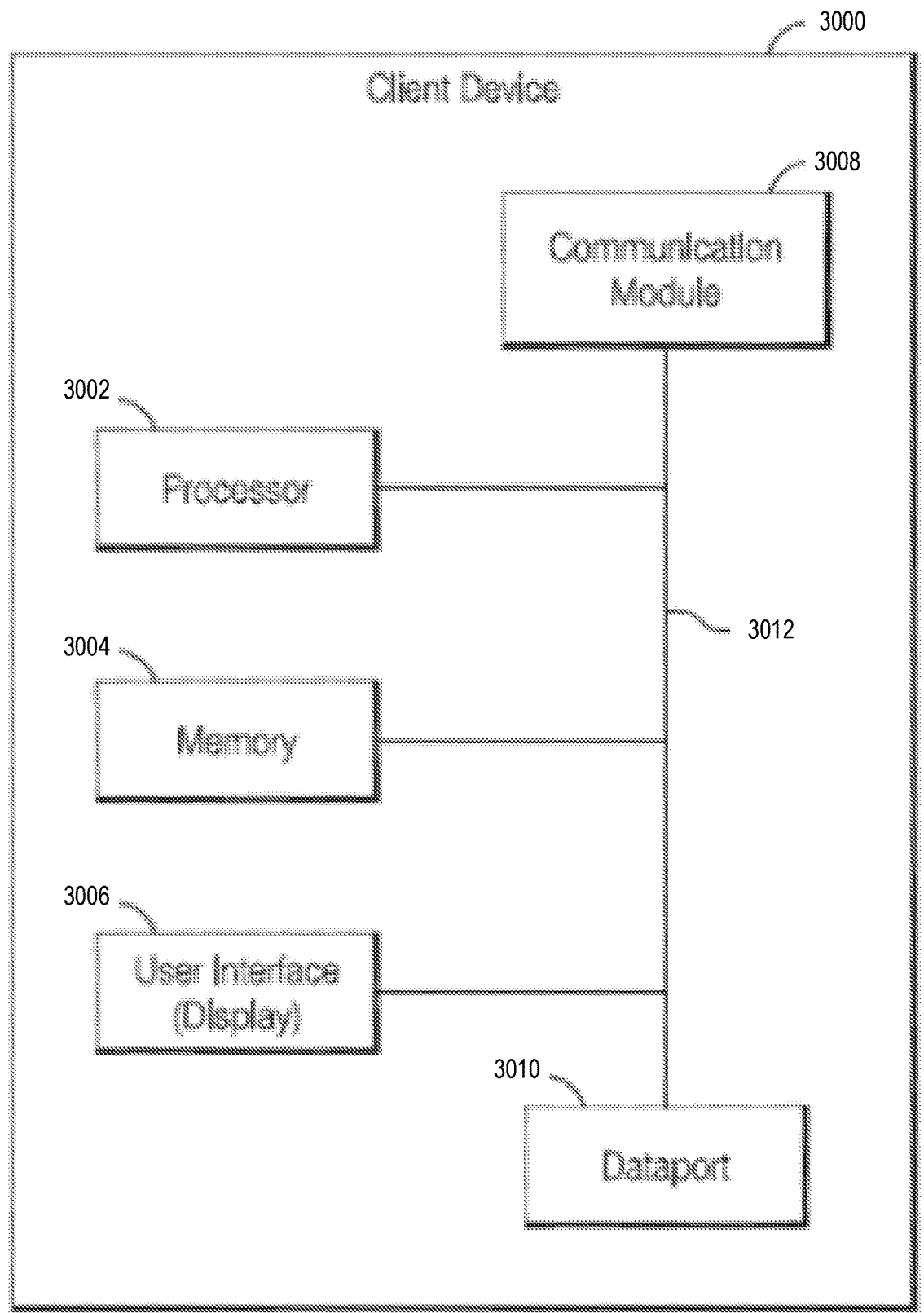
FIG. 30 is a functional block diagram of a client device on which the present embodiments may be implemented according to various aspects of the present disclosure.

FIG. 30 is a functional block diagram of a client device 3000 on which the present embodiments may be implemented according to various aspects of the present disclosure. The client device 114, described with reference to FIG. 1, may include some or all of the components and/or functionality of the client device 3000. The client device 3000 is, for example, a smartphone.

The client device 3000 includes a processor 3002, a memory 3004, a user interface 3006, a communication module 3008, and a dataport 3010. These components are communicatively coupled together by an interconnect bus 3012. The processor 3002 may include any processor used in smartphones and/or portable computing devices, such as an ARM processor (a processor based on the RISC (reduced instruction set computer) architecture developed by Advanced RISC Machines (ARM). In certain embodiments, the processor 3002 includes one or more other processors, such as one or more microprocessors, and/or one or more supplementary co-processors, such as math co-processors.

The memory 3004 may include both operating memory, such as random access memory (RAM), as well as data storage, such as read-only memory (ROM), hard drives, flash memory, or any other suitable memory/storage element. The memory 3004 may include removable memory elements, such as a CompactFlash card, a MultiMediaCard (MMC), and/or a Secure Digital (SD) card. In certain embodiments, the memory 3004 includes a combination of magnetic, optical, and/or semiconductor memory, and may include, for example, RAM, ROM, flash drive, and/or a hard disk or drive. The processor 3002 and the memory 3004 each may be located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 3002 may be connected to the memory 3004 via the dataport 3010.

The user interface 3006 may include any user interface or presentation elements suitable for a smartphone and/or a portable computing device, such as a keypad, a display screen, a touchscreen, a microphone, and a speaker. The communication module 3008 is configured to handle communication links between the client device 3000 and other, external devices or receivers, and to route incoming/outgoing data appropriately. For example, inbound data from the dataport 3010 may be routed through the communication module 3008 before being directed to the processor 3002, and outbound data from the processor 3002 may be routed through the communication module 3008 before being directed to the dataport 3010. The communication module 3008 may include one or more transceiver modules configured for transmitting and receiving data, and using, for example, one or more protocols and/or technologies, such as GSM, UMTS (3GSM), IS-95 (CDMA one), IS-2000 (CDMA 2000), LTE, VoLTE, LoRaWAN, LPWAN, RPMA, LTE Cat-"X" (e.g. LTE Cat 1, LTE Cat 0, LTE CatM1, LTE Cat NB1), FDMA, TDMA, W-CDMA, CDMA, OFDMA, Wi-Fi, WiMAX, or any other protocol and/or technology.

The dataport 3010 may be any type of connector used for physically interfacing with a smartphone and/or a portable computing device, such as a mini-USB port or an IPHONE®/IPOD® 30-pin connector or LIGHTNING® connector. In other embodiments, the dataport 3010 may include multiple communication channels for simultaneous communication with, for example, other processors, servers, and/or client terminals.

The memory 3004 may store instructions for communicating with other systems, such as a computer. The memory 3004 may store, for example, a program (e.g., computer program code) adapted to direct the processor 3002 in accordance with the present embodiments. The instructions also may include program elements, such as an operating system. While execution of sequences of instructions in the program causes the processor 3002 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 31:
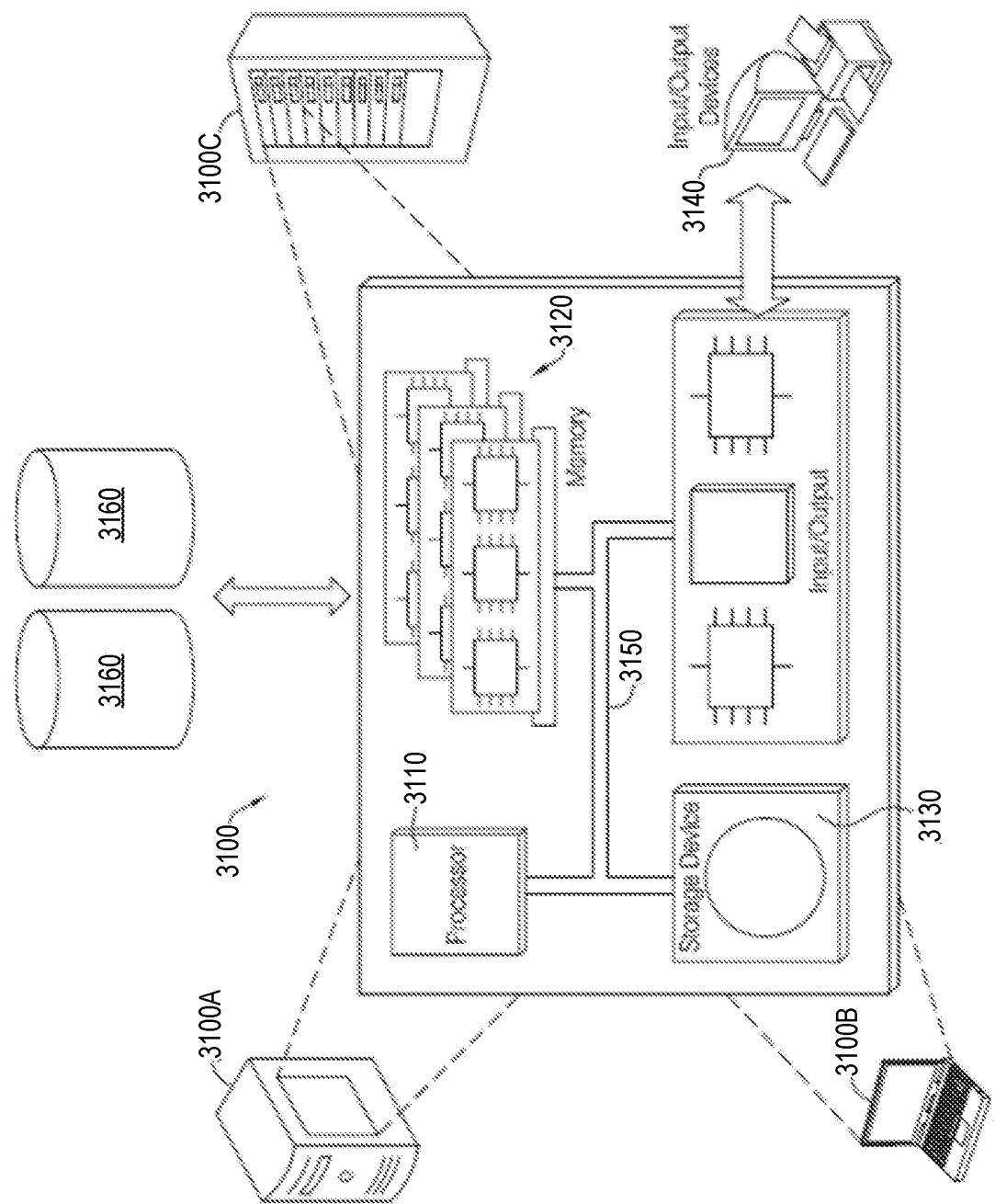
FIG. 31 is a functional block diagram of a general-purpose computing system on which the present embodiments may be implemented according to various aspects of the present disclosure.

FIG. 31 is a functional block diagram of a computing system 3100 on which the present embodiments may be implemented according to various aspects of the present disclosure. The computing system 3100 may be embodied in at least one of a personal computer (also referred to as a desktop computer) 3100A, a portable computer (also referred to as a laptop or notebook computer) 3100B, and/or a server 3100C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computing system 3100 may execute at least some of the operations described above. The computing system 3100 may include at least one processor 3110, a memory 3120, at least one storage device 3130, and input/output (I/O) devices 3140. Some or all of the processor 3110, the memory 3120, the storage device 3130, and the I/O devices 3140 may be interconnected via a system bus 3150. The processor 3110 may be single- or multi-threaded and may have one or more cores. The processor 3110 may execute instructions, such as those stored in the memory 3120 and/or in the storage device 3130. Information may be received and output using one or more I/O devices 3140.

The memory 3120 may store information, and may be a computer-readable medium, such as volatile or non-volatile memory. The storage device(s) 3130 may provide storage for the computing system 3100, and may be a computer-readable medium. In various embodiments, the storage device(s) 3130 may be one or more of a flash memory device, a hard disk device, an optical disk device, a tape device, or any other type of storage device.

The I/O devices 3140 may provide input/output operations for the computing system 3100. The I/O devices 3140 may include a keyboard, a pointing device, and/or a microphone. The I/O devices 3140 may further include a display unit for displaying graphical user interfaces, a speaker, and/or a printer. External data may be stored in one or more accessible external databases 3160.

Figure 32:
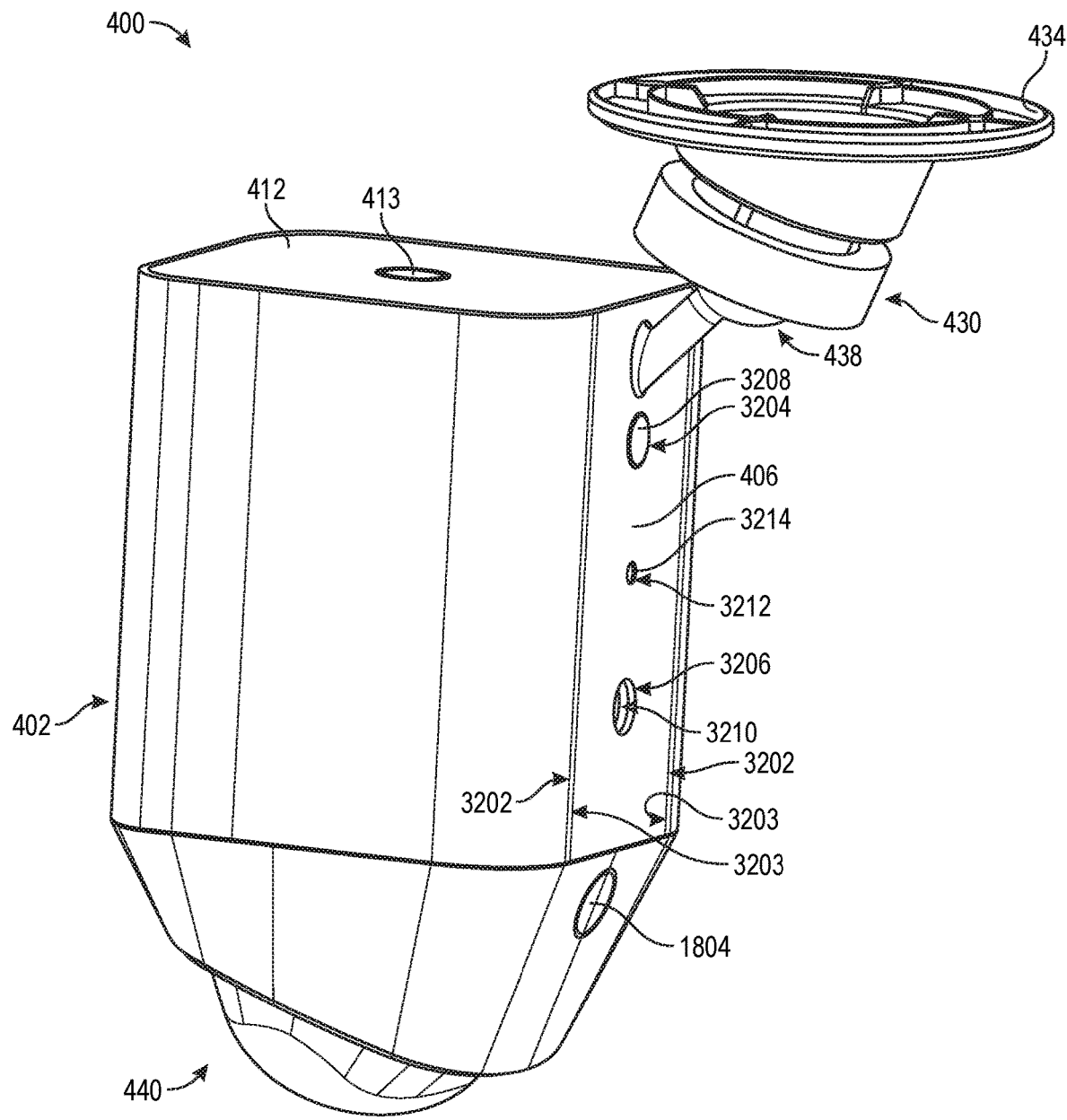
FIG. 32 is a rear perspective view of the security device of FIGS. 4-8, in an embodiment, in combination with mounting hardware.
Figure 33:
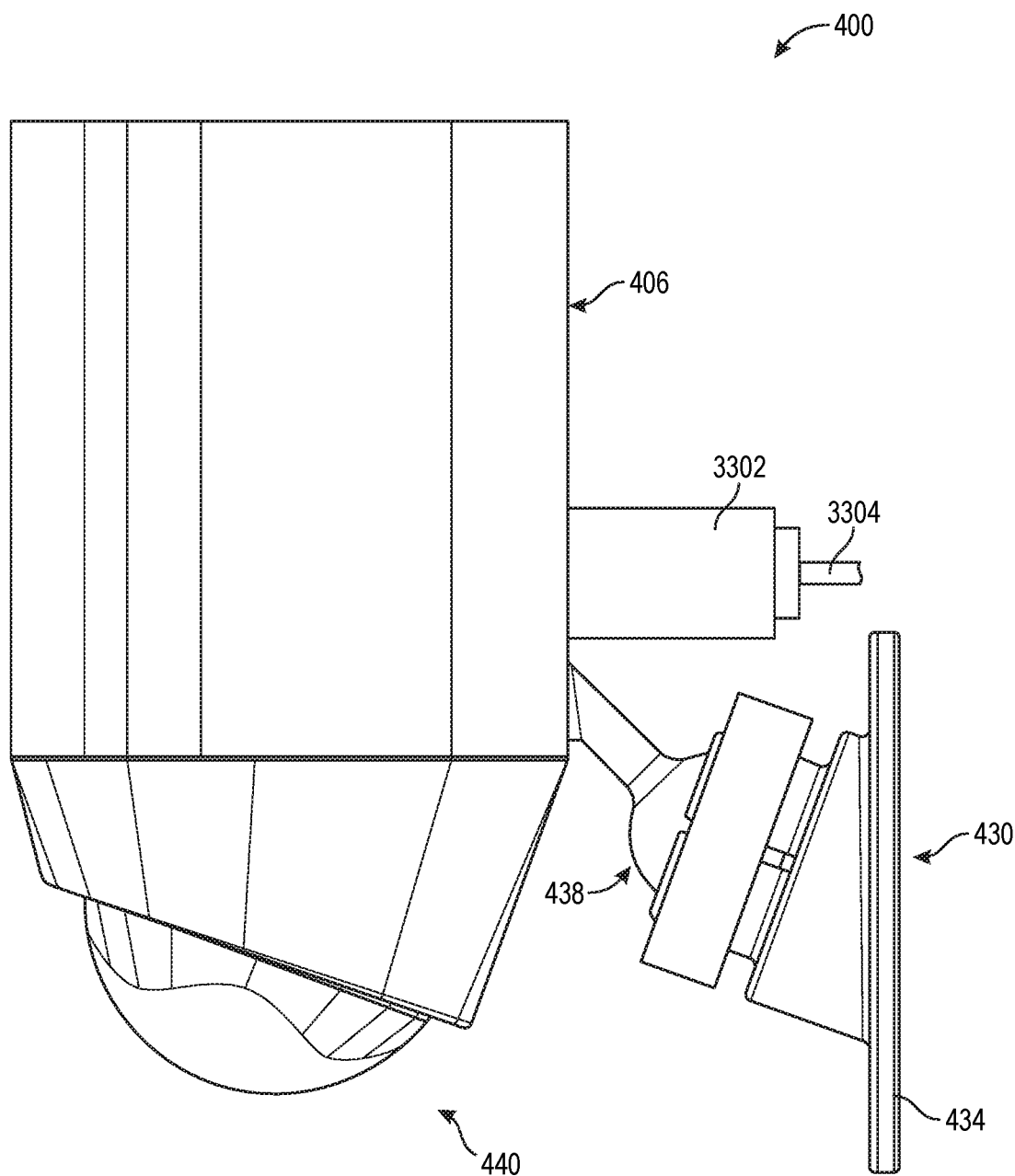
FIG. 33 is a right side view of the security device of FIGS. 4-8 and 32, further illustrating an alternate orientation of the rear wall and the coupling hardware.

FIG. 32 is a rear perspective view of the security device 400 of FIGS. 4-8, in an embodiment, in combination with the coupling hardware 430. FIG. 33 is a right side view of the security device 400 of FIGS. 4-8 and 32 further illustrating an alternate orientation of the rear wall 406 and the coupling hardware 430. FIGS. 32 and 33 are best viewed together with the following description. In the examples of FIGS. 4-8 and 32, the coupling hardware 430 is positioned toward the top of the security device 400. In this position, the second connecting member 434 is oriented to facilitate attachment of the security device 400 to a downward facing surface (e.g., a ceiling, eaves, or soffit, for example). The embodiment shown in FIG. 33 illustrates the rear wall 406 in a reverse orientation with respect to the configuration of FIG. 32. In this configuration, the coupling hardware 430 is positioned toward a bottom of the security device 400. In this position, the second connecting member 434 is oriented to facilitate attachment of the security device 400 to a vertical surface (e.g., a wall or post). In either the configuration FIG. 32 or the configuration FIG. 33, articulation of the ball-and-socket joint 438 facilitates connection of the second connecting member 434 to mounting surfaces that are not perfectly horizontal or vertical.

In some embodiments, the rear wall 406 is configured to allow removal, by sliding, from the housing 402, such that it may be turned around 180° (top to bottom) and slid back into the housing 402 to position the coupling hardware 430 toward a bottom of the security device 400, as shown in FIG. 33. With this alternate orientation, the security device 400 is configured for attachment to an upward facing surface (e.g., a top of a post) or to a vertical surface (e.g., a wall or a post). Attachment of the security device 400 to a wall also may be made easier when the coupling hardware 430 is positioned toward the bottom of the security device 400, as shown in FIG. 33, for example. The ability to change the orientation of the coupling hardware 430 greatly increases mounting options for the security device 400.

With reference to FIG. 32, in certain embodiments, side edges 3202 of the rear wall 406 are beveled to engage complementary beveled edges of a vertically orientated rear channel 3203 formed at the back of the housing 402. As described above, the rear wall 406 has first and second apertures 3204, 3206, respectively, that are symmetrically positioned along a vertical center line of the rear wall 406. When the rear wall 406 is oriented as shown in FIG. 32, the spring-loaded button 3208 engages the first aperture 3204 to thereby prevent the rear wall 406 from sliding, unless the button 3208 is depressed by the user. Also, in this orientation, the second aperture 3206 provides access to the internal connector 3210 (e.g., a USB connector) that allows direct electrical/data connectivity to certain components of the security device 400. When the orientation of the rear wall 406 is reversed (in the orientation of FIG. 33), the button 3208 engages with the second aperture 3206, and the internal connector 3210 is accessible via the first aperture 3204. As shown in FIG. 33, a hood 3302 may be inserted into the appropriate aperture 3204, 3206, depending on orientation of the rear wall 406, to protect the internal connector 3210. For example, the hood 3302 may be a flexible waterproof material (e.g., rubber or soft plastic) that allows a plug/cable 3304 to be inserted and coupled with the internal connector 3210. The security screw 3214 located in the third aperture 3212 of the rear wall 406 operates to secure the rear wall 406 to the housing 402 and deter theft of the security device 400.

In one example of operation, to change the orientation of the rear wall 406 and the coupling hardware 430 with respect to the security device 400, the user first removes the security screw 3214 and the hood 3302. If the plug/cable 3304 is coupled with the internal connector 3210, the plug/cable 3304 is also removed. The user depresses the button 1804 and opens the battery access door 440 by sliding the door 440 downward, as described below. The user then depresses the button 3208 and slides the rear wall 406 and the coupling hardware 430 downward, with respect to the housing 402, to remove the rear wall 406 from the rear channel 3203 of the housing 402. The user then turns the rear wall 406 and the coupling hardware 430 around (top to bottom) and reinserts the rear wall 406 into the rear channel 3203 of the housing 402. The user may depress the button 3208 as the rear wall 406 slides upward so that the button 3208 does not block the sliding movement of the rear wall 406 upward within the rear channel 3203. When the rear wall 406 is fully inserted within the rear channel 3203, the button 3208 pops out to engage with the second aperture 3206 and secure the rear wall 406 in place. The user may then replace the security screw 3214 through the aperture 3212, recouple the plug/cable 3304 with the internal connector 3210 through the first aperture 3204, which is now positioned toward the bottom of the security device 400, and slide the hood 3302 over the plug/cable 3304, as shown in FIG. 33.

Figure 34:
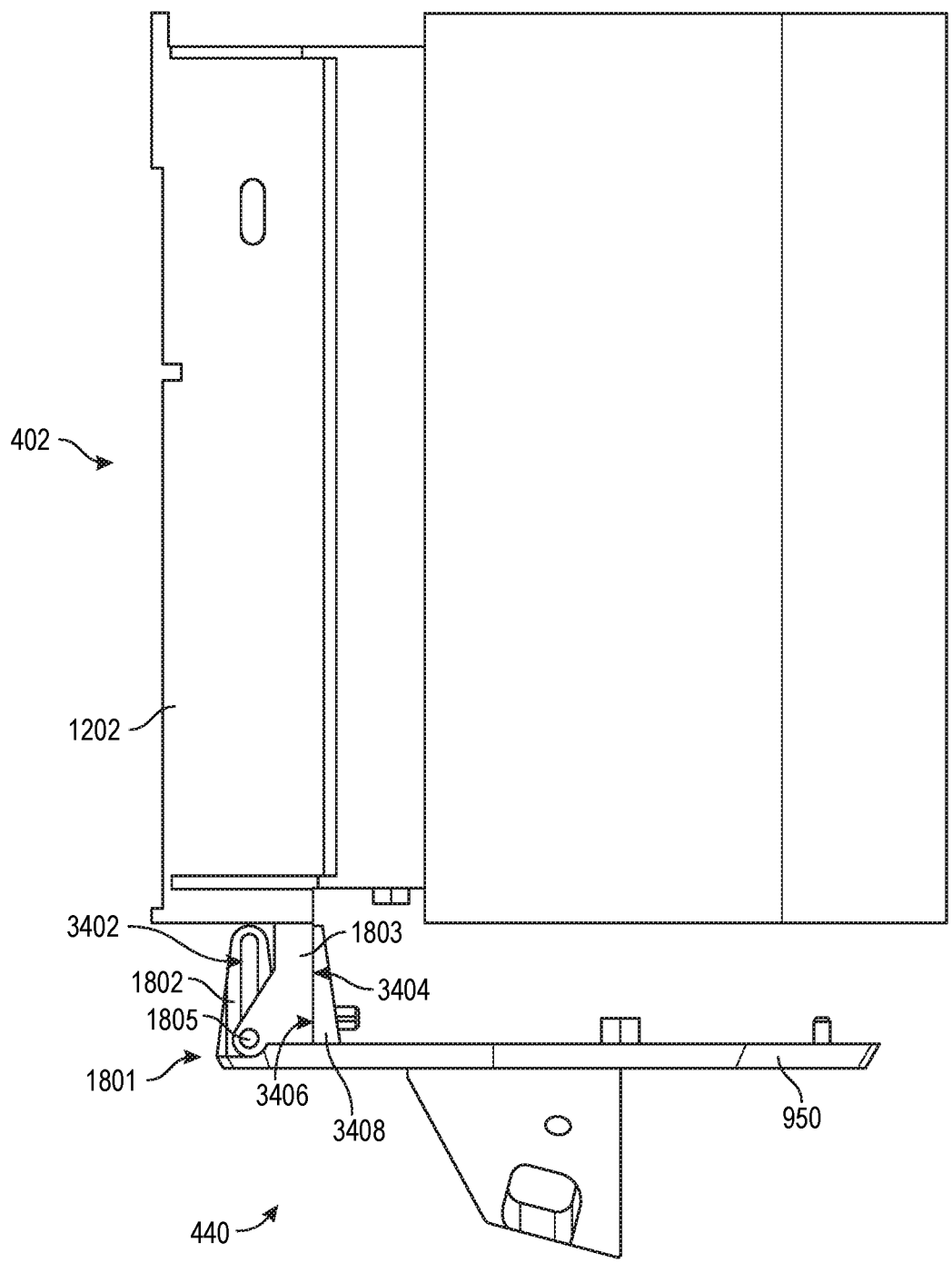
FIGS. 34-36 are right side views of the lower end of the security device of FIGS. 4-8, 32 and 33, illustrating opening of the battery access door of FIGS. 17-19 to access and remove the removable battery casings, in one example of operation.
Figure 35:
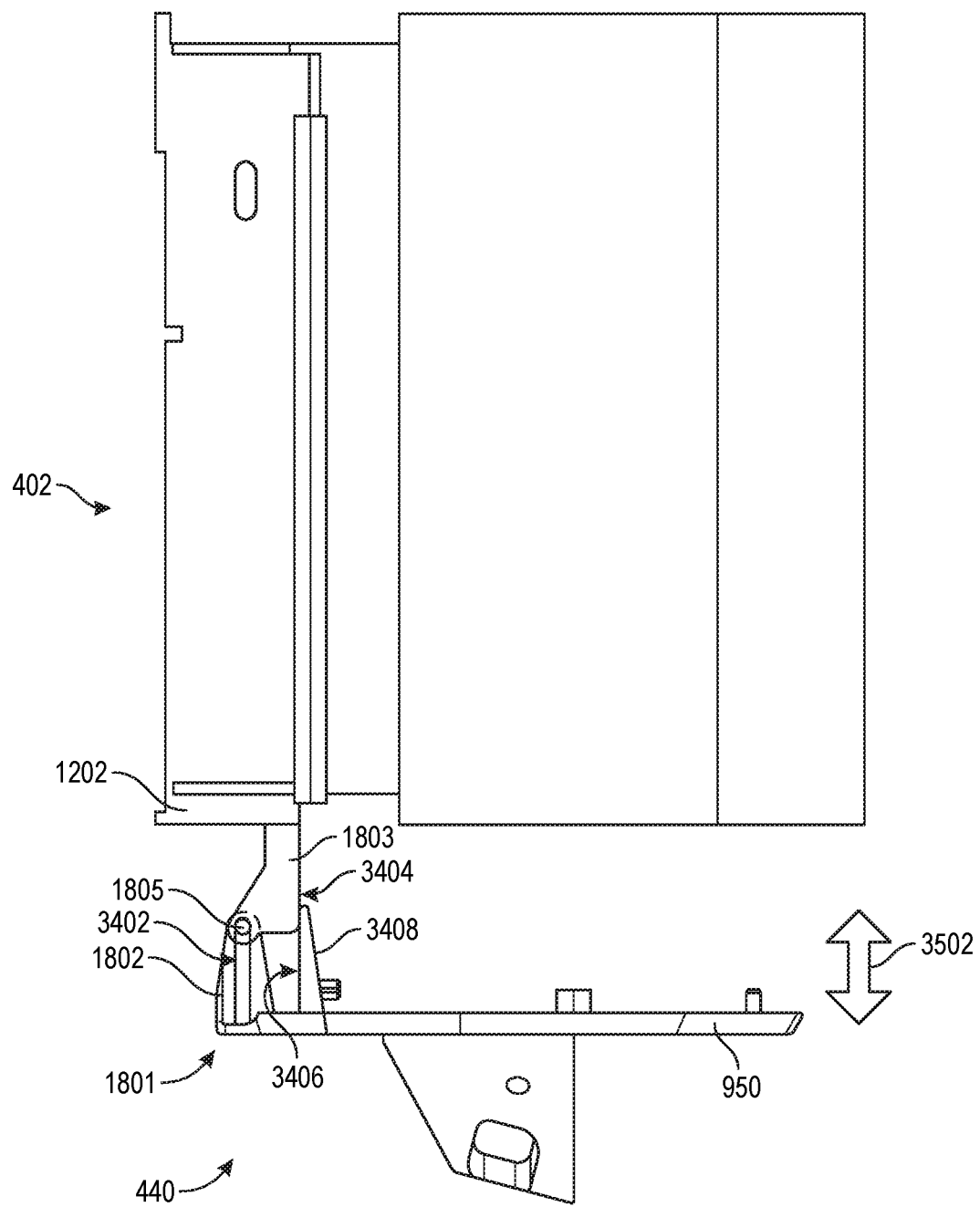
Figure 36:
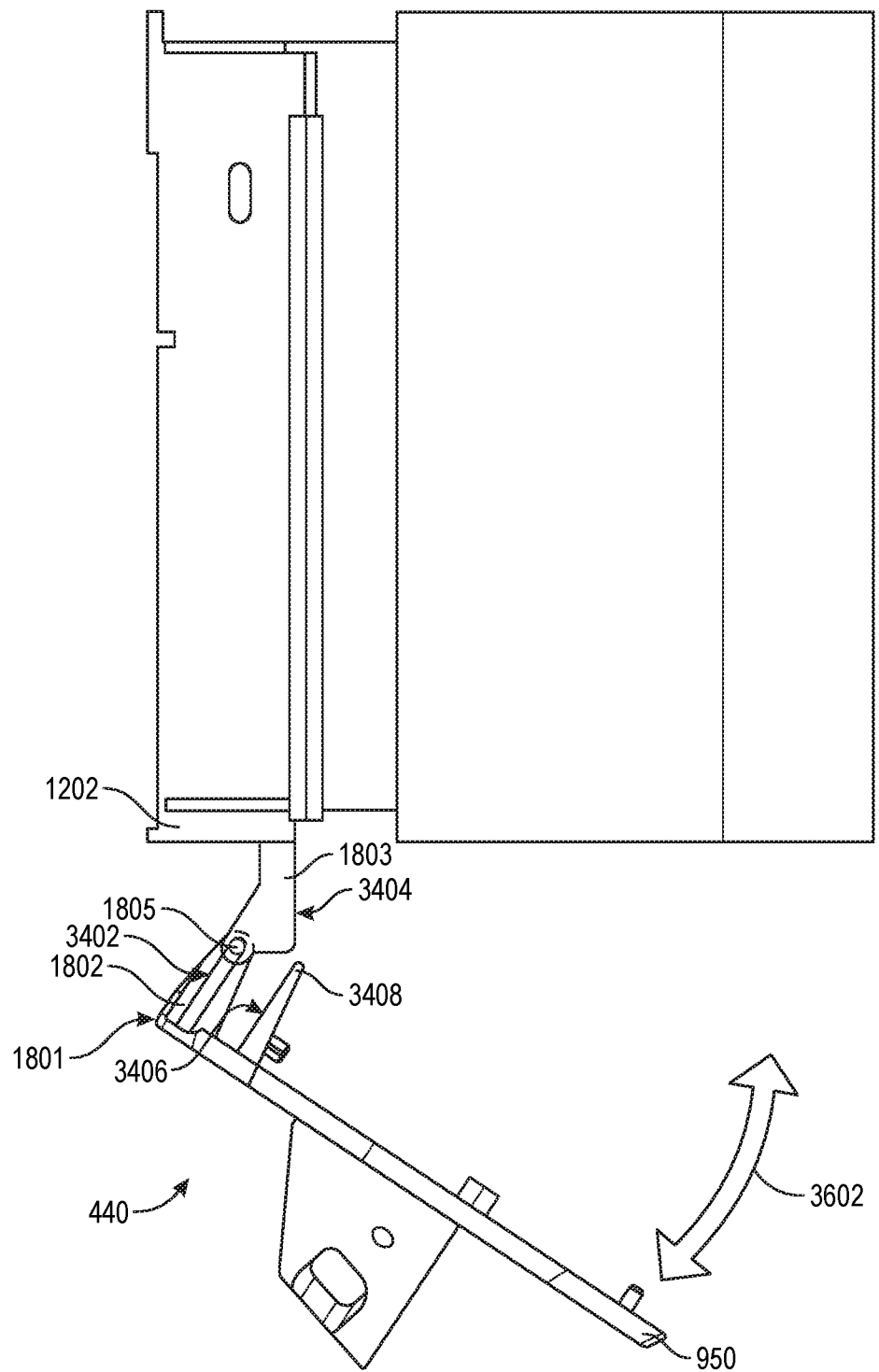

FIGS. 34-36 are right side views of the lower end of the security device 400 of FIGS. 4-8, 32 and 33, illustrating opening of the battery access door 440 of FIGS. 17-19 to access and remove the removable battery casings 912, in one example of operation. For clarity of illustration, FIGS. 34-36 show the internal battery cover 1202 and the plate 950 of the battery access door 440. As described above with reference to FIG. 17, the hinge 1801 is formed with the first hinge portion 1802 at the front edge of the plate 950, the second hinge portion 1803 at the lower front edge of the internal battery cover 1202 within the housing 402, and the hinge pin 1805 passing through the mated first and second hinge portions 1802, 1803. In particular, the first hinge portion 1802 forms a vertical slot 3402 through which the hinge pin 1805 passes, thereby allowing vertical movement, indicated by arrow 3502 (FIG. 35), of the plate 950 with respect to the hinge pin 1805. The plate 950 has a vertical protrusion 3408 with a flat forward facing surface 3406. The second hinge portion 1803 has a rear facing surface 3404 that abuts the surface 3406 of the protrusion 3408 when the battery access door 440 is closed, and inhibits rotation of the plate 950 around the hinge pin 1805 until the plate 950 is first lowered vertically to the position shown in FIG. 35, wherein the surfaces 3404 and 3406 are substantially disengaged. In certain embodiments, the battery access door 440 may drop down approximately eight millimeters, such as between six and ten millimeters, before rotating around the hinge pin 1805 (as shown in FIG. 36). The plate 950, and thus the battery access door 440, rotates around the hinge pin 1805, as indicated by arrow 3602, to fully open the battery access door 440 through at least ninety degrees, allowing the removable battery casings 912 to be removed from the housing 402 and inserted into the housing 402. The PIR flex circuit 948 is configured with sufficient length, and/or is configured to extend, such that opening of the battery access door 440 is not inhibited by the PIR flex circuit 948.

The battery access door 440 is closed in a reversal of the opening process. For example, the battery access door 440 is first rotated until parallel with the housing 402 and then slid vertically upward to close. By configuring the hinge 1801 to allow the battery access door 440 to first drop vertically and then rotate, the battery access door 440 provides improved access to the removable battery casings 912 as compared to embodiments that allow only rotation of the battery access door. The sliding movement of the battery access door 440 also provides clearance for the rear wall 406 to be slid downward within the rear channel 3203 for disengaging the rear wall 406 from the housing 402.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

Changes may be made in the above methods and systems without departing from the scope of the present embodiments. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A security camera device, comprising:
    a housing;
    a camera located at least partly within the housing, the camera having a first field-of-view of at least part of an area about the security camera device;
    an illumination source located at least partly within the housing, the illumination source configured to illuminate at least a portion of the first field-of-view;
    a removable power source located within the housing, the removable power source configured to provide power to the camera and the illumination source;
    an access door coupled at a bottom of the housing, the access door to provide access to the removable power source for removal thereof while the security camera device is mounted to a mounting surface; and
    a motion sensor coupled to the access door.

2. The security camera device of claim 1, wherein:
    the removable power source comprises a first removable battery and a second removable battery;
    the first removable battery is configured to supply first power to operate the security camera device; and
    the second removable battery is configured to supply second power to operate the security camera device.

3. The security camera device of claim 1, further comprising:
    one or more processors located at least partly within the housing; and
    one or more communication interfaces located at least partly within the housing, the one or more network interfaces configured to send data to a remote system.

4. The security camera device of claim 1, wherein:
    the illumination source comprises an infrared illumination source; and
    the security camera device further comprises a visible-light spectrum illumination source.

5. The security camera device of claim 4, further comprising:
    a photosensor;
    one or more processors; and
    one or more computer-readable media storing instructions that, when executed by the one or more processors, cause the one or more processors to,
        detect an ambient light level using the photosensor, and
        activate at least one of the infrared illumination source or the visible-light spectrum illumination source based at least in part on the ambient light level.

6. The security camera device of claim 4, further comprising:
    one or more processors; and
    one or more computer-readable media storing instructions that, when executed by the one or more processors, cause the one or more processors to activate at least one of the infrared illumination source or the visible-light spectrum illumination source based at least in part on an internal real-time clock.

7. The security camera device of claim 1, wherein:
the illumination source comprises a first vertical illumination source located on a first side of the camera; and
the security camera device further comprises a second vertical illumination source located on a second side of the camera, the second side being opposite to the first side.

8. The security camera device of claim 1, wherein the motion sensor comprises:
a first passive infrared (PIR) sensor;
a second PIR sensor; and
a third PIR sensor.

9. The security camera device of claim 8, further comprising an inverted PIR sensor holder, the inverted PIR sensor holder comprising:
a first downward-angled surface, wherein the first PIR sensor is coupled to the first downward-angled surface;
a second downward-angled surface, wherein the second PIR sensor is coupled to the second downward-angled surface; and
a third downward-angled surface, wherein the third PIR sensor is coupled to the third downward-angled surface.

10. The security camera device of claim 8, wherein the first PIR sensor, the second PIR sensor, and the third PIR sensor collectively have a second field-of-view of at least 270 degrees.

11. The security camera device of claim 1, further comprising a Fresnel lens coupled on the access door, wherein the motion sensor is located behind the Fresnel lens.

12. The security camera device of claim 1, wherein:
the access door comprises a tapered portion; and
the security camera device further comprises a motion sensor cover coupled to the tapered portion.

13. The security camera device of claim 1, wherein the access door is configured to move between a first position and a second position with respect to the housing, and wherein the motion sensor is configured to move with the access door between the first position and the second position.

14. The security camera device of claim 1, wherein the access door comprises:
an additional housing, the additional housing including an opening;
a motion sensor cover disposed at least partially within the opening; and
a plate,
wherein the motion sensor is disposed on the plate.

15. The security camera device of claim 1, further comprising:
one or more processes located at least partly within the housing; and
a flexible circuit that connects the motion sensor to the one or more processors.

16. A security camera device, comprising:
a removable power source;
a housing;
a battery access door coupled proximate a bottom of the housing, the battery access door providing access to the removable power source while the security camera device is mounted at a structure;
a camera located at least partly within the housing, the camera having a first field-of-view of at least part of an area about the security camera device;
a motion sensor coupled to the battery access door, the motion sensor having a second field-of-view of at least part of the area about the security camera device; and
a lens extending from the battery access door, the lens to concentrate incoming light onto the motion sensor.

17. The security camera device of claim 16, wherein:
the motion sensor comprises:
a first passive infrared (PIR) sensor;
a second PIR sensor; and
a third PIR sensor; and
the security camera device further comprises an inverted PIR sensor holder, the inverted PIR sensor holder comprising:
a first surface, wherein the first PIR sensor is coupled to the first surface;
a second surface, wherein the second PIR sensor is coupled to the second surface; and
a third surface, wherein the third PIR sensor is coupled to the third surface.

18. The security camera device of claim 16, wherein the lens is angled with respect to a vertical axis of the housing.

19. The security camera device of claim 16, wherein:
the battery access door comprises a tapered portion; and
the lens is disposed at the tapered portion.

20. A security camera device, comprising:
a housing;
a camera located at least partly within the housing, the camera having a first field-of-view of at least part of an area about the security camera device;
a motion sensor coupled proximate a bottom of the housing, the motion sensor having a second field-of-view of at least part of the area about the security camera device;
a removable power source located within the housing, the removable power source comprising two separate removable batteries, each of the two separate removable batteries being independently capable of supplying power to operate the security camera device housing;
an access door; and
a lens associated with the motion sensor coupled to the access door.

* * * * *